US006261455B1

(12) United States Patent
Brown et al.

(10) Patent No.: US 6,261,455 B1
(45) Date of Patent: Jul. 17, 2001

(54) CENTRIFUGE CARTRIDGE FOR REMOVING SOOT FROM OIL IN VEHICLE ENGINE APPLICATIONS

(75) Inventors: Gene W. Brown; Steven J. Merritt; Farrell F. Calcaterra, all of Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 09/420,161

(22) Filed: Oct. 18, 1999

Related U.S. Application Data

(60) Provisional application No. 60/105,135, filed on Oct. 21, 1998, provisional application No. 60/112,231, filed on Dec. 15, 1998, and provisional application No. 60/141,465, filed on Jun. 29, 1999.

(51) Int. Cl.[7] ................................ B01D 21/26; B04B 1/04

(52) U.S. Cl. ........................ 210/380.1; 210/168; 210/305; 168/6.24; 494/46; 494/60; 494/68; 494/69

(58) Field of Search ..................................... 210/168, 304, 210/305, 307, 312, 314, 360.1, 380.1, DIG. 17; 494/43, 46, 49, 60, 68, 69, 70, 71, 72, 73, 82; 123/1, 196 A

(56) References Cited

U.S. PATENT DOCUMENTS

| | | |
|---|---|---|
| 2,053,856 | 9/1936 | Weidenbacker . |
| 2,129,992 | 9/1938 | De Mattia . |
| 2,256,951 | 9/1941 | Van Riel . |
| 2,321,144 | 6/1943 | Jones . |
| 2,335,420 | 11/1943 | Jones . |
| 2,485,390 | 10/1949 | Langmuir . |
| 2,647,686 | 8/1953 | Drury . |

(List continued on next page.)

FOREIGN PATENT DOCUMENTS

| | | |
|---|---|---|
| 1089355 | 11/1967 | (GB) . |
| 362643 | 12/1972 | (SU) . |
| 564884 | 7/1977 | (SU) . |
| 869822 | 10/1981 | (SU) . |
| 83/02406 | 7/1983 | (WO) . |

*Primary Examiner*—David A. Reifsnyder
(74) *Attorney, Agent, or Firm*—Leydig, Voit & Mayer, Ltd

(57) ABSTRACT

A centrifuge oil filter includes a centrifuge filter housing and a replaceable centrifuge cartridge. The centrifuge oil filter is adapted to remove soot from oil in engine applications. The centrifuge filter housing can be mounted directly on the frame of a vehicle for support and provides top access for a mechanic to service and replace the cartridge from the top of the filter. The centrifuge housing includes a lid at the top which can be removed to allow top access to the cartridge. The lid carries a bearing support and bearings upon which the upper end of a drive shaft is journalled to facilitate rotation of the cartridge. In the lower end of the housing another bearing assembly is provided with at least one set of bearings upon which the lower end of the drive shaft is journalled and an electrical motor which drives the drive shaft and therefore the cartridge. The cartridge is secured to the drive shaft at beveled contact surfaces to ensure long life of the drive shaft and bearings and provide for close retention of the cartridge on the shaft. Vibration isolators are provided between the bearing mounts and the outer casing of the filter housing to reduce wear caused by vehicle induced shock loads and vibrations. The centrifuge cartridge has an inlet at its top and an outlet at its bottom. The centrifuge cartridge includes elbow outlet tubes which extend the length of the cartridge to provide an outlet oil entrance near the top of the cartridge. The cartridge has a large surface area containment trap which has several levels provided by concentric cylindrical walls and a plurality of partition walls in each level to provide multiple compartments for soot agglomeration.

53 Claims, 44 Drawing Sheets

U.S. PATENT DOCUMENTS

| | | | |
|---|---|---|---|
| 2,745,217 | 5/1956 | Gold et al. . | |
| 3,007,629 | 11/1961 | Boyland . | |
| 3,223,315 | 12/1965 | Smith . | |
| 3,228,597 | 1/1966 | Walker et al. . | |
| 3,273,324 | 9/1966 | Jennings . | |
| 3,335,946 | 8/1967 | Putterlik . | |
| 3,403,848 | 10/1968 | Windsor et al. . | |
| 3,430,853 | 3/1969 | Kirk et al. . | |
| 3,432,091 | 3/1969 | Beazley . | |
| 3,762,633 | 10/1973 | Ishii . | |
| 3,784,092 | 1/1974 | Gibson . | |
| 3,791,576 | 2/1974 | Bazil . | |
| 3,879,294 | 4/1975 | Ellis et al. . | |
| 4,106,689 | 8/1978 | Kozulla . | |
| 4,142,671 | 3/1979 | Irvin et al. . | |
| 4,150,580 | 4/1979 | Silkebakken et al. . | |
| 4,165,032 | 8/1979 | Klingenberg . | |
| 4,221,323 | 9/1980 | Courtot . | |
| 4,288,030 | 9/1981 | Beazley et al. . | |
| 4,492,631 | 1/1985 | Martin . | |
| 4,498,898 | 2/1985 | Haggett | 494/49 |
| 4,547,185 | 10/1985 | Hellekant | 494/37 |
| 4,557,831 | 12/1985 | Lindsay et al. | 210/232 |
| 4,891,041 | 1/1990 | Hohmann et al. . | |
| 5,085,783 | 2/1992 | Feke et al. . | |
| 5,096,581 | 3/1992 | Purvey | 210/232 |
| 5,364,335 | 11/1994 | Franzen et al. . | |
| 5,494,579 | 2/1996 | Robatel et al. . | |
| 5,637,217 | 6/1997 | Herman et al. . | |
| 5,656,164 | 8/1997 | Vado et al. . | |
| 5,707,519 | 1/1998 | Miller et al. . | |
| 5,779,618 | 7/1998 | Onodera et al. | 494/5 |
| 5,785,849 | 7/1998 | Mules . | |
| 6,017,300 | 1/2000 | Herman | 494/49 |
| 6,019,717 | 2/2000 | Herman | 494/49 |

FIG. 23
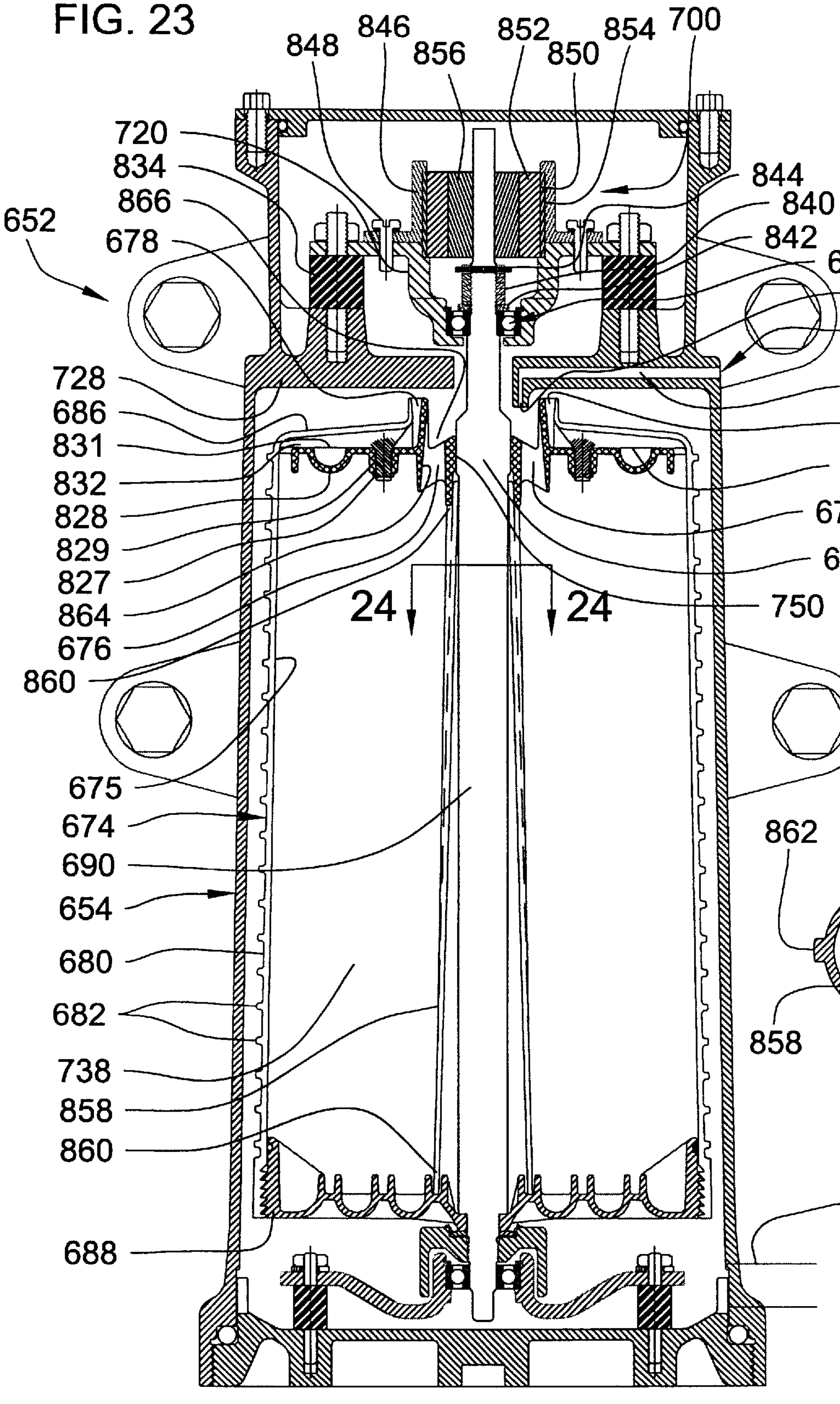
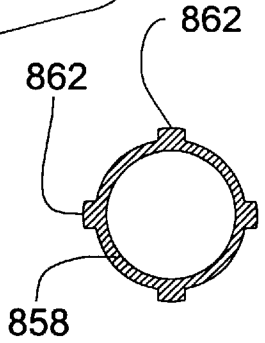
FIG. 24

Fig. 54
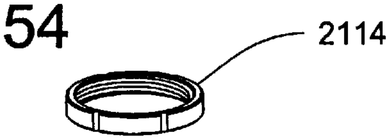
Fig. 55
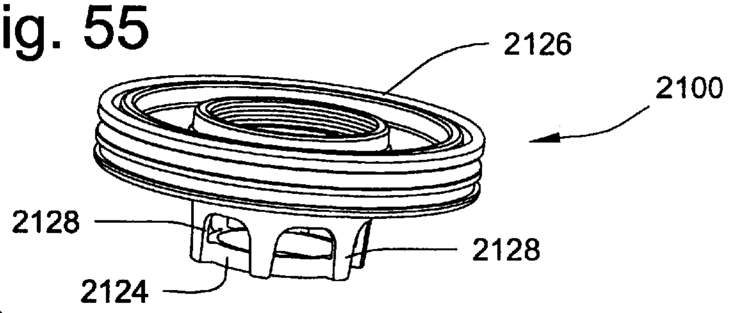
Fig. 57
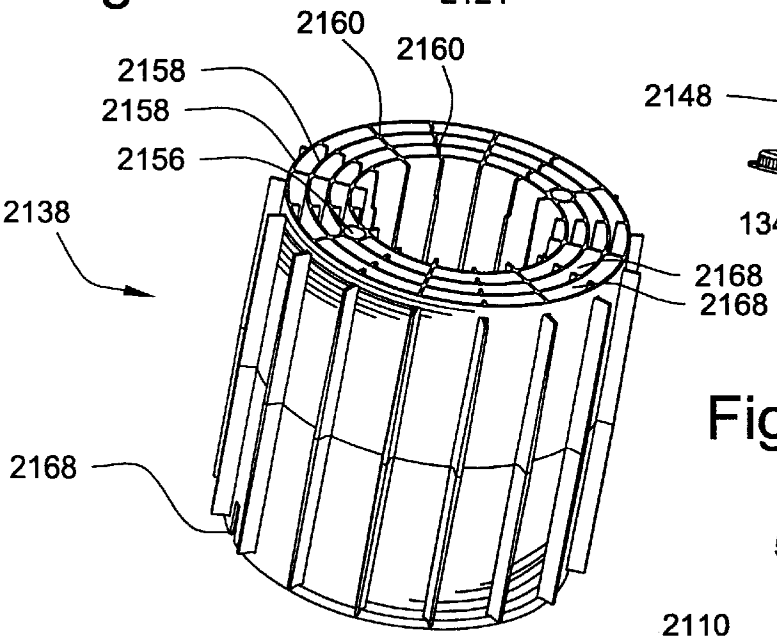
Fig. 56
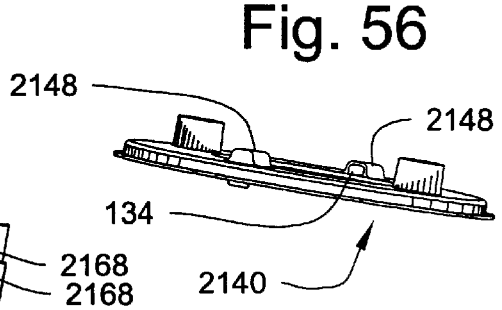
Fig. 58
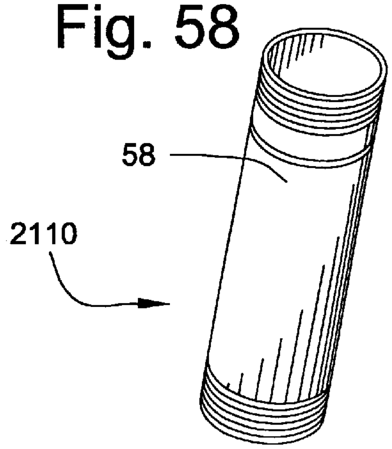
Fig. 60
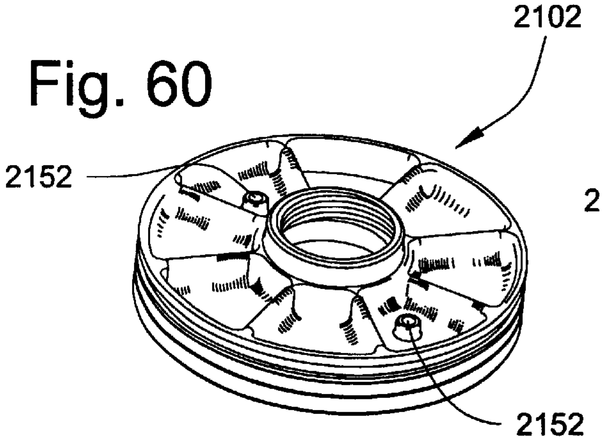
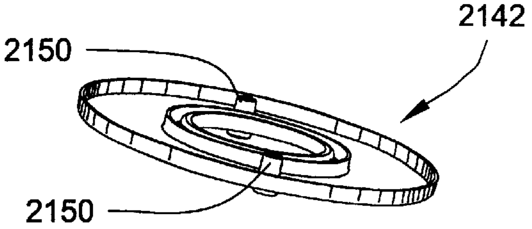
Fig. 59

CENTRIFUGE CARTRIDGE FOR REMOVING SOOT FROM OIL IN VEHICLE ENGINE APPLICATIONS

This application claims the benefit of U.S. Provisional Application No. 60/105,135, filed Oct. 21, 1998, U.S. Provisional Application No. 60/112,231, filed Dec. 15, 1998, and U.S. Provisional Application No. 60/141,465, filed Jun. 29, 1999.

FIELD OF THE INVENTION

The present invention generally relates to filters and more particularly relates to oil filters for engine and vehicle applications.

BACKGROUND OF THE INVENTION

Current heavy-duty diesel engines put a moderate amount of soot (a form of unburned fuel) into the oil pan. This soot is generated due to the fuel hitting the cold cylinder walls and then being scraped down into the oil sump when the pistons reciprocate in the cylinders. Up until recently, the nitrous oxide emission regulations in the USA and other countries have been high enough that the fuel injection timing could be such that the level of soot generated was not high. In typical applications, the soot level would be under 1% (by weight) of the engine oil at oil drain time. At these low levels, soot in the oil does not cause any wear problems.

Recently, there has been a move to significantly lower nitrous oxide emissions which requires much retarded fuel injection timing, which significantly increases the amount of soot being generated. At reasonable oil drain intervals, the soot level may be as high as 4 or 5% with retarded injection timing. When the soot level gets this high, lubrication at critical wear points on the engine becomes so poor that high wear results, significantly decreasing the miles to overhaul and causing high operator expense.

Thus, the engine manufacturer has two choices, suffer very high warranty costs and low miles to overhaul, or significantly lower oil drain intervals to keep high soot levels out of the oil. Neither of these choices is desirable, so there is a current strong need to have a means of getting the soot out of the oil, the subject of this invention.

A problem with removing the soot from oil is that it is very small in size—around 0.1 to 2.0 micrometers. To remove such small particles from oil using barrier filtration is not feasible due to the large filter size required and the very high probability that the filter will become plugged very rapidly due to trying to filter to such a fine level.

One way that is feasible to remove the soot from the oil is by using a centrifuge, a device that removes the soot from the oil using centrifugal force. This type of device is used to separate blood constituents from blood and has many other applications in typical laboratory applications. The use of a centrifuge for an engine brings a requirement of doing it in a very inexpensive and reliable manner with the centrifuge being easily changed at oil change time. Heretofore, centrifugal filters have not been able to sufficiently remove soot from oil, sufficiently retain the soot, nor reliable enough for use in engine and vehicle applications.

SUMMARY OF THE INVENTION

It is therefore the general aim of the present invention to provide a highly practical and reliable filter for removing soot from oil in vehicle and engine applications to maintain or extend the drain intervals at which oil must be replaced for the engine.

In accordance with these and other objectives, the present invention is directed towards a centrifuge cartridge which can be rotated at high speeds in a stationary drive housing for removal of soot from oil in the filter chamber of the cartridge. The centrifuge cartridge generally has an outer housing having a predetermined axis of rotation. There are several aspects of the centrifuge cartridge which each provide for high practicality and reliability.

One aspect is the provision of a separate filter trap in the filter chamber to provide increased soot retention capabilities. The soot trap has multiple levels located at different radial distances from the rotational axis for oil to flow through before the oil can exit the cartridge. Each level has an outlet aperture for allow oil to pass to the next level and a deposit area which is located radially outside of the outlet aperture in order to filter heavier particles such as soot from the oil. The different levels may be provided by multiple concentric cylindrical walls, conical walls, a single sheet wrapped in a spiral configuration, or other appropriate configuration.

Another aspect of the present invention is the provision of a centrifuge cartridge which has an inlet at its top and an outlet at its bottom. An outlet conduit is provided in the centrifuge cartridge which extends the entrance of the outlet to the top of the filter cartridge. The outlet conduit ensures that oil does not drain when the cartridge is idle. The bottom outlet prevents oil from creating drag on the rotation of the cartridge and also keeps the cartridge clean which in turn facilitates cleaner service maintenance when changing filter cartridges.

Another aspect of the present invention is the provision of a beveled or conical contact surface which allows the cartridge to be precisely aligned and retained when inserted in the intended stationary drive housing.

Another aspect of the present invention is the provision of a side oil inlet located radially outward from the center axis of rotation. This allows a support element of the intended drive housing to extend through the cartridge without the need of introducing oil through the support element.

Other objects and advantages of the invention will become more apparent from the following detailed description when taken in conjunction with the accompanying drawings.

BRIEF DESCRIPTION OF THE DRAWINGS

FIG. 18 shows the filter housing.

FIG. 19 is a sectional view of the centrifuge cartridge for installation into the filter housing of FIG. 18.

FIG. 23 is a sectional view of another embodiment of the present invention with the centrifuge cartridge installed into the filter housing.

FIG. 24 is a sectional view of FIG. 23 taken about line A—A.

FIGS. 54–60 are perspective view of the individual components of the centrifuge cartridge shown in FIG. 49.

Figure 1:
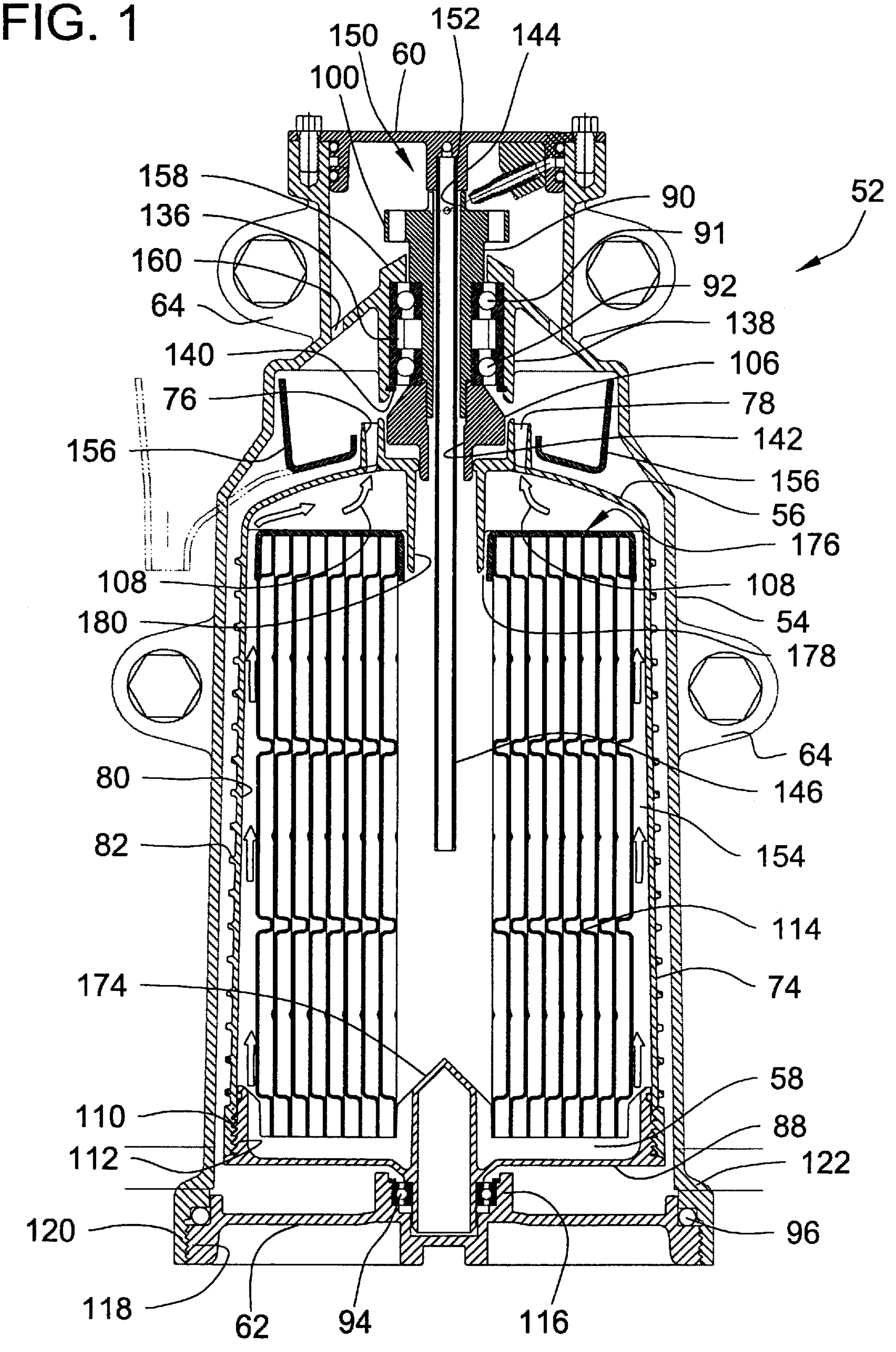
FIG. 1 is a sectional view of a first embodiment of the present invention with the centrifuge installed into the filter housing.
Figure 2:
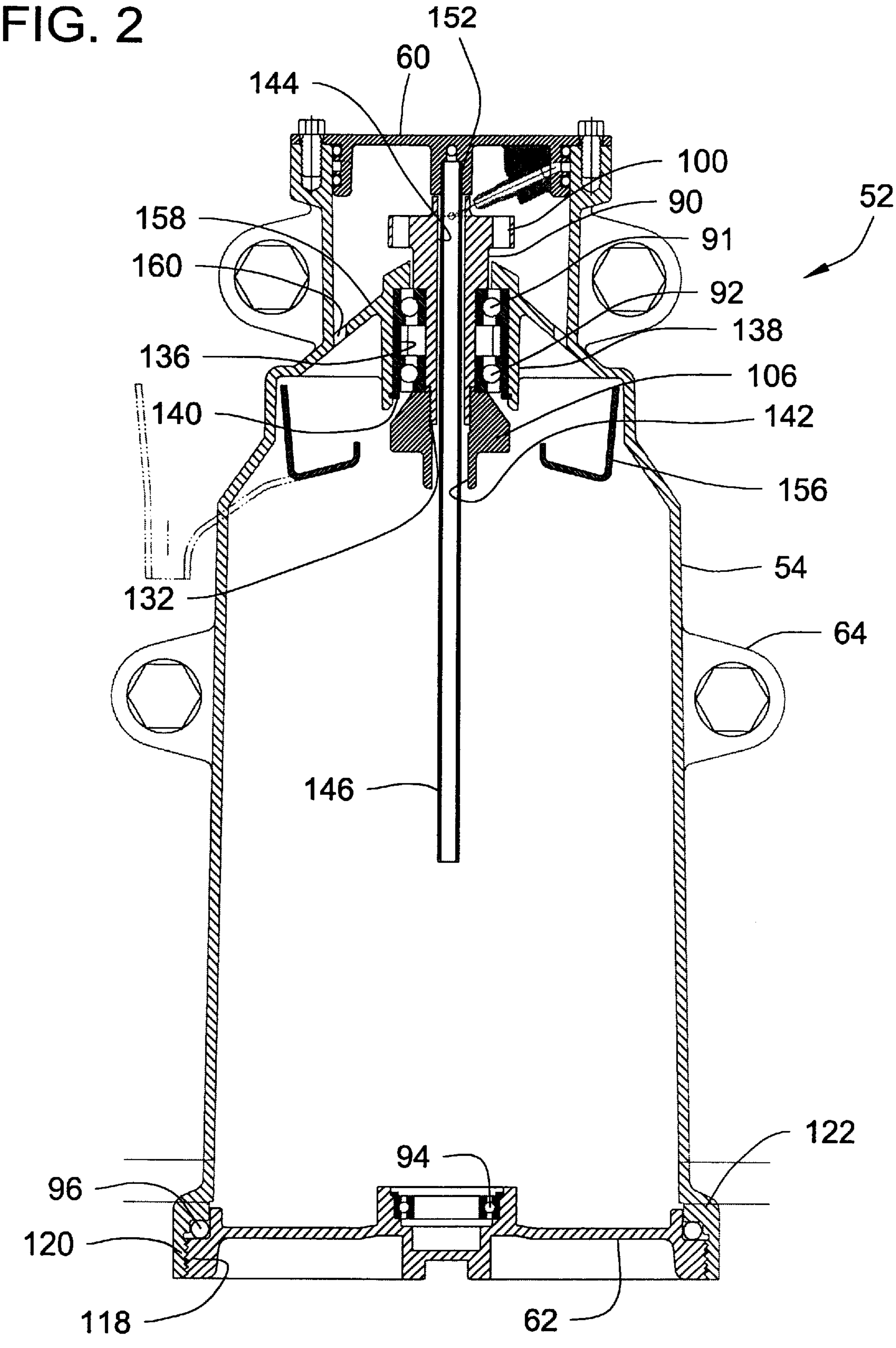
FIG. 2 is a sectional view of the housing without the centrifuge installed.
Figure 3:
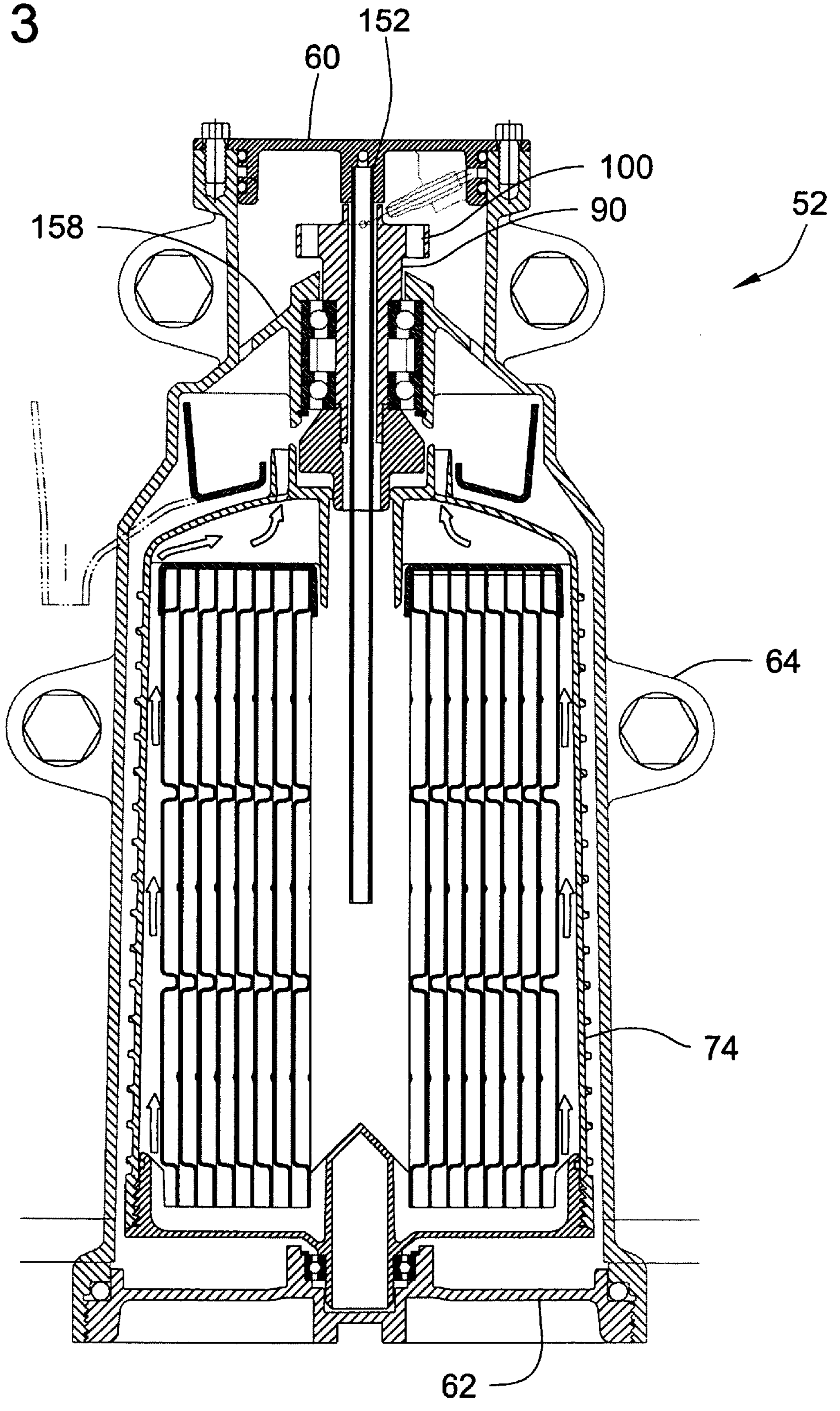
FIG. 3 is a perspective sectional view of the first embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Referring now to the drawings, FIGS. 1–46 illustrate several embodiments of the present invention which demonstrate certain workable concepts for a successful centrifuge filter. The currently preferred embodiment incorporating many of the concepts of the embodiments shown in FIGS. 1–46 is shown in FIGS. 47–70 and will be described later in further detail. As discussed above, the present invention is primarily directed toward use in conjunction with engines, particularly diesel engines, and the filtering of oil therefor. In addition to having use as a filter for removing soot from oil, the filter of the present invention may also be used or adapted in other industrial applications where a high speed centrifugal filter is desired. The present invention therefore provides a filter which is cost effective to manufacture, rugged, attains high speeds, and which lends itself to easy maintenance.

Among other things, the present invention is directed to the unique features of the centrifuge housing, replaceable centrifuge cartridge, contaminant trap in the centrifuge cartridge, drive mechanics, method for manufacturing the filter, method for removing soot from oil, and method for allowing the centrifuge body to be easily removed and replaced. The present invention is directed towards individual components such as the replaceable centrifuge cartridge and the stationary housing, and also towards the combination of the centrifuge cartridge and stationary housing and how the combination is used with an engine to separate soot from oil in the preferred application.

Figure 8:
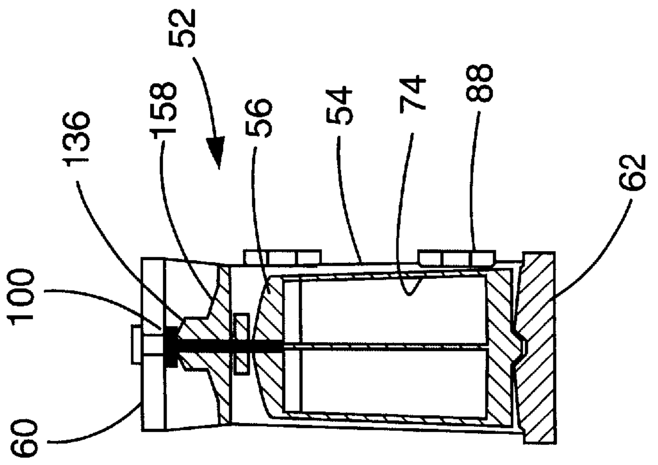
FIG. 8 is a sectional view of FIG. 7 taken along the line 8—8.
Figure 7:
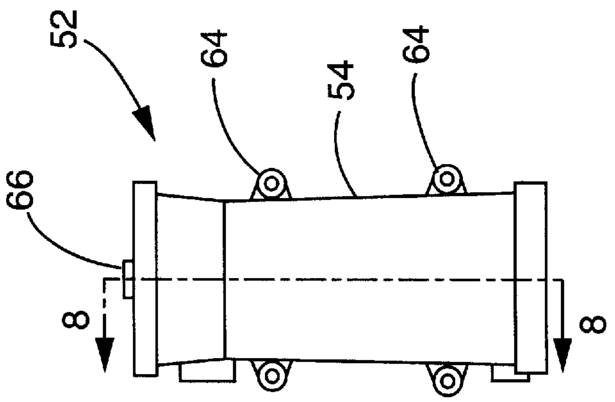
FIG. 7 is a front view of a first embodiment of the filter housing.
Figure 9:
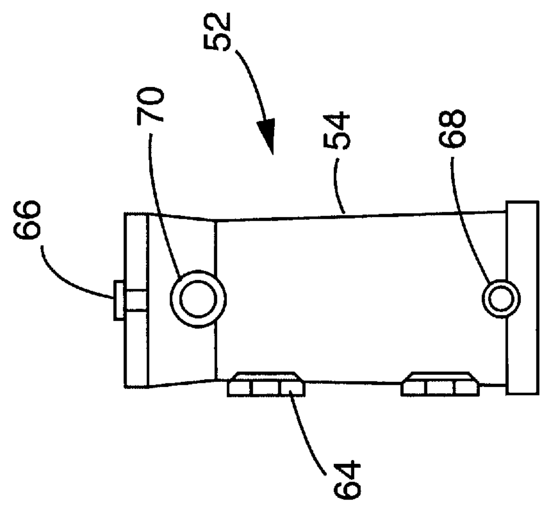
FIG. 9 is a left side view of FIG. 7.

In accordance with these objectives and with specific reference to FIG. 1, centrifuge filter 52 in a first embodiment includes an outer housing 54 having a substantially cylindrical shape with an upper end closed by removable housing top lid 60, and a bottom closed by removable housing bottom lid 62, as will be discussed in further detail herein. As can also be seen in FIG. 1 as well as FIGS. 2–3 and 7–8, housing 54 includes mounting brackets 64 for attachment to an engine. FIGS. 7–9 also indicate that housing 54 includes oil inlet 66, turbine oil drain port 70, and filter oil drain port 68.

Figure 4:
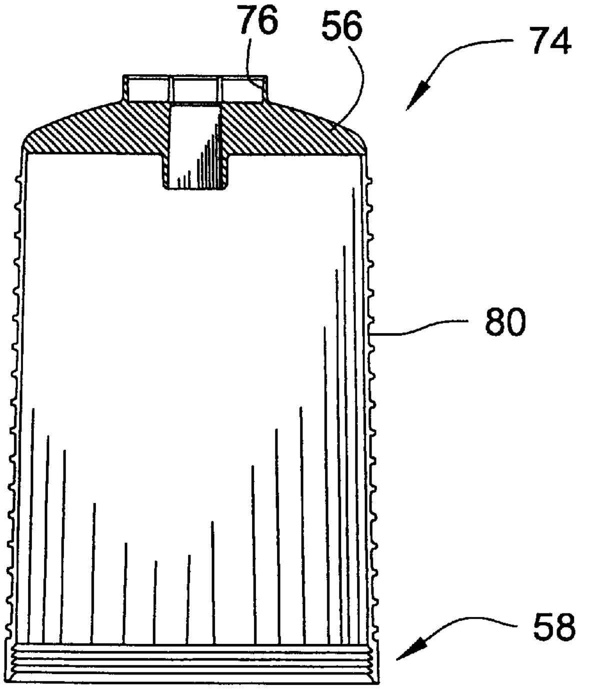
FIG. 4 is a sectional view of the centrifuge body.
Figure 5:
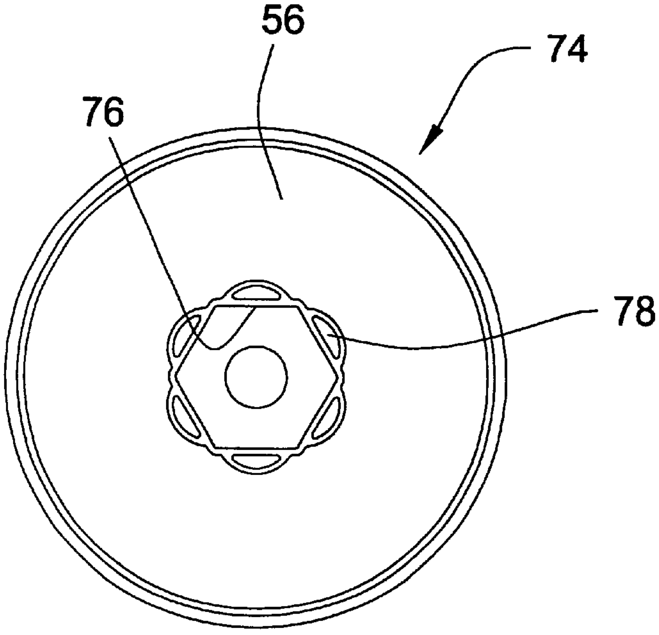
FIG. 5 is a top view of the centrifuge body.

It can be seen that within housing 54, centrifuge body 74 is mounted for rotation. Centrifuge body 74 is typically made of plastic to facilitate incineration and disposal. As shown best in FIG. 5, centrifuge body 74 includes a substantially cylindrical outer wall 80 having stress relieving ribs 82, and upper end 56 with hexagonal recess 76. As will be discussed in further detail herein, hexagonal recess 76 interacts with hexagonal drive 106 for purposes of rotating centrifuge body 74. As shown in FIGS. 4 and 5, a plurality of oil outlets 78 are provided around the periphery of hexagonal recess 76. Oil outlets 78 provide a mechanism by which filtered oil can be returned to the sump of the engine in the direction indicated by arrows 108 of FIG. 1.

Lower end 58 of centrifuge body 74 is closed by centrifuge lid 88. As shown best in FIG. 1, centrifuge body 74 includes threads 110 which mate with threads 112 on centrifuge lid 88 to allow lid 88 to be easily removed and attached to centrifuge body 74 for installation and inspection of containment trap 114 and/or centrifuge body 74. This centrifuge lid may also be ultrasonically bonded or glued to the body. When assembled, it can be seen that centrifuge lid 88 includes hub 116 which serves as one surface about which centrifuge body 74 is rotated. Ball bearing 94 is provided within housing bottom lid 62 to support this rotation. It should also be noted from FIG. 1 that housing bottom lid 62 includes threads 118 which are adapted to engage threads 120 provided on housing 54 to allow housing bottom lid 62 to be removed. An O-ring 96 is provided between housing bottom lid 62 and shoulder 122 of housing 54 to prevent leakage.

Figure 12:
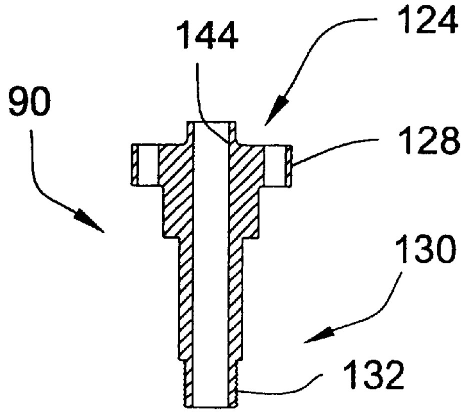
FIG. 12 is a sectional view of the turbine shaft.
Figure 11:
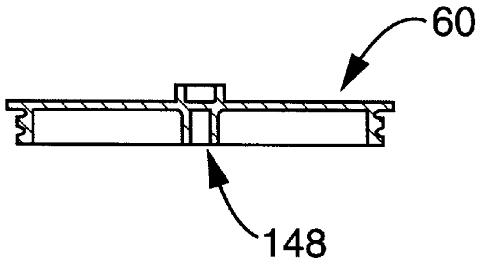
FIG. 11 is a sectional view of the housing top lid.
Figure 10:
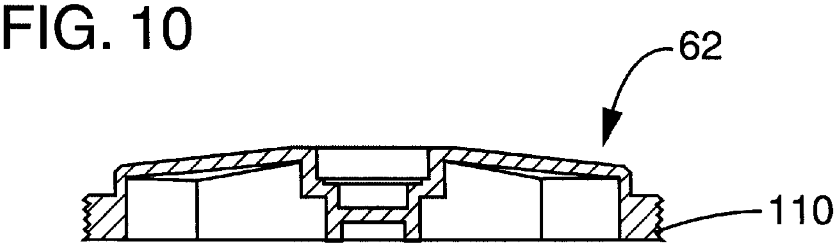
FIG. 10 is a sectional view of the housing bottom lid.
Figure 6:
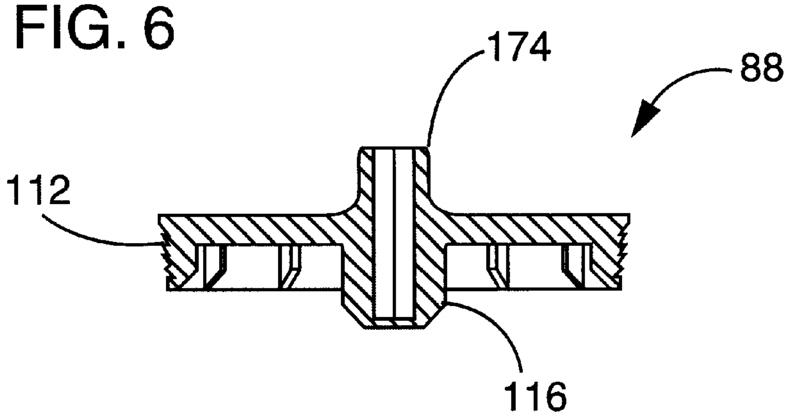
FIG. 6 is a sectional view of the centrifuge body lid.

The upper end of centrifuge body 74 is supported for rotation by drive shaft 90. As shown in FIGS. 1 and 12, drive shaft 90 includes upper end 124 which is adapted to support turbine 100. More specifically, boss 128 is provided below upper end 124 to support turbine 100. Lower end 130 of drive shaft 90 includes threads 132 which are adapted to engage hexagonal drive 106 such that rotation of turbine 100 causes rotation of drive shaft 90 which in turn causes rotation of hexagonal drive 106, which in turn causes rotation of centrifuge body 74. By placing turbine 100 at the top of filter 52, the centrifuge body 74 can be replaced from the bottom, creating a maintenance benefit in that such maintenance is typically performed from a pit below the vehicle.

As shown in FIG. 12, lower end 130 is supported for rotation by first and second sets of angular contact, low drag ball bearings 91 and 92 separated by spacer 136. Ball bearings 91 and 92 as well as spacer 136 are in the preferred embodiment press-fit into cylindrical channel 138 of housing 54. Channel 138 and housing 54 are preferably manufactured form die-cast aluminum and spacer 136 is preferably made of steel. The hexagonal drive 106 is threaded onto drive shaft 90 sufficiently tight to preload the bearings. An adhesive is used on the threads to keep the preload intact. Bearings 91 and 92 are held in place vertically by retaining ring 140. The bearings receive the rotary force of the turbine, the light thrust load from the weight of the moving part, and the heavier thrust load and procession (gyroscope) forces generated as a result of vehicle motion. The thrust loads from motion are expected to be light since the centrifuge is filled with oil and will thus dampen excessive motion. Since the bearings are permanent and reusable, the cost to maintain the engine is kept to a minimum.

Figure 13:
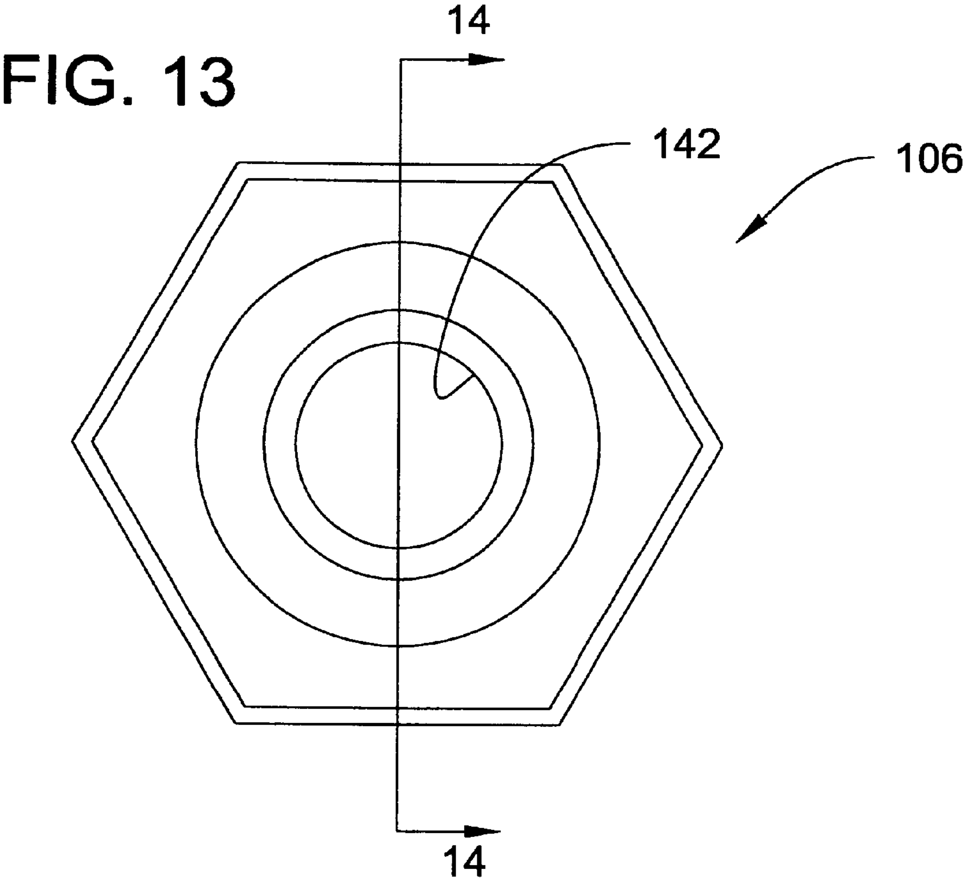
FIG. 13 is a top view of the hexagonal drive.
Figure 14:
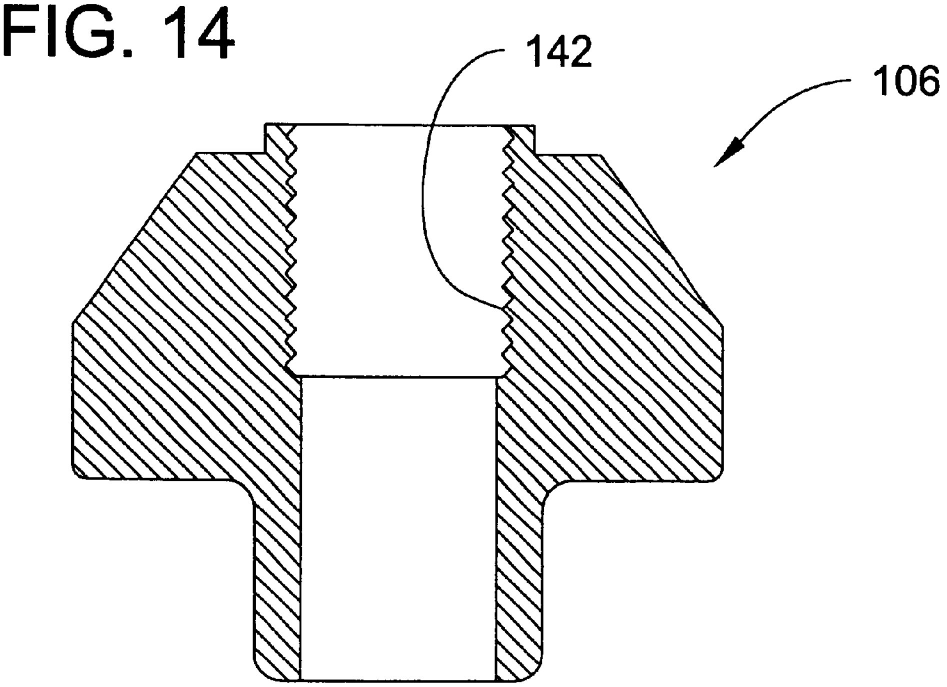
FIG. 14 is a sectional view of FIG. 13 taken along line 14–14.

With regard to hexagonal drive 106, it is more specifically shown in FIGS. 13 and 14 as having a hexagonal shape adapted to complement the hexagonal shape of recess 76 to securely engage drive shaft 90 with centrifuge body 74 such that rotation of turbine 100 causes centrifuge body 74 to rotate as well. Hexagonal drive 106 includes interior channel 142 which is in fluid communication with interior channel 144 of drive shaft 90 to allow for passage of oil to be filtered.

Therefore, upon oil to be filtered entering housing 54 through inlet 66, it is impinged upon the vanes of turbine 100 causing turbine 100 to rotate. This in turn causes the centrifugal body 74 to rotate with a portion of the oil flowing through channels 142 and 144 and into centrifugal body 74 through tube 146. Preconcentrated oil is intended to pass through tube 146, with non-preconcentrated oil driving turbine 100. Preconcentrated oil is oil treated to facilitate agglomeration of soot within the oil into larger particles. Tube 146 includes upper end 150 which includes threads 152 for attachment to housing top lid 60 at receiver 148. Therefore, when housing bottom lid 62 is removed and centrifuge body 74 is removed, tube 146 remains attached to housing 54 along with turbine 100, drive shaft 90 and hexagonal drive 106. Upon oil passing through tube 146, the oil passes radially outwardly through containment trap 114, the structure of which will be described in further detail herein. However, upon passing through containment trap 114, the soot from the oil will be retained within the containment trap and the filtered oil will pass into annular plenum 154 between containment trap 114 and centrifuge body 74. The filtered oil will then pass upwardly through centrifuge body 74 and out of body 74 in the direction indicated by arrows 108 to trough 156. Trough 156 then funnels filtered oil through outlet 32 and back to the engine. Trough 156 also serves the function of preventing the oil used to impinge against the turbine blades 76 from detrimentally engaging centrifuge body 74 and therefore slowing the speed of rotation.

More specifically, upon the oil impinging upon turbine 100, it can be seen that the oil is directed via conical surface 158 of housing 54 downwardly to drainage ports 160. Alternatively, the oil can be drained directly from housing 54 through a side thereof. However, if the oil passes through drainage ports 160, it will flow downwardly and be collected by trough 156. As indicated earlier, trough 156 will then direct the oil through an outlet of housing. Trough 156 therefore will again protect the oil from contacting and slowing the speed of rotation of centrifuge body 74. It can therefore be seen that conical surface 158 and trough 156 combine to serve as a guard to prevent the oil impinging against the turbine 100 from contacting centrifuge body 74.

Figure 15:
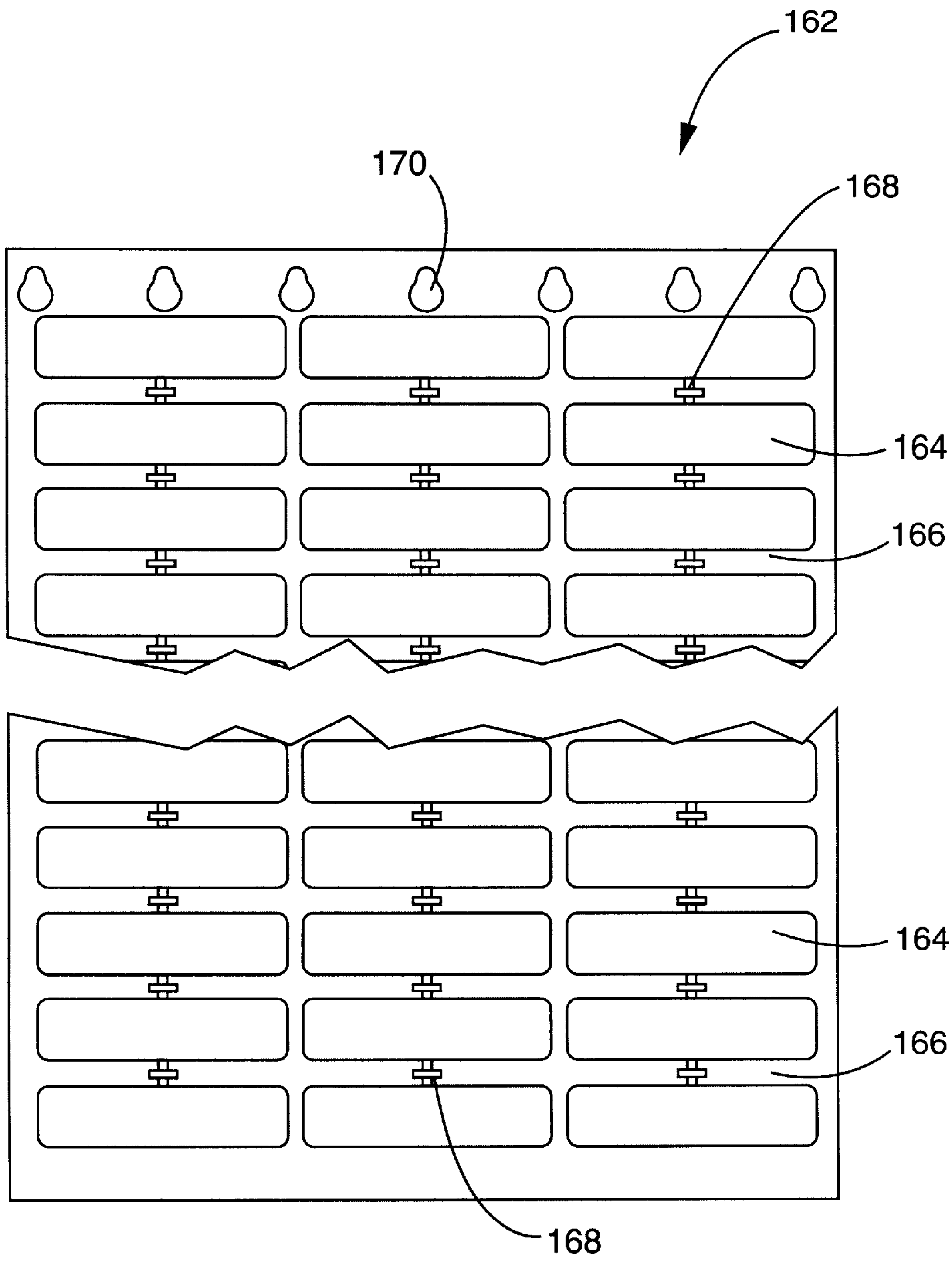
FIG. 15 is a plan view of the containment trap media.
Figure 16:
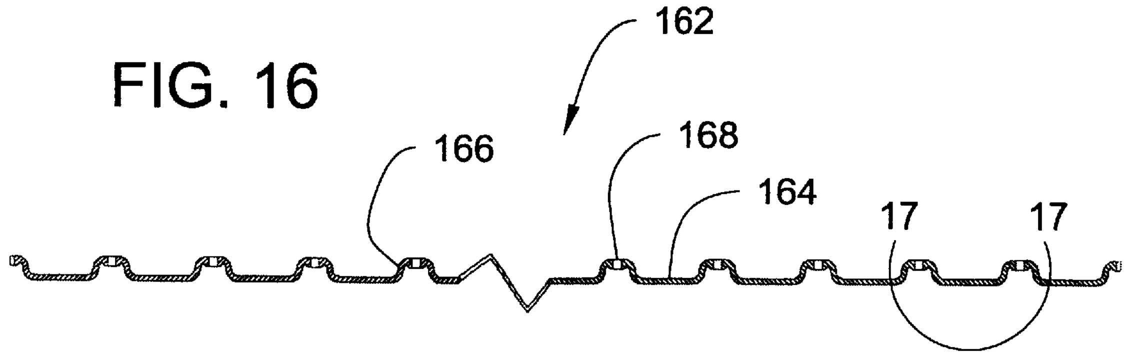
FIG. 16 is a side view of FIG. 15.
Figure 17:
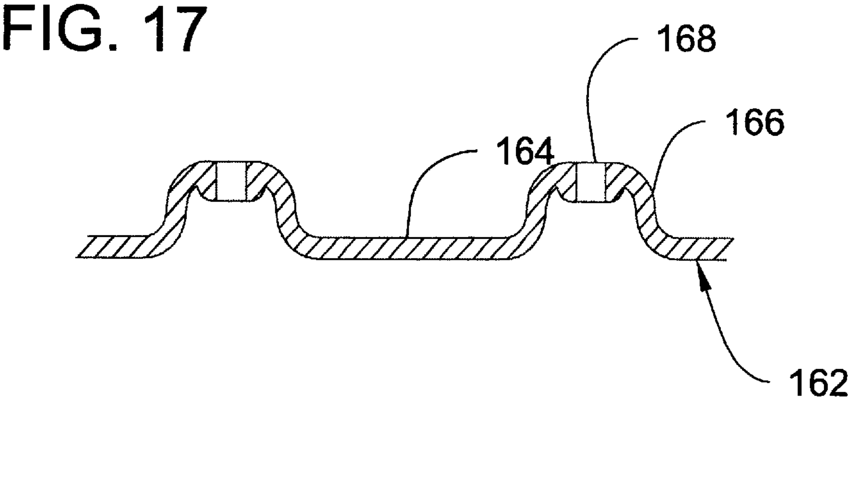
FIG. 17 is an enlarged sectional view of area 17 of FIG. 16.

With regard to the actual construction of containment trap 114, it can be seen from FIGS. 15–17 that in the preferred embodiment of the present invention, containment trap 114 is comprised of a planar sheet 162 wrapped in a spiral pattern to provide multiple levels which oil must pass in a radially outwardly manner in order to clear the trap. The planar sheet 162 is preferably manufactured from Noryl GTX 626 plastic resin having a thickness of approximately 0.030". The plastic is extruded and includes a plurality of depressions 164 which are vacuum formed therein. It is depressions 164, as will be discussed herein, which serve to collect the soot from the oil, with the ridges 166 between depressions 164 containing oil outlets 168 which allow the oil to pass radially outward as the centrifuge rotates and allowing the soot to collect within depressions 164.

To form containment trap 114, planar sheet 162 includes a plurality of winding apertures 170 which are adapted to be affixed to complementary protrusions on a winding mandrel (not shown). The mandrel is then rotated to allow the planar sheet 162 to be wrapped in a spiral pattern with the depressions extending radially outwardly, and therefore the ridges 166 extending radially inwardly as the planar sheet 162 is wrapped. The winding mandrel is then removed and centrifuge lid 88 is attached to the lower end of containment trap 114. More specifically, central hub 174 of centrifuge lid 88 engages the center cylinder of containment trap 114. End cap 176 is then attached to the top of containment trap 114 and cap 176 includes open center 178 which is sized to frictionally engage legs 180 extending downwardly from hexagonal recess 76 and thereby center containment trap 114 within centrifuge body 74.

Figure 18:
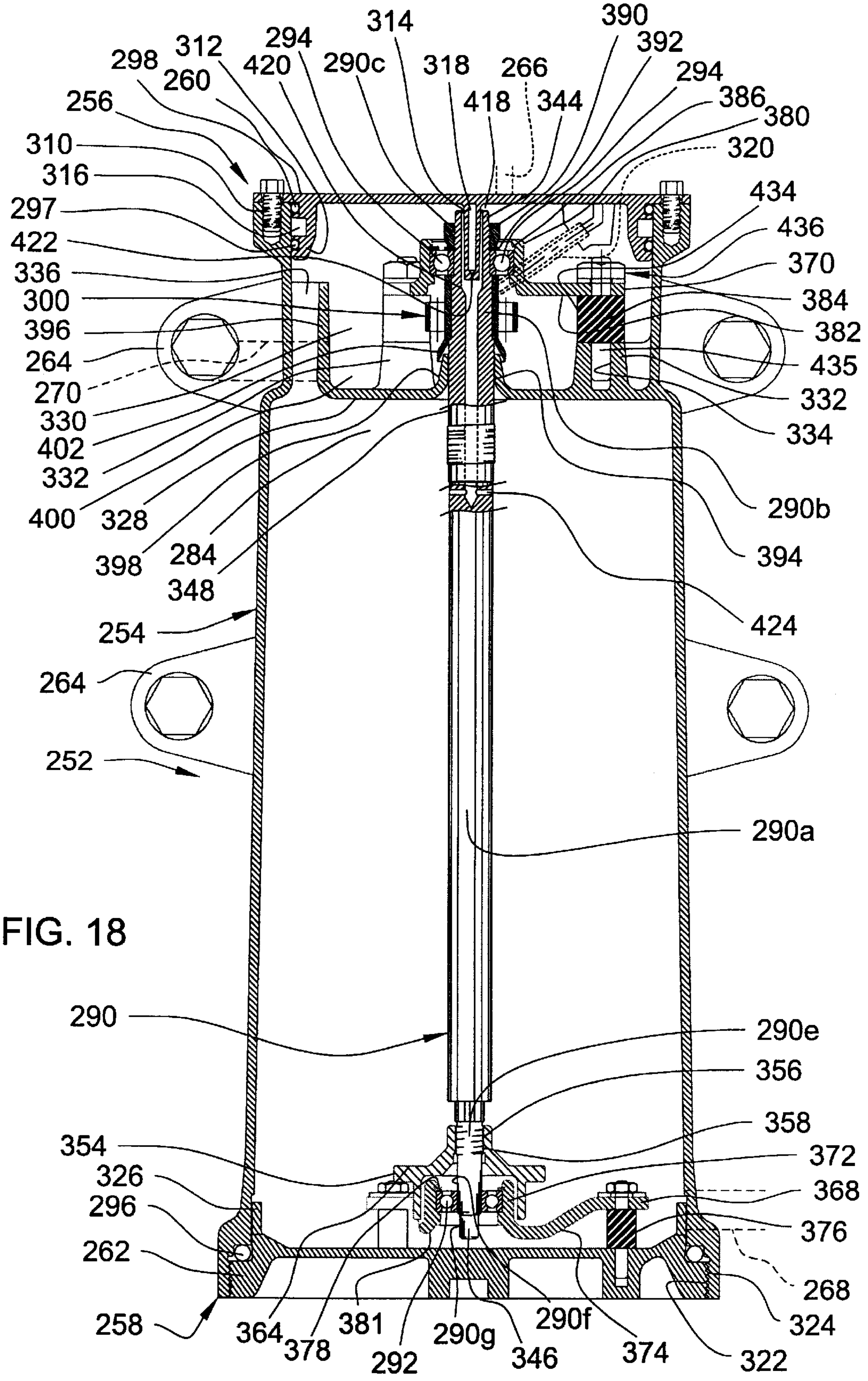
FIGS. 18 and 19 are sectional views of another embodiment of the present invention, where
Figure 19:
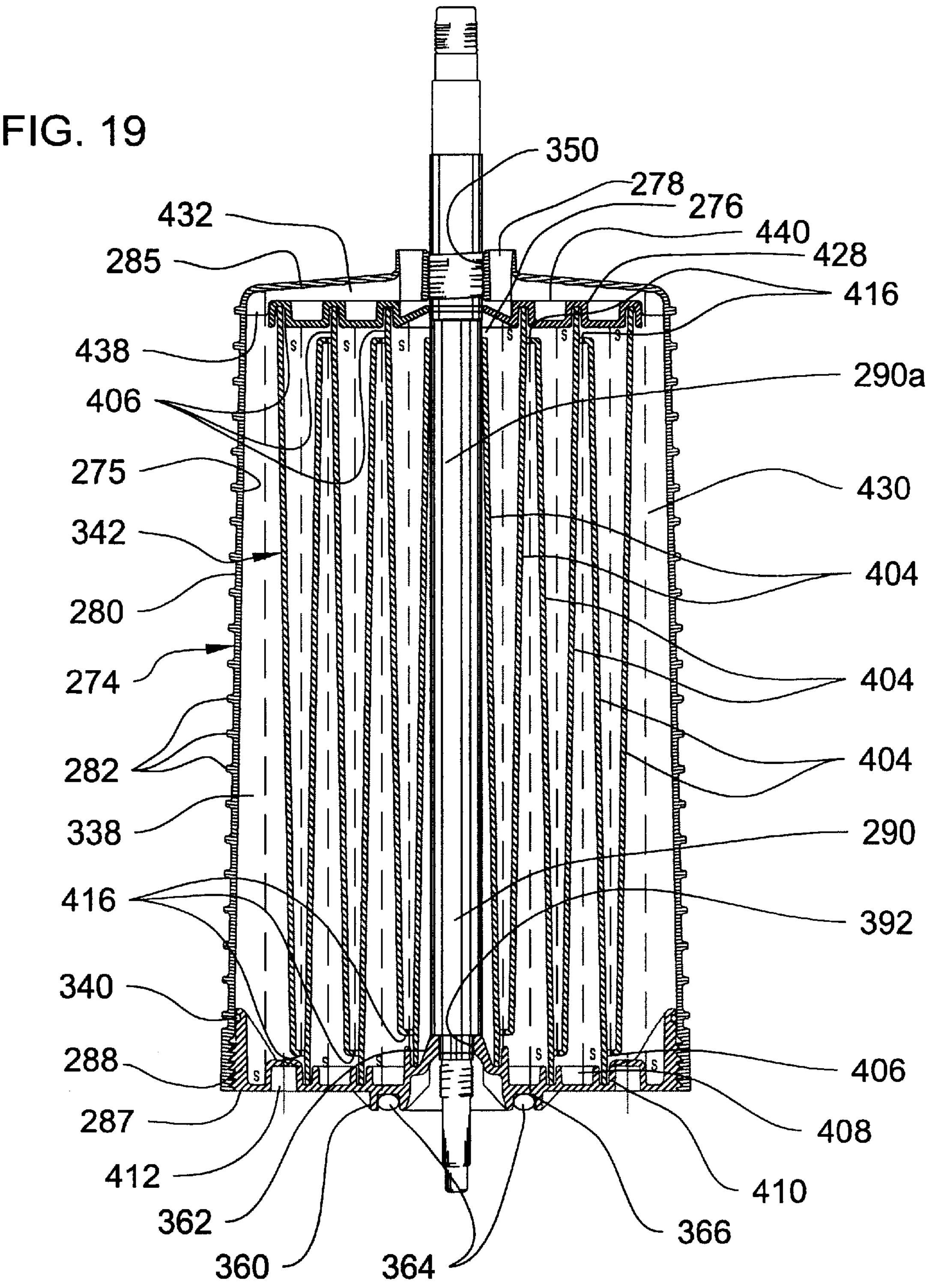

With specific reference to FIGS. 18 and 19, a second embodiment of the present invention is generally depicted as centrifuge filter 252. Centrifuge filter 252 in this embodiment, includes an outer housing 254 having a substantially cylindrical shape with a top end 256 closed by removable housing top lid 260, and a bottom end 258 closed by removable housing bottom lid 262. FIG. 18 indicates that housing 254 includes an external oil inlet port 266, turbine oil drain port 270, and filter oil drain port 268. Although two outlet drain ports 270, 268 are shown in the present embodiment, an alternative embodiment can include a single outlet drain port in which expanded turbine oil and filtered oil are mixed for return to the engine oil sump. As can also be seen in FIG. 18, the housing 254 includes external mounting brackets 264 for attachment to an engine.

The housing top lid 260 is removably attached to the outer housing to allow for inspection and maintenance of internal filter components inside the housing 254 near the top end 256. In the present embodiment, threaded fasteners 310 attach the top lid 260 to the outer housing 254. The housing top lid 260 provides the oil inlet port 266 for receiving oil from the engine, an annular axially extending rim 312 that is closely received by the inner cylindrical surface of the housing 254 and a central axially inward extending stem 314 portion. The rim 312 provides an annular groove 316 substantially sealed between two O-ring gaskets 297, 298 that communicates via a passageway (not shown) with the oil inlet port 266 for receiving pressurized oil from the engine. The annular groove 316 is connected to an axially extending passageway 318 in the stem 314 via a cross passage (not shown) for feeding oil into the housing 254. The housing top lid 260 also supports a nozzle 320 that communicates with the annular groove 316 via a passageway (not shown) for discharging and directing pressurized oil.

The bottom lid 262 includes threads 322 which mate with threads 324 of the bottom end 258 of the housing 254 to allow lid 262 to be easily removed and attached for inspection, installation and replacement of the centrifuge body 274. The bottom lid 262 preferably includes guide projections 326 that pilot the lid threads 322 onto the housing threads 324 during attachment. An 0-ring gasket 296 is compressed between the bottom lid 262 and the bottom end 258 of the outer housing 254 to prevent leakage from the filter 252 and contaminants from entering the filter.

The outer housing 254 also includes a support floor 328 which generally divides the inside of the housing 254 into a turbine drive chamber 330 and a centrifuge chamber 284. The support floor 328 includes three bosses 332 providing tapped holes 334. A vent 336 fluidically connects the drive chamber to the centrifuge chamber 284.

Figure 20:
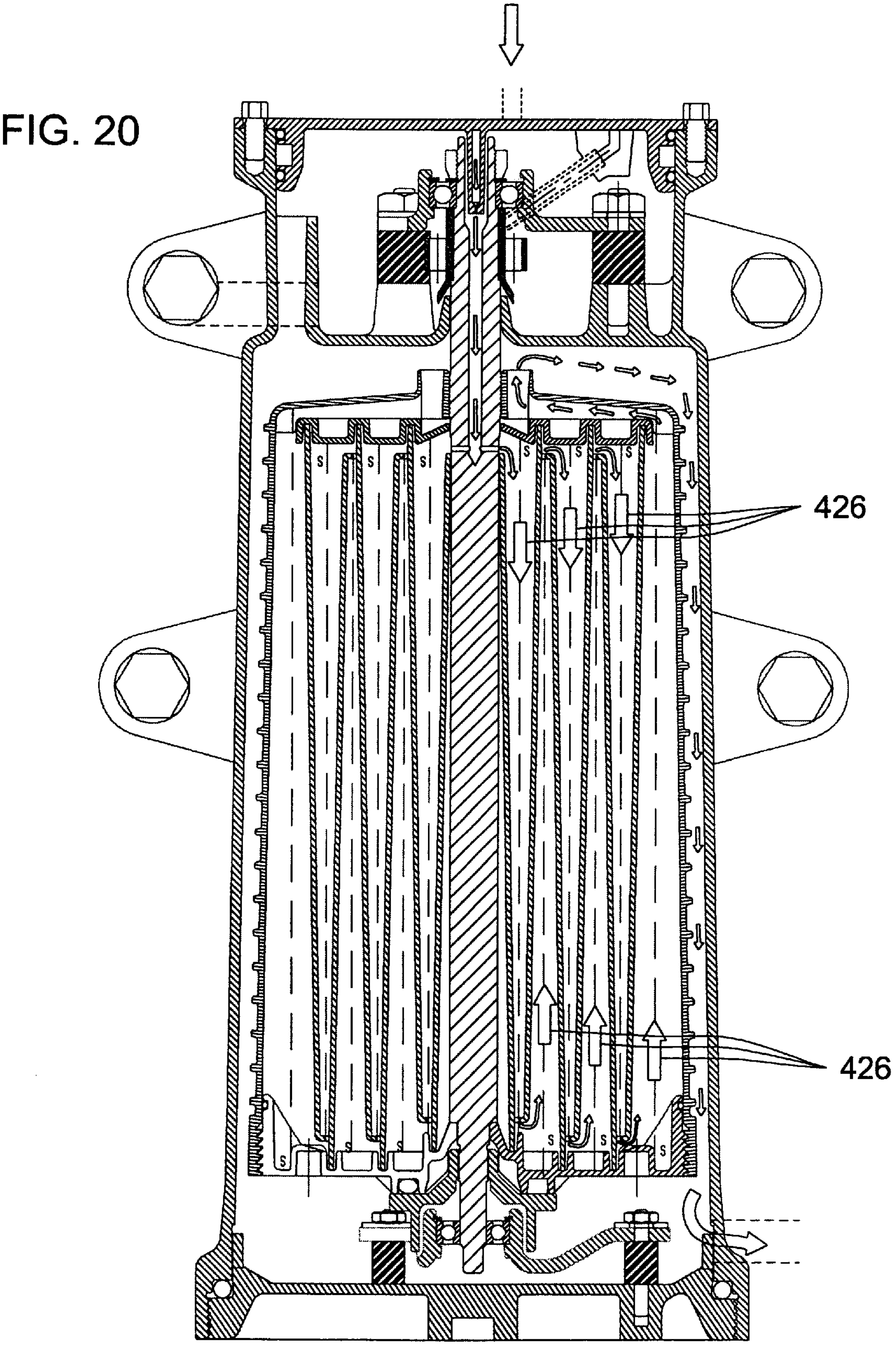
FIG. 20 is the same sectional view of the cartridge of FIG. 19 inserted into the housing of FIG. 18, shown in operation with flow lines indicating the flow path of oil through the contaminant trap of the centrifuge cartridge.

The centrifuge body 274 is shown in FIG. 19 and is designed to be disposed in the centrifuge chamber 284 as shown in FIG. 20. Centrifuge body 274 is preferably made of plastic to facilitate incineration and disposal. The centrifuge body 274 includes a slightly conical or substantially cylindrical axially extending outer sidewall 280 that preferably angles slightly radially inward from bottom to top with a plurality of stress relieving ribs 282, and a filter trap chamber 338 disposed between upper and lower closed ends 285, 287. The upper closed end 285 may be integrally connected with the sidewall 280 and provides a central centrifuge inlet 276 and a plurality of centrifuge outlets 278 disposed radially thereabout. The lower closed end 287 is provided by a lower end cap 288 that is threadingly mated, ultrasonically bonded, glued or otherwise attached to the sidewall 280. A gasket 340 is preferably seated between the lower end cap 288 and the sidewall 280 for preventing contaminants from exiting the centrifugal body 274. A contaminant trap 342 is disposed in the filter trap chamber 338 for filtering fluid such as oil flowing from the centrifuge inlet 276 to the outlets 278.

A drive shaft 290 is mounted for rotation in the housing 254 and is secured to the centrifuge body 274 for rotating the body. The drive shaft 290 has a stepped outer surface with large diameter central section **290*a*, and progressively smaller diameter sections 290*b*, 290*c* at the upper shaft end 344 and progressively smaller diameter sections 290*d*, 290*e*, 290*f*, 290*g* at the lower shaft end 346. The larger diameter portion 290*a* has a hexagonal outer surface 348 which is closely received into hexagonal openings 350, 352 in the upper and lower ends 285, 287 of the centrifuge body 274 for radial retention of the centrifuge body 274 on the drive shaft 290. To provide for tight axial and radial retention in the case of a plastic centrifuge body 274, the hexagonal openings 350, 352 are reamed to the desired precision after the centrifuge body 274 is molded taking into consideration the different thermal expansion coefficients of plastic and metal. Radial retention and torque transfer is provided by the intermitting hexagonal geometry of the openings 350, 352 and the hexagonal outer surface 348 of the larger diameter section 290*a* of the drive shaft 290. Axial retention is provided by a metal nut 354 that has threads 356 which thread onto to corresponding threads 358 on the second smaller diameter section 290*e* of the drive shaft 290. The nut 354 engages an annular rim 360 on the centrifuge body 274 to urge the centrifuge body 274 upwards. The centrifuge body 274 includes a radially inward lip 362 which is closely fitted on the first smaller diameter portion 290*d* and engages the larger diameter portion 290*a* to resist the nut 354 and axially retain the centrifuge body 274 on the drive shaft 290. The centrifuge body preferably includes a resilient gasket 364 seated in a groove 366 of the annular rim 360 and compressed between the nut 354 and the centrifuge body 274 to prevent leakage therebetween and to prevent the steel nut 354 from "backing off" due to vibration. The last smaller diameter section 290*g* of the drive shaft 290 includes a hexagonal periphery to allow tools to grip and hold the drive shaft 290 when the steel nut 354 is being threaded on and off the drive shaft 290**.

To retain the drive shaft 290 to the housing 254 while allowing for rotation thereof, the filter 252 includes bottom and top bearing flanges 368, 370 or other bearing supports that interact with the upper and lower ends 344, 346 of the drive shaft 290. The bottom bearing flange 368 has a central hub 372 and a plurality of radially extending legs 374. The legs 374 are connected to the bottom lid 262 by resilient fasteners 376, resilient connectors or other such form of vibration isolators that reduces or dampens vibrations or shock loads transmitted therethrough. In the preferred embodiment each resilient fastener 376 includes a split threaded shaft 290 that has one end threadingly mated in a threaded opening of a boss 332 and another end slidably fitted through a smooth or threaded opening in a leg 374 of the bearing flange 368. A resilient rubber piece 434 or other resilient member is secured between the split and surrounds the threaded shaft 290 and is compressed between the leg 374 and the boss 332. A nut and washer indicated at 436 fasten the leg 374 by compressing the rubber piece 434 to axially retain the bearing flange 368. The central hub 372 of the bearing flange 368 carries ball bearings 292 press fit therein that closely receive the third smaller diameter section 290*f* of the lower end 346 of the drive shaft 290 for radial retention of the drive shaft 290. The outer race of the ball bearings 292 is secured between a clip or snap ring 378 and a radially inward shoulder 381 of the hub 372. The ball bearings 292 allow the shaft 290 to rotate relative to the flange 368.

Likewise, the top bearing flange 370 has a central hub 380 and a plurality of radially extending legs 382. The legs 382 are connected to the threaded bosses 332 of the support floor 328 by resilient fasteners 384, resilient connectors or other vibration isolators. The resilient fasteners 384 similarly include a threaded shaft, a rubber piece and a nut and washer and operate in the same manner as for the upper bearing flange 368. The central hub 380 carries ball bearings 294 press fit therein that closely receive the second smaller diameter section 290*c* of the upper end 344 of the drive shaft 290 for radial and axial retention of the drive shaft 290. The ball bearings 294 facilitate rotation of the shaft 290 relative to the flange 370. The outer race of the ball bearings 294 is secured between a clip or snap ring 386 and a radially inward shoulder 388 of the hub 380. To provide for axial retention, a nut 390 and lock washer 392 threaded onto a threaded end 344 of the drive shaft 290 or other lock engage the inner race of the ball bearings 294 urging them against a larger diameter section 290*b* of the drive shaft 290. It is an advantage that only two ball bearings 292, 294 are necessary in the preferred embodiment which minimizes frictional losses thereby allowing for greater rotational speeds of the centrifuge.

It is an advantage that the two ball bearings supports the axial and radial loads of the shaft 290 and the centrifuge cartridge 274 during operation while allowing the centrifuge cartridge 274 to rotate at high speeds, preferably of about 11,000–12,000 rpm to achieve a force of about 10,000 times gravity. It is an advantage of the preferred embodiment that the vibration isolators supporting the bottom and top bearing flanges 368, 370 cushion the ball bearings 292, 294 from vibrations induced from the vehicle, engine, or other source. By using the resilient fasteners 376, 384 as vibration isolators, vibration is cushioned from inducing undesirable radial and axial shock loads on the ball bearings. This increases the life span of the ball bearings 292, 294 and filter 252. The rubber isolators also serve the desirable purpose of inhibiting vibration and resultant noise from the rotating parts to the centrifuge housing 254 where large surfaces can amplify noise. The resilient nature of the resilient fasteners 376, 384 also provides for easier installation of replacement centrifuge filter cartridges. Without the bottom lid 262 installed, the shaft 290 is hanging from the upper flange 370 in a cantilever fashion. When the bottom lid 262 and bottom bearing flange 368 is slid onto the drive shaft 290 the resilient nature of the upper rubber/steel fasteners 376, 384 tolerates small misalignments between the two ball bearings 292, 294 thereby facilitating easier installation. This also allows for greater tolerances in the formation of various filter components thereby decreasing the cost of manufacturing and assembling the filter.

The centrifuge body 274 and drive shaft 290 may be driven by a turbine 300 that includes a plurality of blades driven from pressured oil directed by the nozzle 320. However, in alternative embodiments, the drive shaft and centrifuge filter may be driven by an air motor, electric motor, mechanically from of the engine, or by other suitable driving means. The turbine 300 is secured to the upper end 344 of the drive shaft 290 for torque transfer by a splined or keyed connection (not shown), or by providing mating flat surfaces between the shaft 290 and turbine 300, or by any other acceptable coupling means. The turbine 300 is slidably fitted on the first smaller diameter section 290*b* of the upper end 344 of the drive shaft 290 and is retained axially by being sandwiched between the inner race of the upper ball bearings 294 and the larger diameter portion 290*a* of the drive shaft 290. The drive shaft 290 projects through a central opening 394 in the support floor 328 to connect the turbine 300 to the centrifuge body 274. The support floor 328 is generally bowl shaped with upwardly extending outer sidewalls 396 and inner sidewall 398 near the opening 394 to form a trough 400. During operation, the trough 400 collects the oil that drives the turbine 300 and returns the oil to the turbine oil outlet port 270. Some of the oil impinging on the turbine 300 splatters and becomes airborne which advantageously causes an oil soaked atmosphere throughout the turbine chamber 330 which lubricates the upper ball bearings 294. The oil soaked atmosphere is communicated through the vent 336 in the floor 328 to lubricate the lower ball bearings 292 as well. The turbine 300 preferably includes a shield or skirt 402 for preventing oil exiting the turbine 300 from entering the central opening 394 and causing torsional drag on the spinning drive shaft 290 and centrifuge body 274 during operation.

Turning to other features of the present invention, a radially extending plate or top end cap 428 is disposed inside the centrifuge body 274 in spaced relationship with the top end 285 of the body 274. The top end cap 428 serves as a barrier to prevent oil or fluid flow from the inlet from prematurely exiting through the outlets 278. Radially extending ribs 440 molded into the top end 285 or other spacing means spaces the top end cap 428 from the top end 285 to provide flow passageways 432 from the inside periphery 275 of the centrifuge body 274 to the outlets 278. The end cap 428 has a smaller outer diameter than the inside diameter of the sidewall 280 near the top end 285 to provide flow openings 438 for clean centrifuged oil to enter into the passageways 432. The centrifuge containment trap 342 also acts as spacing means to set the axial position of the top end cap 428. The centrifuge contaminant trap 342 includes a plurality of conical shape trap walls 404 selectively arranged in the centrifuge body 274 for trapping large, heavier contaminant particles therein. The bottom cap 288 of the centrifuge body 274 includes a plurality of ribs 408 and channels 410 for receiving respective bottom ends 406 of the trap walls 404. The bottom cap 288 preferably includes external cavities 412 for receiving a tool (not shown) such as a spanner wrench for screwing the bottom cap 288 onto the centrifuge sidewall 280. The internal top cap 428 similarly includes ribs 408 and channels 410 for receiving respective top ends 406 of the trap walls 404. The ends 406 of trap walls 404 are potted with adhesive between adjacent ribs 408 in the channels 410 otherwise affixed thereto. Each conical trap wall 404 is contained within another wall and has an inner surface that angles inwardly from either top to bottom, or bottom to top (alternatively), which directs oil radially inward before the oil can travel radially outward to the next outer wall. As such, each conical wall provides a separate level to which oil must pass in order to clear the trap. Exit slots 416 are provided near or at the point where adjacent walls 404 meet or connect. In the preferred embodiment, the draft angle is about 1 degree which provides a suitable angle for filtering soot from oil. There are multiple walls 404 and the walls 404 are longer than the radius of the centrifuge body 274 to provide a travel distance for fluid several times the radius of the centrifuge body 274 thereby assisting in providing a long, consistent residence time for fluid in the contaminant trap 342. Also seen in FIG. 20 is that each wall 404 facilitates oil flow primarily in one axial direction that is opposite the direction of the previous adjacent inward wall 404.

As previously mentioned, the centrifuge body has an inlet 276 and a plurality of outlets 278. To communicate fluid to the inlet 276, the drive shaft 290 includes a sleeve portion 418 at the upper end 344 that closely receives the stem 314 of the housing top lid 260 and an axially extending passageway 420 that connects an inlet orifice 422 of the lid stem 314 to the inlet 276 in the centrifuge body 274. The drive shaft 290 provides radially outward extending passages 424 that impel fluid radially outward from passageway 420 into the centrifuge inlet 276 and into the centrifuge body 274 during operation.

During rotation of the centrifuge body 274, fluid flows radially inward along the inside surface of each trap wall 404 and then radially outward through an exit slot 416 to the next level or outer trap wall 404 as indicated by flow lines 426. When spinning, the centrifuge will contain oil equal to the diameter of the upper exit slot 416 and outward, plus some extra oil in the conical trap closest to the centerline of the unit. Heavier particles will migrate radially outward along each conical wall 404 and will congregate and be trapped at the base of each conical wall 404 in areas indicated by letter S until heavier particles displace the now lighter particles to the next radially outward wall 404. Therefore the centrifugal body facilitates communication or movement of lighter fluid such as oil radially outward faster than for heavier fluid or particles such as soot. Once the oil passes all of the trap walls 404, oil is collected in a collection chamber 430 between the outermost trap wall and the centrifuge body sidewall 280. Oil fills this chamber 430 and moves back inward to the outlet ports 278 where the spinning action expels the oil centrifugally outward against the inner surface of the housing 254 where it flows through gravity along the inner surface to the bottom end 258 of the housing 254 where it collects and exits the filtered oil outlet 268. By flowing primarily along the housing 254 and not the centrifuge body 274, torsional drag is minimized.

There are several advantages of the conical shaped contaminant trap 342. The innovative approach of the present invention provides a centrifuge body 274 that is inherently balanced about the central axis (in contrast to the spiral configuration which is inherently unbalanced and may increase in being unbalanced during operation). Balance is achieved because the cross-section of each wall 404 at every point along its axial length is a circle whose center is the axis upon which the centrifuge 274 rotates. This reduces loads on the ball bearings and reduces drag and frictional losses thereby increasing the speed and effectiveness at which the filter can operate for a particular oil working power provided by the nozzle 320. The contaminant trap walls 404 may easily be formed from injection molded plastic with little expense. Moreover, the heaviest and most contaminating particles stay radially inward in the contaminant trap 342 and are less likely to travel outward thereby reducing the possibility of escaping outward, which provides for more effective filtering of oil or other fluid. The center tube or inner most wall 404 of the contaminant trap 342 angles outwardly from top to bottom so that oil flows by gravity and momentum down into the centrifuge body 274. When the device stops spinning, the substance in the centrifuge body 274 is contained on the inside of the unit which prevents the substance inside the centrifuge from escaping during removal of the centrifuge body for replacement with a new cartridge. In accordance with the objective of controlling the residency time of fluid in the contaminate trap 342, the size of the inlet orifice 422 is controlled or a restriction is otherwise selectively sized between the inlet port 266 and the inlet 276 of the centrifuge body 274. For the preferred application of removing soot from oil in automotive applications, the objective is to size the inlet orifice 422 or other restriction so that the flow rate into the centrifuge in gallons per minute is about one fifth to one tenth of the amount of oil (in gallons) contained in the centrifuge when it is spinning. In this embodiment the size of the oil inlet orifice 422 is about 0.009 inches in diameter. This will give an approximately five to ten minute residence time which is the approximate residence time required to centrifuge soot from oil in diesel engine applications. The oil flow rate for the centrifuge is separate from the oil flow through the nozzle 320 to the turbine 300 and is much lower in flow rate. To provide high speeds, the nozzle is properly sized and well machined to get a well contained powerful stream directed at the turbine at an angle and distance which provides for maximum speed for the centrifuge 274. The centrifuge may be adapted to rotate at high speeds of around 11,000 to 12,000 rpm. An alternative way to reach these high speeds is to provide an electric motor, pneumatic driven motor or other suitable driving means for driving the centrifuge fast enough in order to separate the desired contaminant from the fluid.

Another advantage of this preferred embodiment is the serviceability and ease of maintenance of the filter 252. In addition to those serviceability advantages mentioned above, it should be noted that the shaft 290 is easily installed and removed by simply removing the clip 392 on the outer race of the upper bearing 294 so that the shaft 290, upper bearing 294, or turbine 300 can easily be installed or replaced if necessary. Similarly, the lower ball bearings 292 can be removed from the lower housing lid 262 by removing the clip 378 on the outer race. Alternatively the shaft and all the attached parts along with the upper bearing flange may be provided as a single serviced replacement type part. This could be easily removed by removing the three nuts that hold the upper flange 382 to the vibration isolators 384, then the whole assembly could be pulled out from the top of the unit.

As was mentioned the centrifuge body 274 is inherently well balanced. Preferably, the centrifuge body 274 is more precisely balanced by mounting the assembled centrifuge on a balancing machine by a rotating shaft (not shown) at levels A and B. Out of balance conditions can be corrected by removing part of the plastic ribs 408 on the bottom end cap 288 or by adding material at these areas.

From the foregoing it can therefore be seen that this embodiment of the present invention provides a new and improved centrifuge filter for removing soot from engine oil. Through the unique structure of the present invention, the oil is adapted to drive a turbine for rotation of the centrifuge with the oil impinging against the turbine not interfering with rotation of the centrifuge. Moreover, the soot removed from the oil is contained within the contaminant trap and is not able to re-contaminate the filtered oil. The centrifuge housing is adapted to be permanently attached to an engine and is provided with a mechanism by which the centrifuge and contaminant trap can be easily removed for repair and replacement purposes. Moreover, by manufacturing the contaminant body from recyclable materials the costs of manufacture and replacement, as well as the impact upon the environment, are minimized.

Turning then to yet another embodiment depicted in FIGS. 21 and 22, it will be understood that the filter 452 has the same parts and operates in much the same manner as the first embodiment depicted in FIGS. 18–20, and therefore only differently configured parts will be referenced by reference characters and will be discussed below. One difference of the second embodiment is that there is a gap 603 provided between the floor opening 594 and the drive shaft 490. The gap 603 allows the shaft 490 a range of movement to better accommodate vibration and prevents frictional losses. The shield or skirt 602 of the turbine 500 is bent outward at a greater angle to accommodate the larger opening 594. The alternative embodiment of FIG. 21 also eliminates the gasket receiving groove 366 and the resilient rubber gasket 364 and replaces it with a Belleville washer 564, spring washer or other resilient means that is compressed between the annular rim 560 of the centrifuge body 474 and the steel nut 554 which is threadingly fixed to the drive shaft 490. The Belleville washer 564 urges the centrifuge body 474 upward against the larger diameter section 490*a* of the drive shaft 490 to axially retain and fix the position of the centrifuge body 474 on the drive shaft 490. Also shown in the alternative embodiment is that the end cap 488 of the centrifuge housing 474 has a slightly different configuration. More specifically, the end cap 488 is thicker in the axial plane which offsets the ends 606 of the containment trap walls 604 axially inward towards the top of the filter 452. Other than these noted differences, this embodiment operates in much the same manner as that of the embodiment depicted in FIGS. 18–20.

Turning then to the embodiment depicted in FIGS. 23, 24 and 25, it will be understood that the filter 652 has the same parts and operates in much the same manner as the previous embodiments depicted in FIGS. 18–22, and therefore only differently configured parts and differently operating functions will be noted and discussed below.

Instead of using an oil driven turbine, the filter 652 of this embodiment uses an electric motor 700 or other suitable driving means such as an air motor for driving a centrifuge body or cartridge 674 inside a stationary housing 654. The motor 700 is supported by the stationary housing 654, and is preferably supported by the upper multi-legged bearing support flange 770 through the vibration isolators 834 to an internal support floor 728 of the housing 654. The electric motor 700 is mounted inside the filter by an outer casing 846 secured by fasteners 848 to the upper bearing support flange 770. The electric motor 700 includes an outer housing 850 that supports a stator assembly 852 which includes motor windings. The casing 846 and bearing flange 770 provide an outer annular recess 854 which closely receives the motor housing 850 to support and fix the motor 700 both axially and radially. Mounted for rotation within the stator assembly 852 is a rotor 856 which comprises magnets that are secured to the upper end of the drive shaft 690, through mating hexagonal surfaces, a splined connection, or other connection means. The centrifuge drive shaft 690 may also stop short of the motor 700 and be connected to a separate motor shaft by a torque transmitting device such as a hex. By providing an electric motor 700, the speed of the drive shaft 690 and centrifuge cartridge 674 can be easily powered and more precisely controlled.

Figure 21:
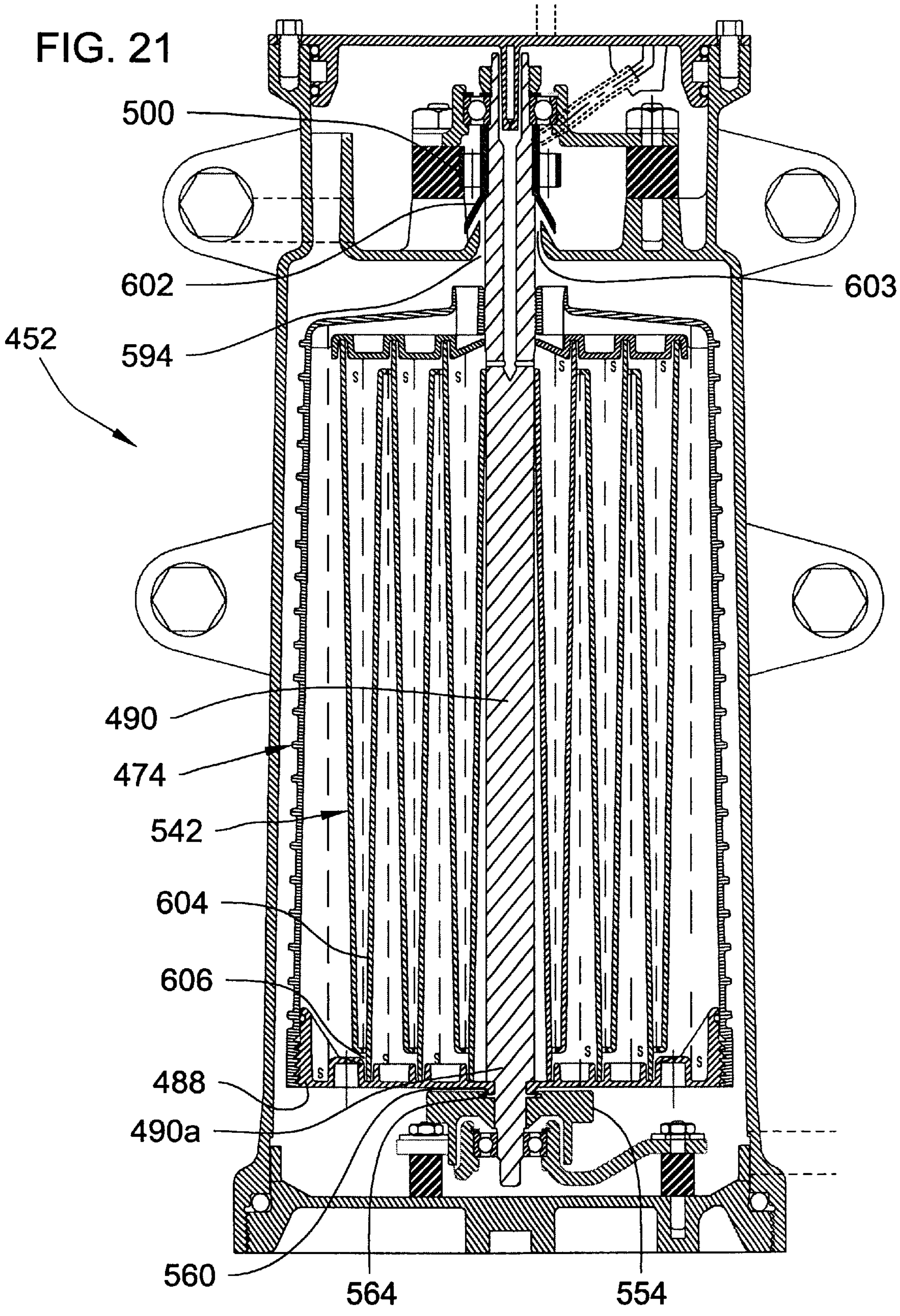
FIG. 21 is a sectional view of another embodiment of the present invention.
Figure 22:
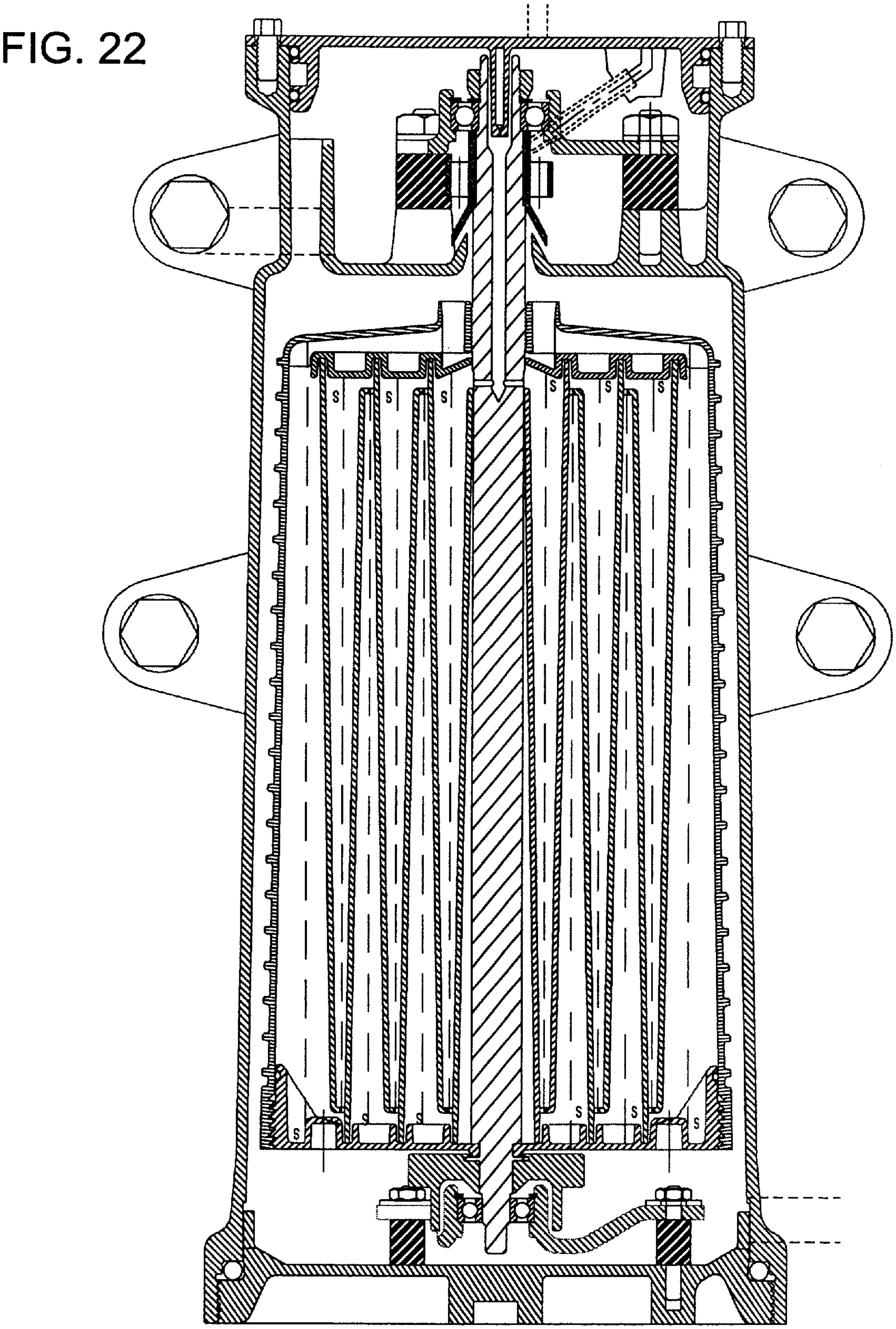
FIG. 22 is the same sectional view as FIG. 21, but shows the bearing flanges and nozzle position from the top and bottom.

The present embodiment also uses two ball bearings for supporting the drive shaft 690, with the lower bearing assembly being the same configuration as the embodiment of FIGS. 21–22. In this embodiment, the upper ball bearings 692 still support the drive shaft 690 both axially and radially, but the configuration of the bearing flange 770 is modified to accommodate the electric motor 700. The ball bearings 692 are sandwiched between a larger diameter portion of the shaft 690 and a nut 840 and washer 842 for axial retention of the drive shaft 690. A cotter key 844 or other locking means holds the nut 840 from vibrating loose from the drive shaft 690.

Another difference of the present embodiment is that the outer inlet port 666 of the filter 652 enters from the side of the housing 654 rather than the top of the housing. The inlet port 666 extends axially inward via an inlet passage 824 towards the center of the centrifuge cartridge 674 for discharging oil into inlets 676 of the centrifuge. The stationary housing inlet includes an inlet orifice 822 or restriction that is selectively sized to control the rate at which oil flows into the centrifuge 674 and therefore the residency time of oil within the centrifuge cartridge. The size of the restriction or inlet orifice 822 is determined by dividing the effective fluid holding volume of the centrifuge (during operation) by the desired residency time for fluid inside the centrifuge cartridge 674. For the application of removing soot from oil, an approximate residence time of 10 minutes is desired. Therefore (for an about 0.5 gallon centrifuge cartridge 674) a flow rate of about 0.05 gallons per minute is desired for the preferred embodiment. However, lower residence times of about 2 to 3 minutes may also work for soot removing applications, which would also allow a higher flow rate of oil and therefore more oil to be filtered.

The replaceable centrifuge cartridge 674 of this embodiment is also different than the previous embodiments. The centrifuge cartridge 674 includes an axially extending sidewall 680 with stress relieving ribs 682. A lower end cap 688 is threadingly mated or otherwise connected to the sidewall 680 at the lower end of the centrifuge. At the upper end of the centrifuge, the sidewall 680 extends radially inward to provide a substantially closed upper end portion 686. The upper end portion 686 has a plurality of radially ending ribs 831. An upper end cap 828 is housed inside the centrifuge cartridge 674 and is secured to the upper closed end portion 686. In the preferred embodiment of FIG. 23, the ribs 831 provide deformable pins or rivets 827 that are received through corresponding openings 829 in the upper end cap 828 and are ultrasonically staked or otherwise deformed over the corresponding openings 829 to thereby secure the upper end cap 828 and the upper end closed end portion 686. Between the ribs 831, the closed end portion 686 and the upper end cap 828, there is provided flow passageways 832 that extend radially inward to connect the inside peripheral 675 of the sidewall 680 to a plurality of centrifuge outlets 678.

The upper end cap 828 provides a cylindrical opening 750 that is closely received by a larger diameter segment 690*a* of the drive shaft 690. To provide for balance of the centrifuge cartridge 674 during operation and tight axial retention of the centrifuge cartridge 674 on the drive shaft 690, the opening 750 has a closely controlled tolerance and is preferably machined to get a tighter fit on the larger diameter segment 690*a*. The centrifuge cartridge 674 also includes a center tube 858 that slidably receives the drive shaft 690 and angles radially outwardly from top to bottom. The center tube 858 has a top end 860 potted with adhesive to the upper end cap 827 and a bottom end 860 potted with adhesive to the bottom end cap 688. The center tube 858 prevents oil from leaking radially inward between the centrifuge cartridge 674 and the drive shaft 690 both during operation and when idle. Preferably, the center tube 858 includes a plurality of axial support ribs 862 (FIG. 24) that provide additional support for the upper and lower ends of the centrifuge cartridge 674.

Similar to the previous embodiments, the centrifuge cartridge 674 of the present embodiment has inlets 676 and outlets 678 disposed in close proximity to its axis of rotation and at the upper end of the cartridge 674, so that flow through the centrifuge cartridge is from the inlets 676, downward and radially outward into the centrifuge body 674 and then back radially inward towards the outlets 678, as indicated by flow lines in FIG. 23. The centrifuge outlets 678 are disposed radially outward of the centrifuge inlets 676 so that fluid flows outward to the outlets 678 during rotation of the centrifuge cartridge 674. However, the centrifuge cartridge 674 of this embodiment provides only one chamber 738 or level for centrifuging oil. As shown in FIG. 23, the outer centrifuge sidewall 680 preferably angles radially inward from bottom to top to facilitate migration of heavier particles towards the bottom during rotation of the centrifuge.

During operation and rotation of the centrifuge cartridge, oil flow is metered into the centrifuge cartridge 674 by a function of oil pressure and the selected inlet orifice sizing 822. Oil is directed by an outwardly angled guide wall 864 and falls vertically through gravity downward into the centrifuge filtering chamber 738 where it forms a high pressure annular ring of oil whose inner diameter is about the diameter of the centrifuge outlets 678. Heavier soot particles migrate downward due to the slope of the centrifuge sidewall 680 and aggregate, congregate and preferably adhere to the centrifuge sidewall 680. Lighter oil migrates upward and is forced radially inward towards the outlets 678 due to the oil pressure of the annular oil ring inside the centrifuge body 674. The outlets 678 centrifugally expel oil radially outward against the inner periphery surface 653 of the stationary housing 654 where it flows therealong to an oil outlet port 668 near the bottom of the housing 654. When the centrifuge cartridge 674 is idle, oil is retained in the centrifuge filter chamber 738 by gravity because the outlets 678 and inlets 676 are vertically above the chamber 738 which advantageously retains the soot within the centrifuge cartridge 674. Any oil remaining in inlet passageway 824 may drip into the centrifuge cartridge 674 through assistance of downward funnel shaped guide surfaces 866 at the inlets 676.

There are several advantages of using electric actuation as shown in the present embodiment. One advantage is that electrical actuation may provide a more reliable power source which can more reliably provide for the high speeds desired for separating soot from oil is the preferred application, while generating less noise. The electric motor 700 may also reduce cost, and be more convenient in terms of locating inlet ports, and oil passageways in the filter. Another advantage of the third embodiment is that the shaft is solid and therefore easier to manufacture which also simplifies construction of other components at the top end of the filter.

Figure 25:
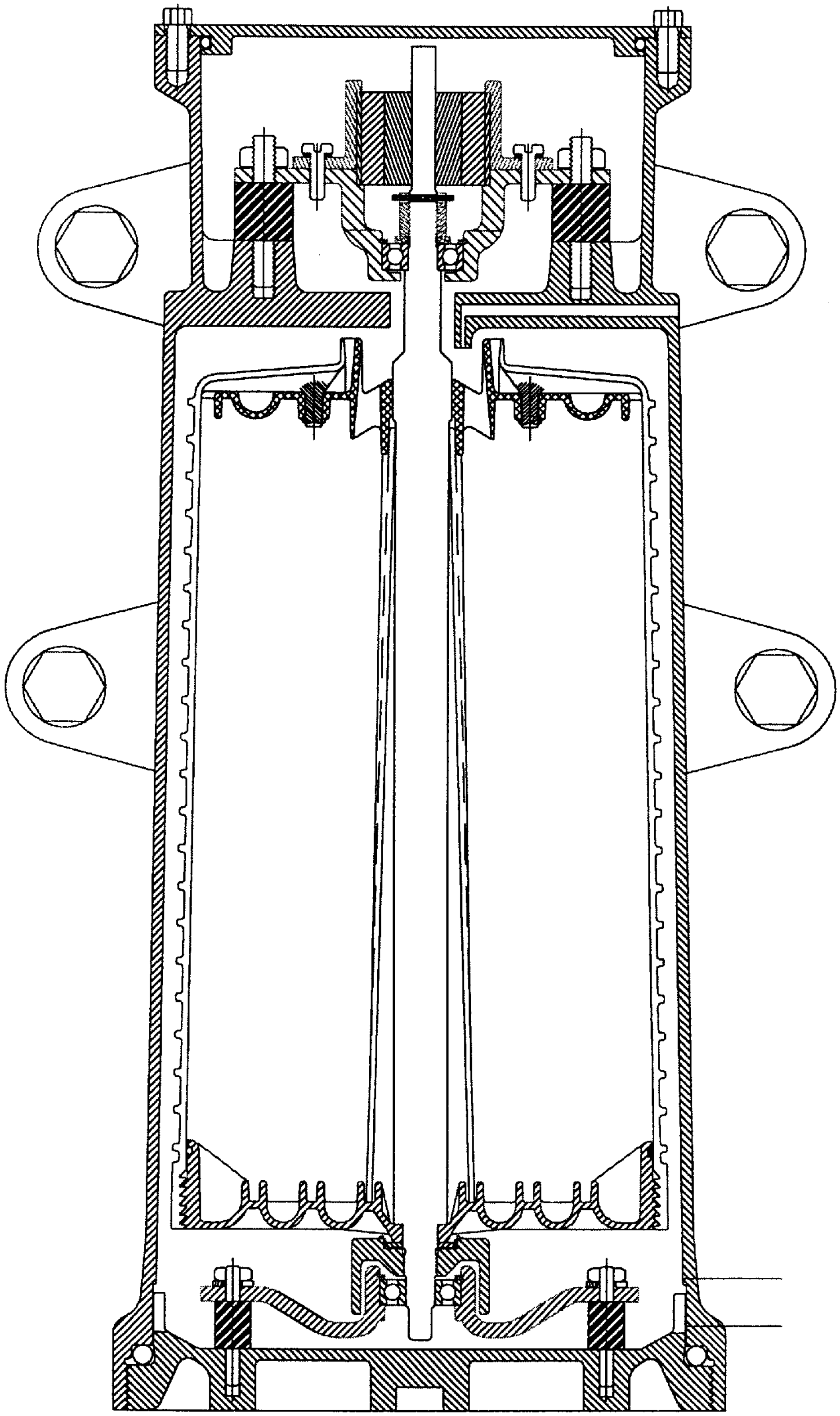
FIG. 25 is the same sectional view of FIG. 23 without the centrifuge cartridge installed.
Figure 26:
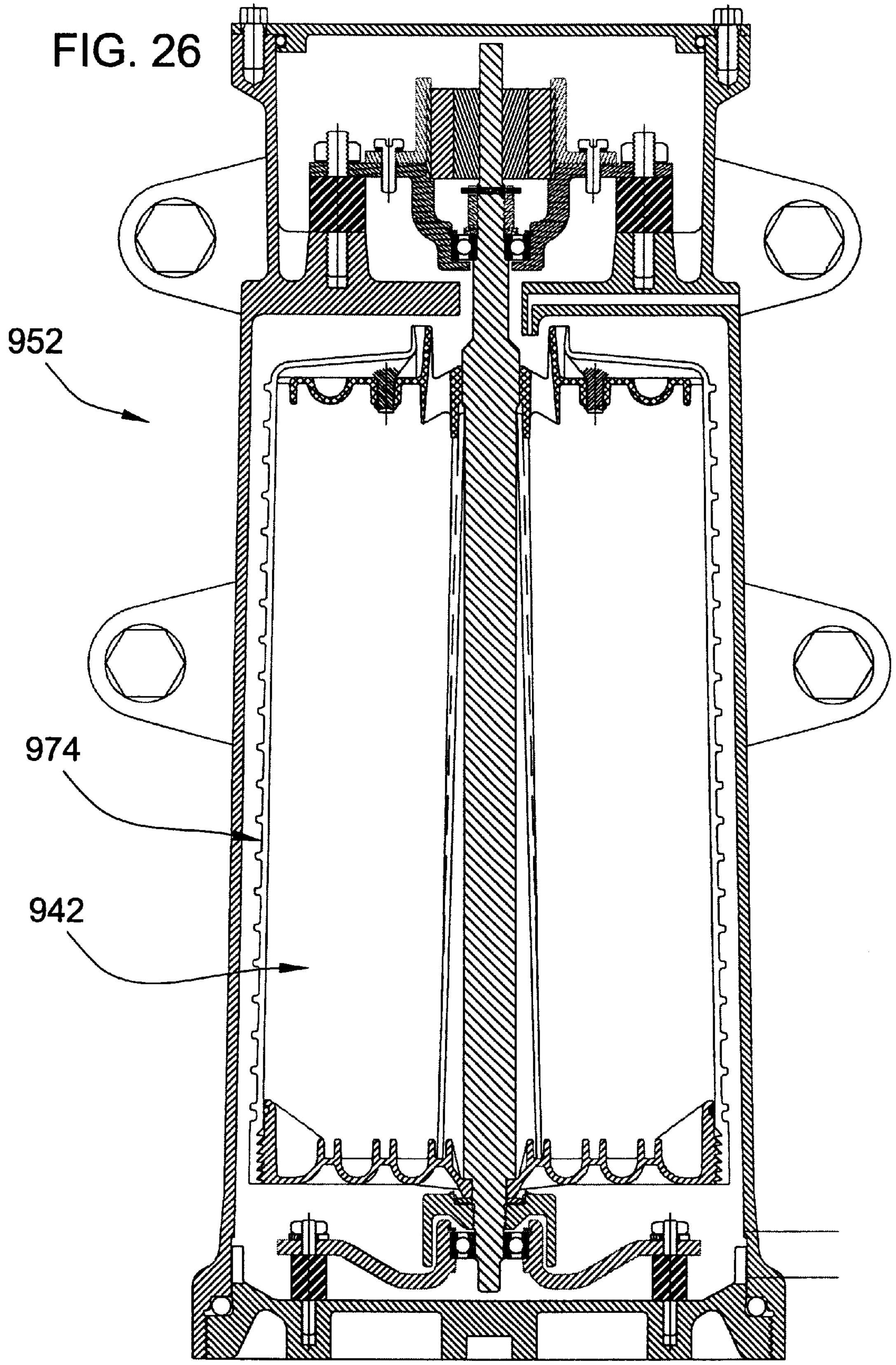
FIG. 26 is a sectional of another embodiment of the present invention in which the stationary filter housing is the same as FIG. 25, but the centrifuge cartridge is different than that of FIG. 23.

Turning then to the embodiment depicted in FIGS. 26, it will be understood that the filter 952 has the same parts and operates in much the same manner as the third embodiment depicted in FIGS. 23–25, however the present embodiment utilizes a replaceable centrifuge cartridge 974 that is similar in many respects to those shown in FIGS. 18–22. More specifically, this embodiment provides a containment trap 942 within the centrifuge body 974 that provides multiple levels for trapping soot. It is noteworthy to mention that the centrifuges with multiple levels may require more overall residency time of fluid inside the centrifuge than those with one level. The reason is that the fluid may mix as it proceeds outward to the next level which resets the time necessary for a contaminant to effectively centrifugally separate from the fluid at the given speed.

FIGS. 27–30 illustrate alternative embodiments of the filter cartridge in accordance with the present invention and are shown in association with a drive shaft 690 of the filter 652 shown in FIG. 23. The centrifuge cartridges of FIGS. 27–30 are similar in many respects to the filter cartridges of embodiments in FIGS. 18–26.

Figure 27:
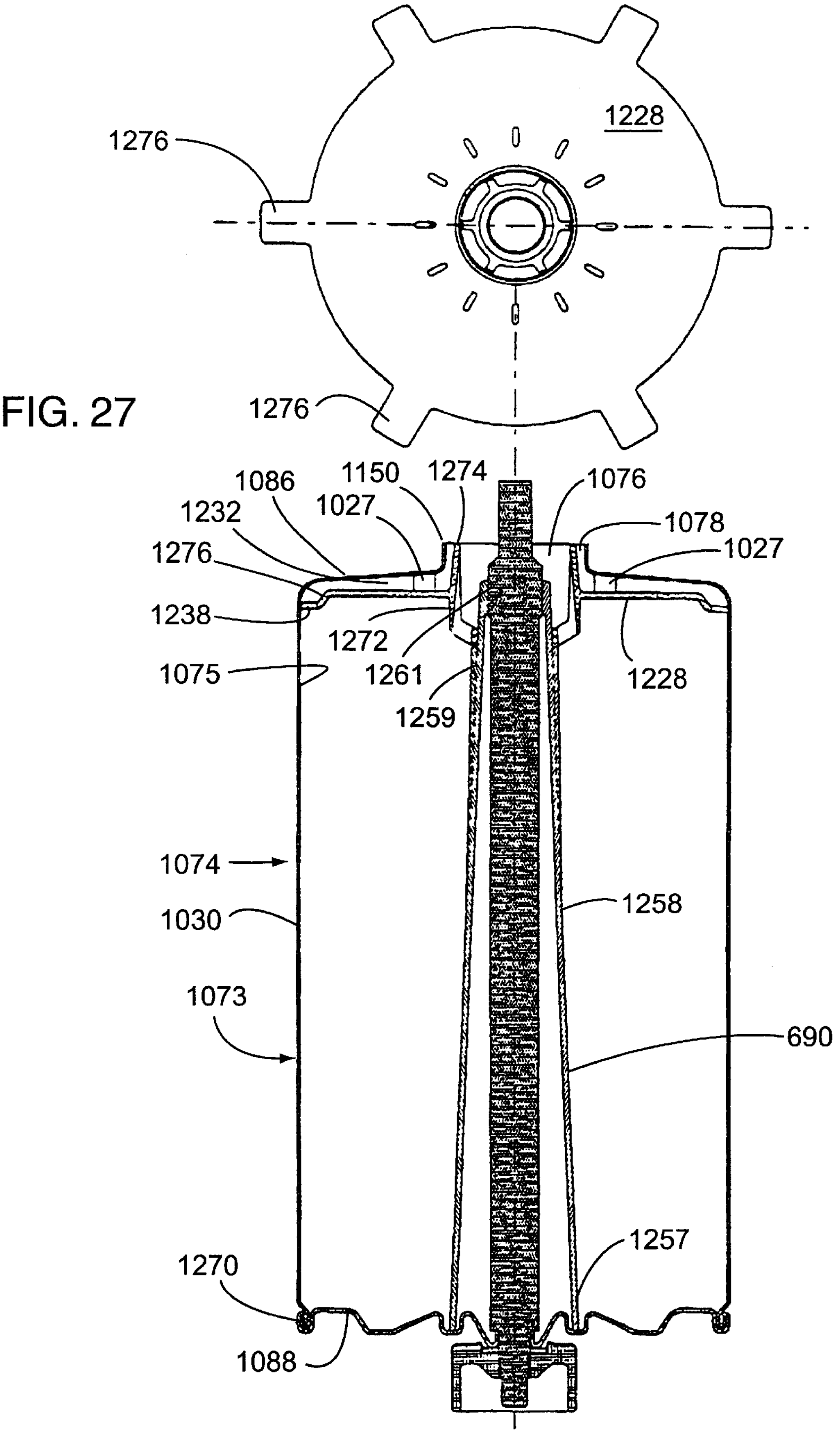
FIGS. 27–30 are alternative embodiments of a filter cartridge in accordance with the invention, illustrated in association with the drive shaft of a filter.

The embodiment of FIG. 27 provides a centrifuge cartridge 1074 that includes a steel body or canister 1073 that has a straight sidewall 1080 and a radially inward extending top end 1086. A stamped steel bottom end cap 1088 is seamed to the canister sidewall 1080 via a double seam 1270 to close the bottom end of the filter cartridge 1074. The sidewall 1080 of the steel canister 1073 is straight in this embodiment and does not angle inwardly or outwardly. The top end 1086 includes a central opening 1150 to provide for centrifuge inlets 1076 disposed radially inward of centrifuge outlets 1078. Disposed within the centrifuge cartridge 1074 is a center tube 1258 and a top end cap or baffle plate 1228. The tube 1258 has a lower end 1257 potted into or otherwise affixed to the bottom end cap and an upper end 1259 that includes an inside opening 1261 sized to be closely received by the drive shaft 690. The center tube 1258 preferably angles radially inward from bottom to top and sealingly engages the bottom end cap 1088. The baffle plate 1228 is disposed within the canister in a spaced relationship with the top end 1086 of the canister 1073. The baffle plate 1228 is held in the spaced relationship axially by a plurality of ribs 1027 on the center tube 1258 that urge the baffle plate 1228 against the top end 1086 of the canister 1073. The baffle plate 1228 includes a central hub portion 1272 that is received into the canister top end opening 1150 and includes a annular or ring shaped axially extending wall 1274 that divides the opening 1270 into the centrifuge inlets 1076 and the outlet 1078. The baffle plate 1228 also includes tabs 1276 on its radial periphery that assist in aligning the baffle plate 1228 radially within the canister 1073. Between tabs 1276 and the inside periphery 1075 of the canister 1073 there are flow openings 1278 that allow for oil at the inside periphery 1075 of the canister 1073 to flow back radially inward to the outlet 1078. The baffle plate 1228 may also include standoffs or other spacing means to locate the baffle plate axially in space relationship to provide for flow passageways 1232 from the openings 1278 to the outlet 1078. The center tube 1258 and baffle plate 1228 may be made from plastic or other suitable material. An advantage of the embodiment of FIG. 27 is that it provides a lower cost approach for mass producing a replaceable centrifuge cartridge if incineration for the filter cartridge is not necessary.

Figure 28:
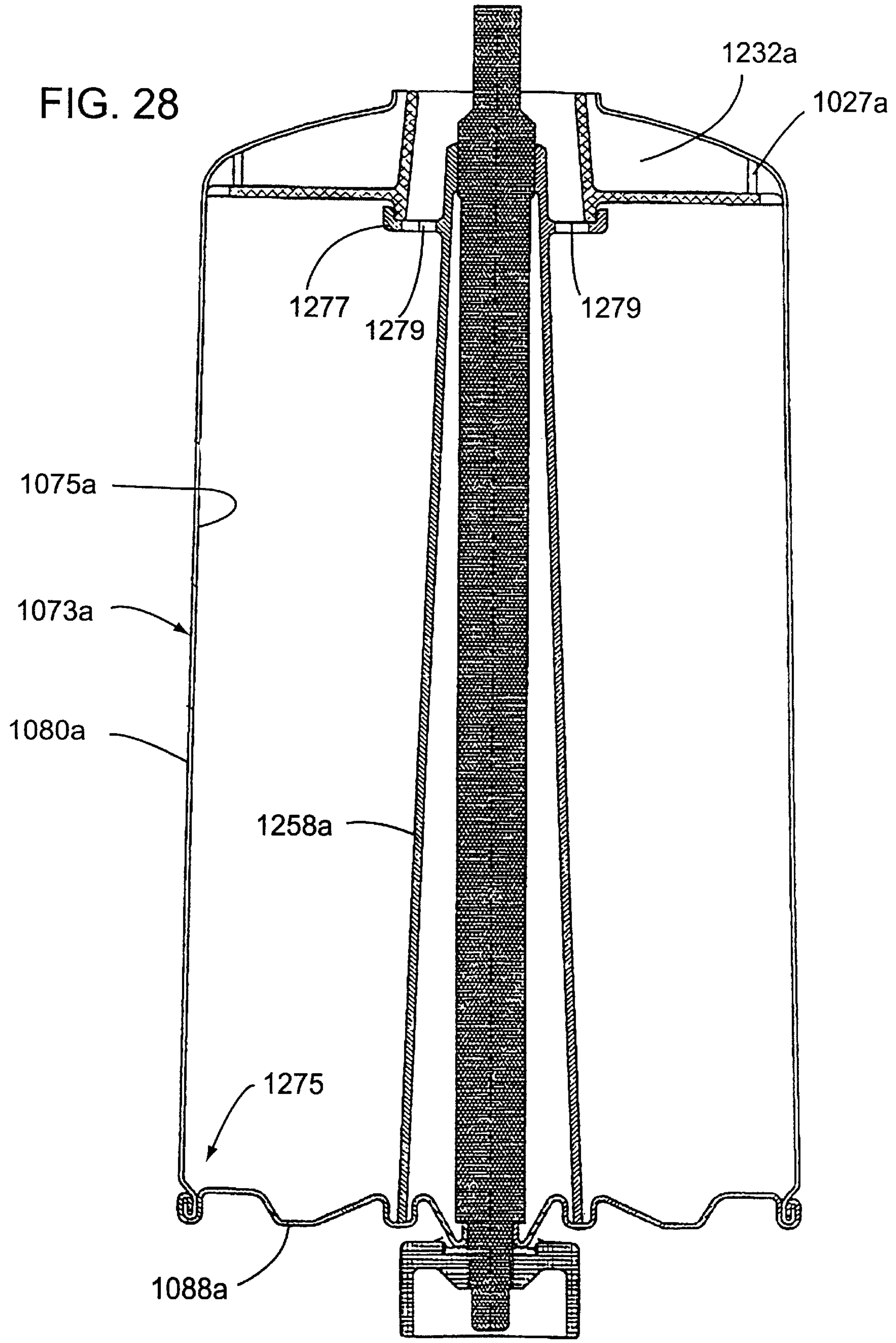

The embodiment of FIG. 28 also includes a steel canister 1073*a* and a seaming lid or bottom end cap 1088*a* seamed to the sidewall 1080*a* of the canister 1086*a* for closing off the bottom end of the filter cartridge 1074*a*. However, in FIG. 28, the outer sidewall 1080*a* or inside periphery surface 1075*a* thereof is conical angling radially inward from bottom to top. The conical sidewall 1080*a* of the canister 1073*a* may be preferable in order to facilitate better migration of soot and heavy towards the largest diameter which is next to the double seam in an area indicated by 1275. The center tube 1258*a* of this embodiment includes a radially outward flange 1277 for supporting the baffle plate axially. The outward flange 1277 includes several ports 1279 to allow fluid or oil into the centrifuge cartridge chamber. The baffle plate 1228*a* has several axially extending spacers 1027*a* integrally connected therewith that engage the canister 1073*a*. The spacers 1027*a* or spacing means locates the baffle plate 1228*a* in an axial spaced relationship to provide for flow passageways 1232*a* from the inside periphery 1075*a* of the steel canister 1073*a* to the outlet 1078*a*. The baffle plate 1228*a* and center tube 1258*a* may be molded from plastic material.

Figure 29:
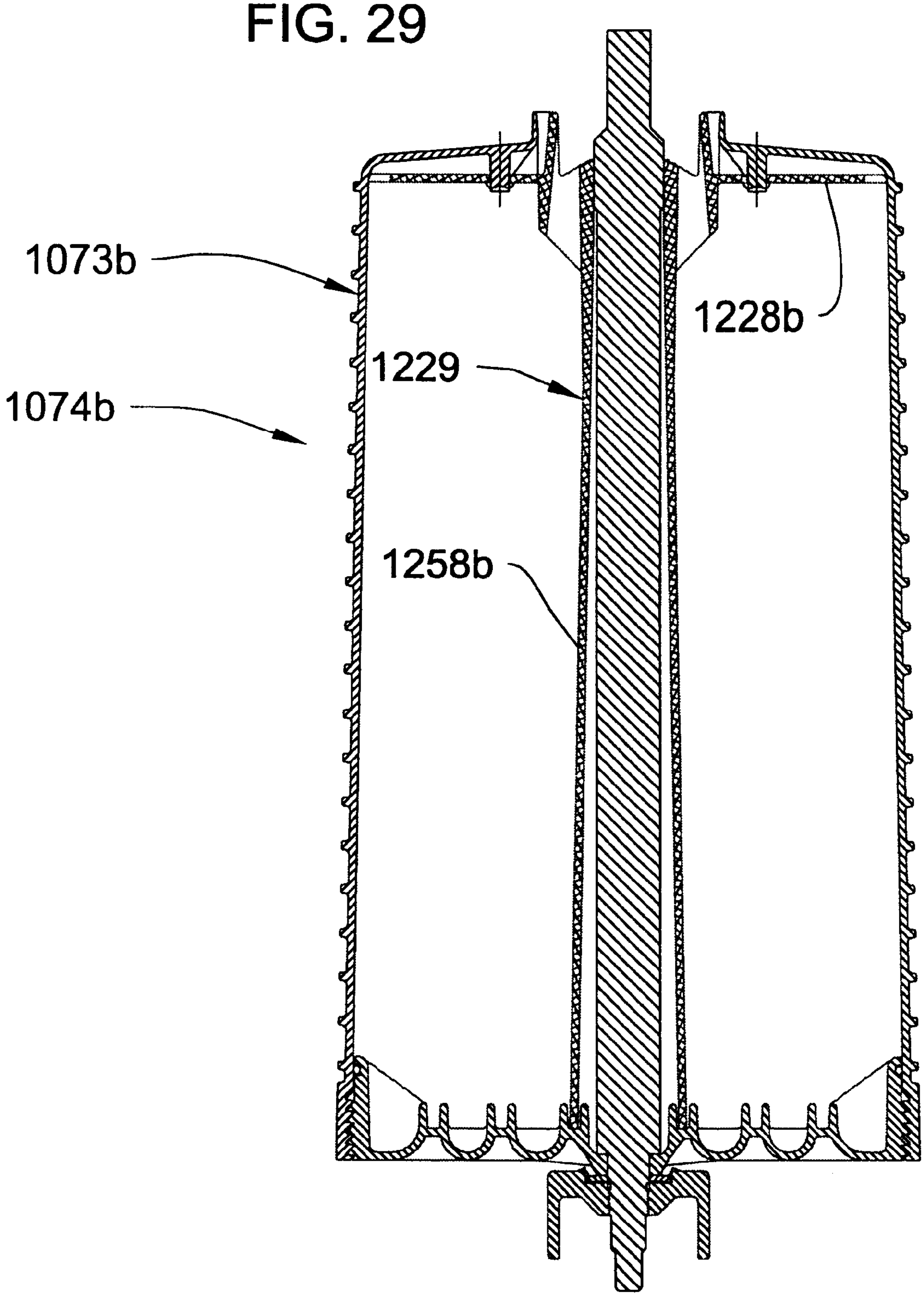

The cartridge 1074*b* of FIG. 29 includes a plastic centrifuge body 1073*b* with a one piece part 1229 that includes a center tube portion 1258*b* and a baffle plate portion 1228*b*. The one-piece part 1229 may be molded from plastic material by using a split in the die. Other than the one-piece center part 1229, the cartridge 1074*b* of the embodiment is structurally and functionally similar to that disclosed in FIG. 23.

Figure 30:
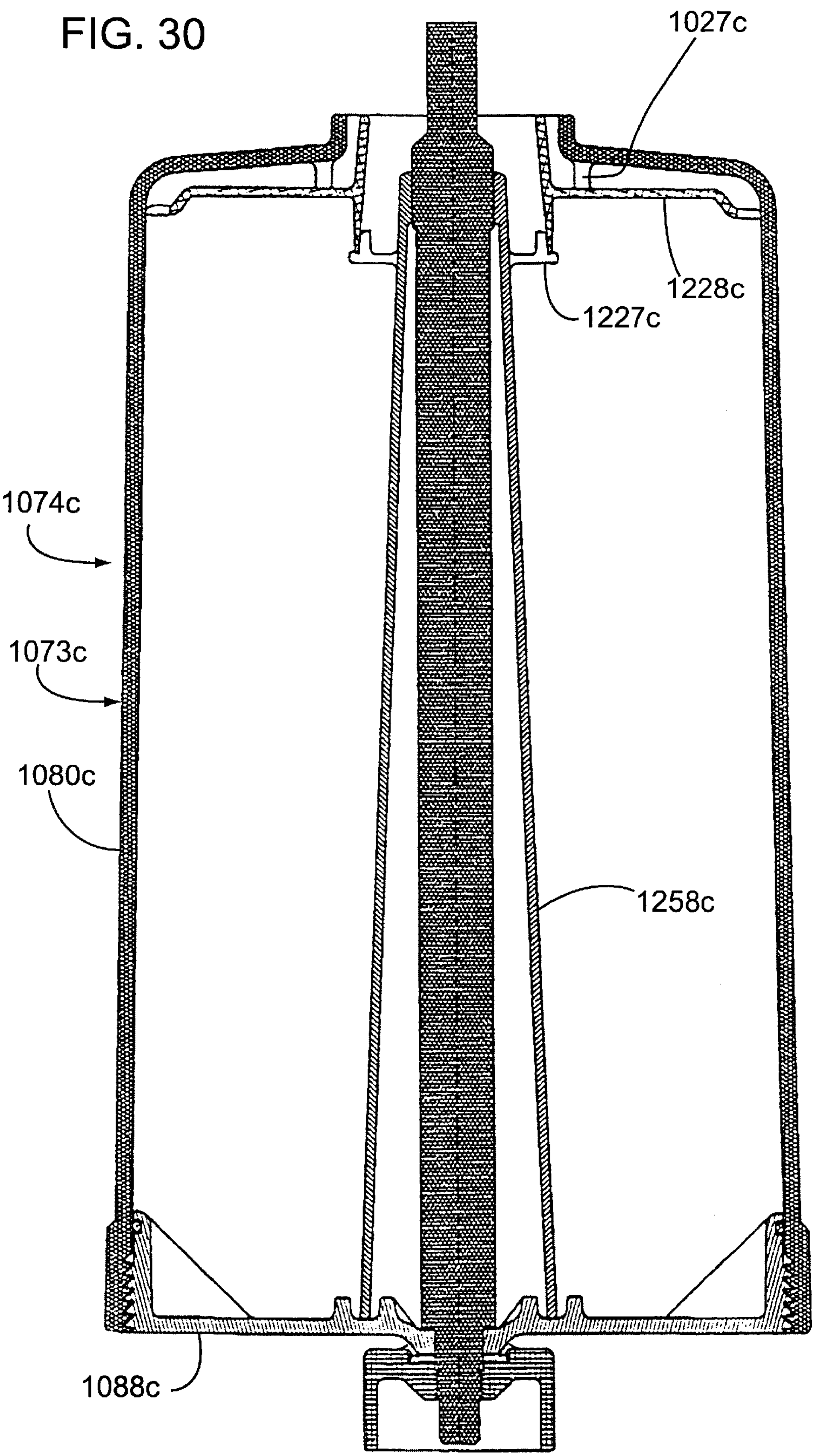

The centrifuge filter cartridge 1074*c* of FIG. 30 includes an outer centrifuge body 1073*c* that is die cast aluminum. A die cast aluminum bottom end cap 1088*c* is threadingly mated with the sidewall 1080*c* the centrifuge body 1073*c*. An advantage of this embodiment is that the unit could be cleaned out and reused if desired by unscrewing the bottom end cap 1088*c* for washing. Similar to the embodiment of FIG. 28, the center tube 1258*c* includes a radially outward flange 1277*c* that supports a baffle plate 1228*c*. Screws 1027*c* are used as the spacing means for fixing the axial spaced relationship between the centrifuge body 1073*c* and the baffle plate 1228*c* and fasten the baffle plate 1228*c* to the die cast aluminum body 1073*c*.

To summarize some of the advantages common to most of the cartridges of the preferred embodiments, the cartridge may be built with a containment trap with a plurality of telescoped conical walls disposed within the centrifuge cartridge as shown in FIGS. 18–22, and 26 or without conical walls as is shown in FIGS. 23 and 27–30. For the preferred application of removing soot from oil in engine applications, each of the filter cartridges disclosed in the various embodiments preferably has a diameter of about 5 inches and a holding volume of about one half gallon while being sufficiently strong to withstand rotational speeds of about 11,000–12,000 rpm about its central axis with fluid therein without failing or otherwise falling apart. The high speeds that the cartridge is capable of achieving makes it particularly adapted to remove very fine particles from fluid such as removing soot from oil that could otherwise not be removed effectively by centrifugal force. The inner diameter surfaces of the cartridge are closely sized and preferably machined for a tight fit on the drive shaft to better balance the cartridge so that radial loads are minimized. The centrifuge components including cylindrical or conical walls, the center tube, the baffle plate or inside upper end cap, and centrifugal body are symmetrical about the axis of rotation when mounted on the drive shaft, which provides a highly balanced centrifuge cartridge that reduces loads induced on the drive shaft and ball bearings. Each cartridge embodiment includes both the inlets and outlets at the top of thereof which retains the fluid in the cartridge when the centrifuge is idle. The centrifuge outlets are preferably disposed adjacent to the centrifuge inlets so that the capacity of the centrifuge cartridge is maximized, thereby providing a longer residence time for fluid in the cartridge during operation and facilitating processing of more fluid. Typically a hub or ring shaped wall divides the central opening at the top of the cartridge into inlets and outlets. A plate is disposed inside the cartridge near the top end of each of the embodiments to provide for flow paths for lighter clean oil or fluid from the inside periphery of the outer cartridge sidewall radially inward to the outlets. Preferably, the outer sidewall or inner periphery surface of the sidewall is conical which facilitates migration of heavier particles downward and lighter particles upward towards the outlets during centrifuging operation.

Figure 31:
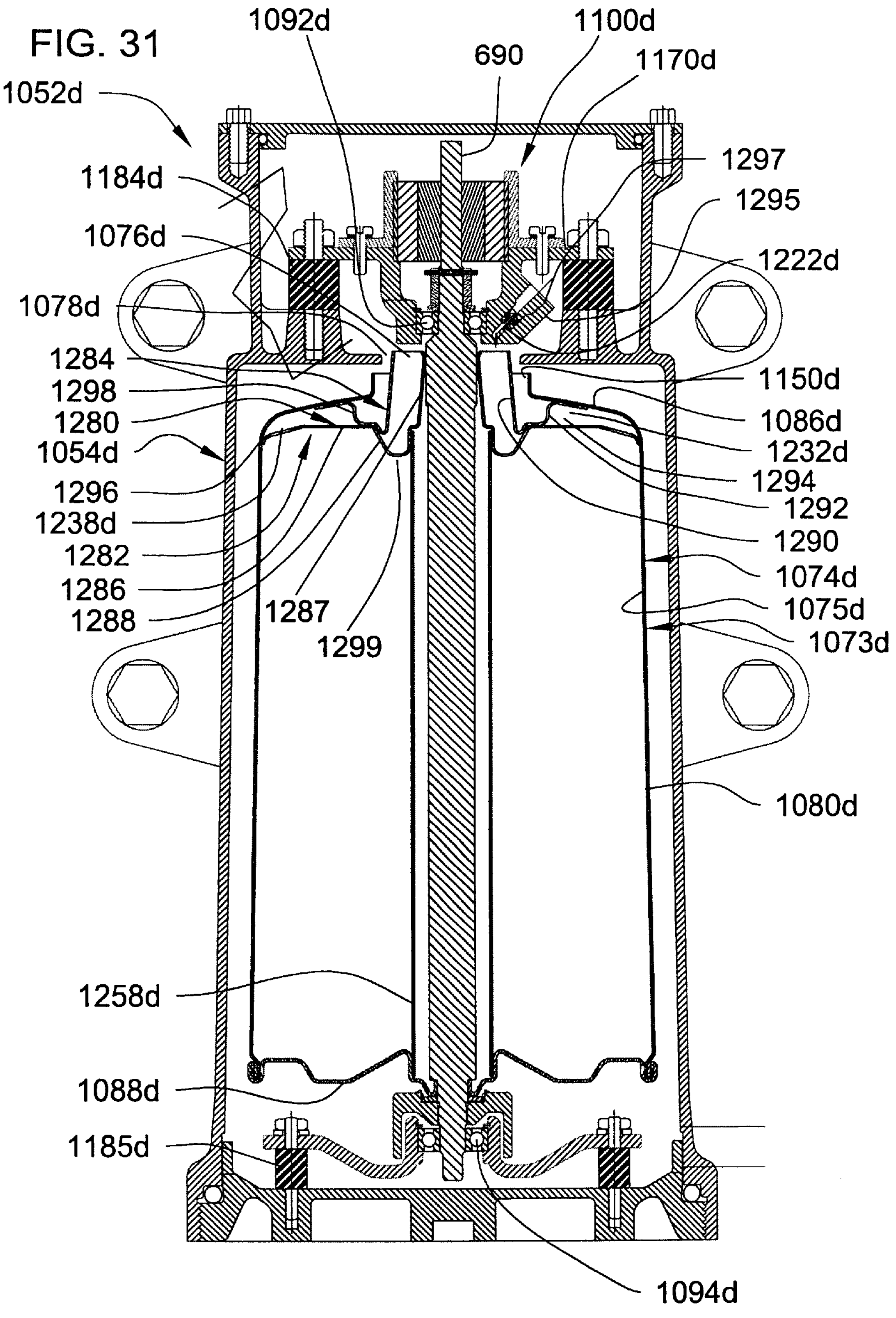
FIG. 31 is a sectional view of another embodiment in accordance with the present invention.

Turning to the embodiment of FIG. 31, there is provided a filter 1052*d* that is similar in many structural respects to the embodiment disclosed in FIG. 23, and therefore only differences will be noted between the embodiments. Similar to the embodiment of FIG. 23, the filter 1052*d* includes an electric motor 1100*d* for driving a drive shaft 1090*d* and centrifuge cartridge 1074*d*. However in the preferred embodiment of FIG. 31, the inlet discharge orifice 1222*d* for feeding oil or fluid into the centrifuge is provided by a mounting block 1295 that is carried and fixed to the upper bearing flange 1170*d*. Similar to the previous embodiments, the size of the inlet discharge orifice 1222*d* is selectively sized with restrictions therein to provide for the desired residency of fluid within the centrifuge cartridge 1074*d* during operation. The mounting block 1295 includes a threaded opening 1297, clamp or other hose connector for receiving and securing flexible or rubber hose (not shown). The other end of the rubber hose can then connect to the engine oil circuit to feed pressurized oil into the filter 1052*d*. An advantage of the embodiment of FIG. 31 is that the inlet discharge orifice 1222*d* moves with the drive shaft 1090*d* and the centrifuge cartridge 1074*d* so that the oil is directed into the inlet even when vibrations or vehicle induced shock loads cause slight misalignment between the stationary housing 1054*d* and the bearing flange 1170*d* through the vibration isolators 1184*d*, 1185*d*.

The centrifuge cartridge 1074*d* of the embodiment of FIG. 31 also includes many notable differences. The cartridge includes a steel outer body or canister 1073*d* that includes a conical axially extending sidewall 1080*d* and a radially inward extending top end 1086*d*. The top end 1086*d* provides a central opening 1150*d* for inleting and outleting oil or other fluid. A bottom end cap or lid 1088*d* is seamed to the sidewall 1080*d* to close the bottom end of the centrifuge cartridge 1074*d*. A cylindrical steel center tube 1258*d* is glued to the bottom lid 1088*d* to effect a leakproof-joint to prevent leakage when idle. A inner top end cap 1280 is disposed in the canister 1073*d* and is provided by two separate flow divider lids, including a seaming lid 1284 and a baffle plate 1282, both which may be stamped steel components can be honed and burnished to get precise diameters for radial locating. The baffle plate 1282 may be supported from the bottom by the center tube 1258*d* and includes a radially extending disc shaped portion 1286 and an axially extending conical shaped hub 1287. The conical shaped hub 1287 extends axially outside of the opening 1150*d* and radially inward at a small angle to closely engage the drive shaft 1090*d* to transfer radial loads thereto at a point in closer proximity to the ball bearings 1092*d*. It is an advantage that this reduces the bending moments in the shaft 1090*d* and reduces potential for natural shaft frequency from causing problems. This allows for more efficiency and higher speeds while increasing the life of the ball bearings 1094*d*, 1092*d* and overall reliability. The radially extending portion 1286 is held in spaced relationship to the top end 1086*d* so to provide flow passageways 1346 from the inside periphery 1075*d* of the canister 1073*d* through flow orifices 1238*d* near the outer peripheral edge of the baffle plate 1282 to the centrifuge outlet 1078*d*. In the present embodiment, the outer flow orifices 1238*d* are disposed inward a solid continuous outer rim 1296. The rim 1296 includes a slightly annular profile that locates the baffle plate 1282 radially and concentric within the canister 1073*d*. Additional inner flow orifices 1294 are disposed radially inward of the outer flow orifices 1238*d* such that baffle plate 1282 may be described as perforated. The advantage of moving the outer flow orifices 1294 inward away from the inside periphery 1075*d* of the canister 1073*d* is that the centrifuge cartridge 1074*d* has a greater capacity to retain heavier contaminants such as soot and sludge. In particular, centrifugal force at any given point in the centrifugal filter 1074*d* is a function of rotational speed and more importantly a linear function of the radius of each point. Radial inward points receive less centrifugal force than radially outward points meaning that lighter fluids will migrate radially inwards while heavier particles migrate radially outwards. By moving the flow orifices 1238*d*, 1294 radially inward, the present embodiment better ensures that lighter oil particles are returned via passageways 1232*d* to the outlets 1150*d* and not heavier soot or sludge particles. The radially extending portion 1286 and the conical hub portion 1287 meet in an annular trough portion 1288 which includes apertures 1299 to allow oil to enter the cartridge 1074*d*. The trough portion 1288 extends inward towards the bottom end of the centrifuge cartridge 1074*d* to direct oil into the cartridge and better prevent oil from short circuiting prematurely to the flow openings 1238*d*, 1294 in the baffle plate 1286.

The seaming lid 1284 includes an angled annular wall conical portion 1290 that extends radially inward from bottom to top and a supporting portion 1292. The support portion 1292 is supported by the baffle plate 1282 and the upper end 1086*d* of the canister and also provides means for spacing the baffle plate 1282 and inside top end cap 1280 an axial distance from the top end 1086*d* of the canister 1073*d*. The conical portion 1290 similarly extends outside the central opening 1150*d* in close proximity with the inlet discharge orifice 1222*d*. This advantageously locates the centrifuge inlet 1076*d* in close proximity with the inlet discharge orifice 1222*d* for more reliably receiving oil therefrom. The conical shaped portion 1290 divides the central opening 1150*d* into an inlet 1076*d* for receiving unfiltered oil and an outlet 1078*d* for discharging filtered oil. The support portion also includes orifices 1298 to accommodate the flow passageways 1232*d*. It is an advantage that the axially extending wall 1290 extends out of the opening 1150*d* and acts as a collector to prevent oil from not entering the centrifuge cartridge 1074*d*. It is another advantage that the wall 1290 or inner periphery surface thereof angles slightly outward from top to bottom so that the rotating action of the centrifuge cartridge 1074*d* assists oil in moving downwardly into the cartridge 1074*d*. Similarly, the conical hub 1287 assists in guiding the oil into the centrifuge cartridge 1074*d*.

Figure 32:
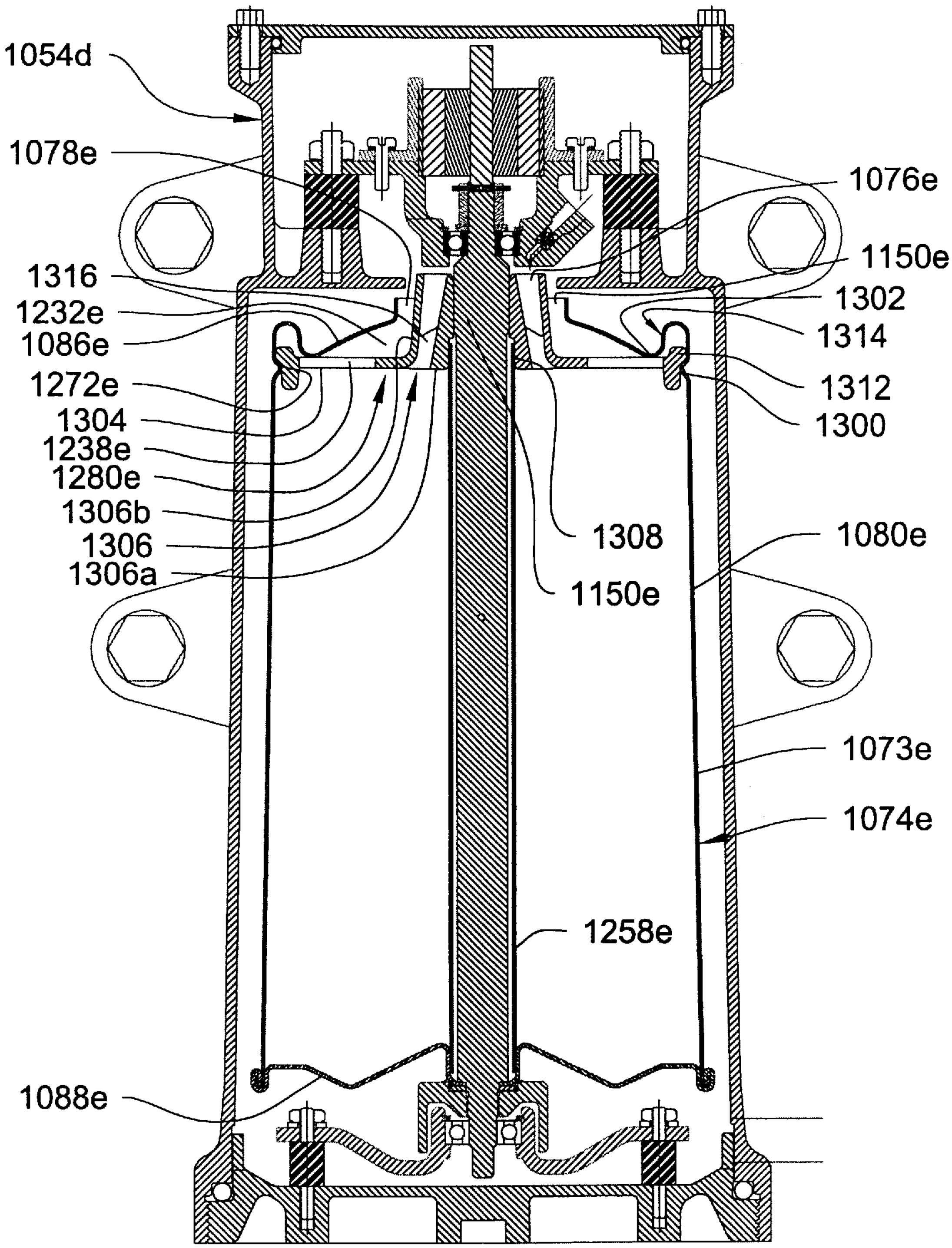
FIG. 32 is a sectional view of another embodiment in accordance with the present invention.
Figure 33:
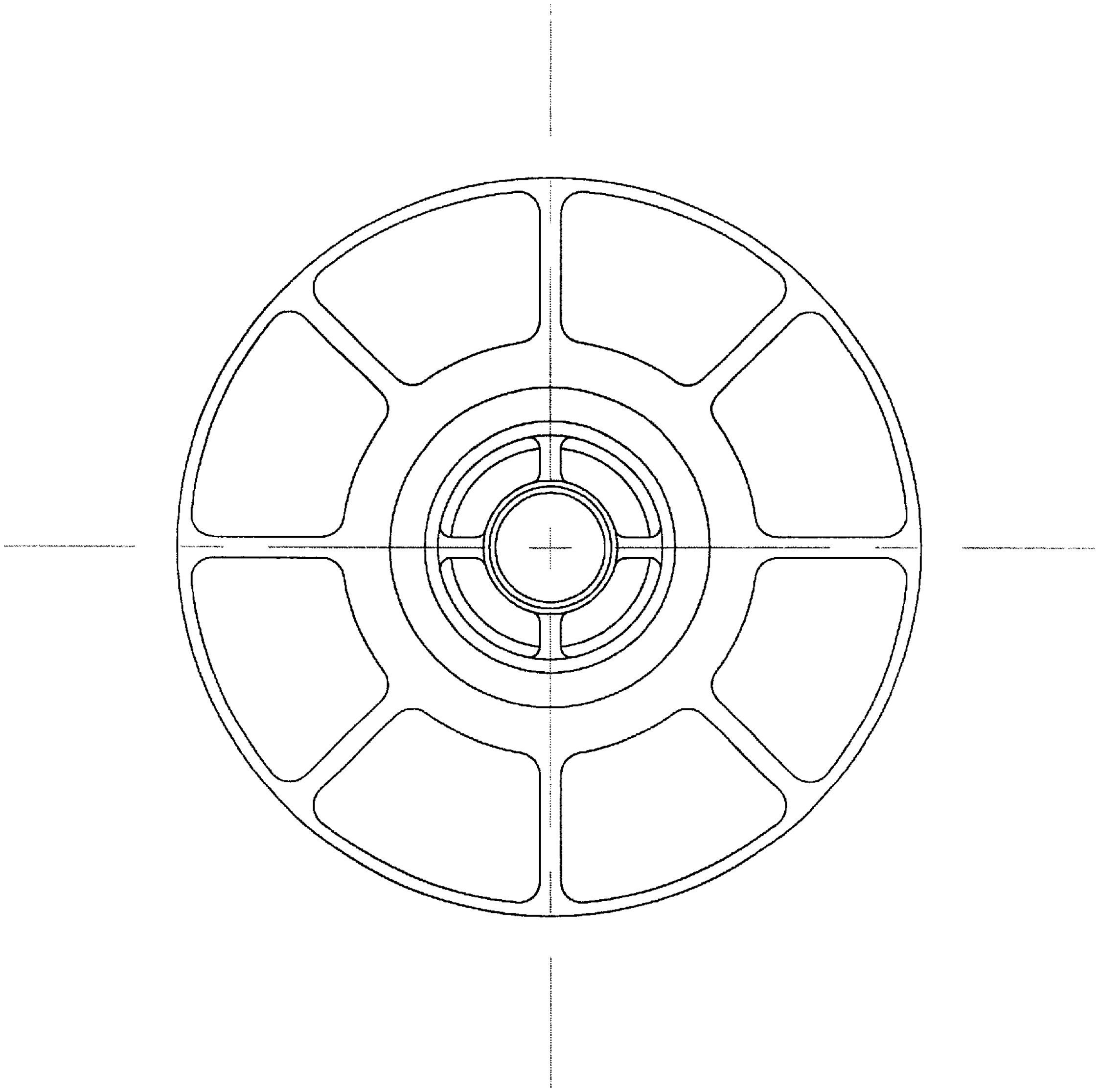
FIG. 33 is a top view of the baffle plate for the centrifuge cartridge of the embodiment shown in FIG. 32.

The embodiment of FIG. 32 uses the same stationary housing 1052*e* as the embodiment of FIG. 31. However, the centrifuge cartridge 1074*e* of the embodiment of FIG. 32 is structurally different than that of FIG. 31. Although the centrifuge cartridges of the embodiments of FIGS. 31, 32 are structurally different, the cartridges remove soot from oil in substantially the same functional manner. Therefore only different structural details will be noted. The centrifuge cartridge 1074*e* of the embodiment of FIG. 32 uses a conical steel canister 1073*e* and a bottom seaming lid 1088*e* similar to that shown in FIG. 31. However, the embodiment of FIG. 32 instead includes a unitary baffle plate 1280*e*, that may be die cast from aluminum, as the inside upper end cap. The baffle plate 1280*e* includes a central hub 1306 connected by a plurality of ribs in the form of spokes 1304 to a circular or annular outer rim 1310. Between the spokes 1304 there are provided flow orifices 1238*e* to provide for flow passageway 1232*e* to the cartridge outlet 1078*e*. The central hub 1306 includes an inner hub portion 1306*a* and an outer hub portion 1306*b* connected by a plurality of ribs 1316 therebetween. Preferably, the outer and inner hub portions 1306*a*, 1306*b* extend axially outside of the central opening 1150*e* of the canister 1073*e*. The inner hub portion 1306*a* has a cylindrical opening 1150*e* which can be precisely machined to closely receive the drive shaft for transmitting radial loads.

The inner hub 1306*a* includes an inner recess 1308 that is glued with adhesive to the center tube 1258*e*. The central hub 1306 provides an inlet 1076*e* between the inner and outer hub portions 1306*a*, 1306*b*. The inner hub portion 1306*a* includes a conical outer periphery surface and the outer hub portion 1306*b* is also conically shaped.

To secure the baffle plate 1280*e* within the top end 1086*e* of the canister 1073*e*, two annular beads 1300, 1302 are provided as the spacing means for aligning the baffle plate 1280*e* in axial spaced relationship with the top end 1086*e* of the canister 1073*e*. The first annular bead 1300 is formed in the conical sidewall 1080*e* and engages an outer peripheral annular shoulder 1312 that encompasses the outer peripheral rim 1310 to prevent axial movement of the baffle plate 1280*e* downward. The annular shoulder 1312 also pilots the baffle plate 1280*e* radially within the canister 1073*e* to align the baffle plate concentric or otherwise symmetrical about the axis of rotation. The second annular bead 1302 is formed in the top end 1086*e* of the canister 1073*e* and contacts the spokes 1304. The second annular bead 1302 urges the baffle plate 1280*e* downward against the first annular bead 1300 to prevent upward movement of the baffle plate 1280*e*. Preferably, the cartridge 1074*e* is dynamically balanced about its axis of rotation by a balancing machine (not shown). To dynamically balance the centrifuge cartridge 1074*e*, weights (not shown) may be glued to the second annular bead 1302 in an area indicated by reference character 1314 or other appropriate location.

Figure 34:
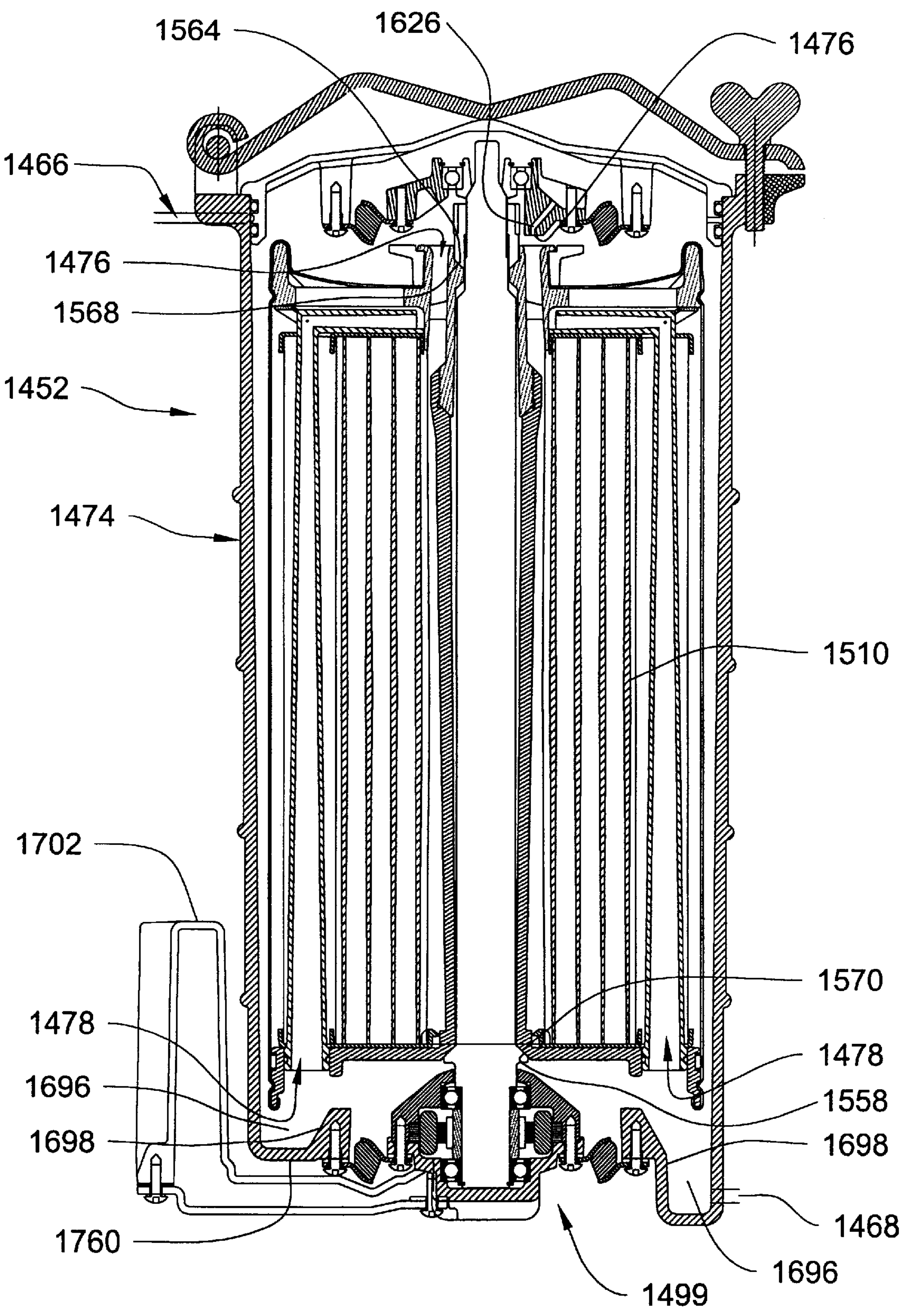
FIG. 34 is a cross sectional view of a centrifuge oil filter including a centrifuge housing and a replaceable centrifuge cartridge in accordance with a preferred embodiment of the present invention.

Referring to FIG. 34, a centrifuge filter 1452 is illustrated in accordance with another preferred embodiment of the present invention. The centrifuge filter generally comprises an outer centrifuge housing 1454 for mounting to the frame of a vehicle and a replaceable centrifuge cartridge 1474 that is adapted to rotate inside the housing to remove soot from oil or other such contaminants. Before turning a greater detailed description of the preferred embodiment, some general structural and operational details of the centrifuge filter 1452 will be provided to facilitate a working understanding to the filter 1452. The centrifuge housing 1454 generally comprises a housing inlet 1466 for receiving unfiltered oil from the engine a housing outlet 1468 for returning filtered oil to engine and a drive mechanism 1499 for rotating the centrifuge cartridge 1474 inside the housing 1454. The centrifuge cartridge 1474 generally includes a cartridge inlet 1476 for receiving unfiltered oil from the housing 1454, a centrifugal filter trap 1510 for removing fine particles such as soot from oil during rotation of the cartridge 1474 and a cartridge outlet 1478 for discharging filtered oil.

Figure 35:
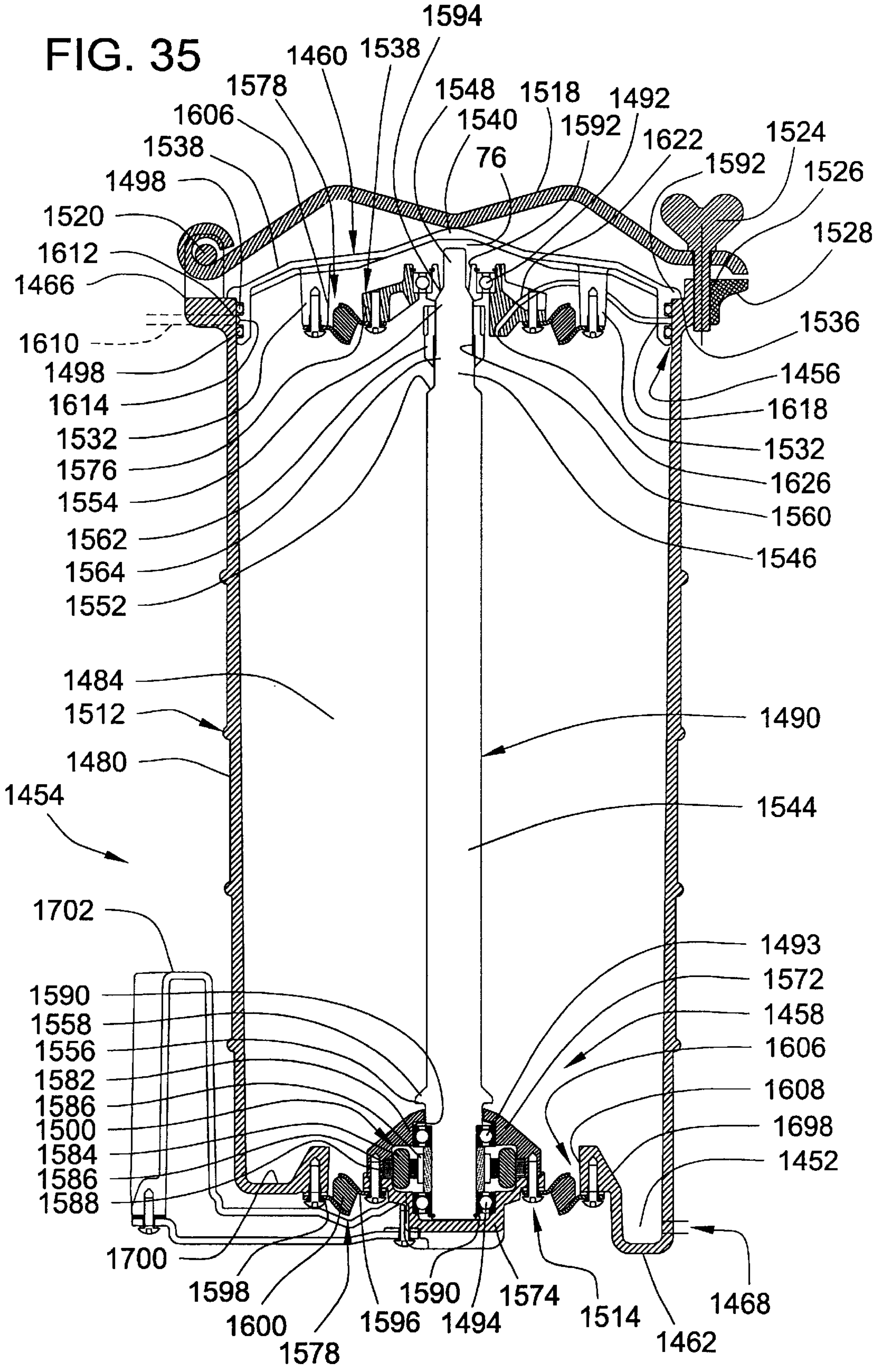
FIG. 35 is a cross sectional view of the centrifuge housing illustrated in FIG.34.

Now referring in greater detail to the filter housing 1454 and referring to FIG. 35, the housing 1454 includes a stationary casing 1512 that is adapted to be mounted on the frame of a vehicle via mounting bosses 1464 (FIGS. 39 and 40) into which threaded fasteners are received. The casing 1512 is preferably cast from aluminum material to provide a rigid support structure that is adapted to be mounted to the frame of a vehicle and endure the shock loads and vibrations induced by the vehicle while providing support for the cartridge and other spinning components. The casing 1512 includes a substantially cylindrical outer sidewall 1480 having a closed bottom end 1458 and an open top end 1456 vertically above the bottom end 1458. Between the bottom and top ends 1458, 1456 is a centrifuge chamber 1484 which receives the centrifuge cartridge 1474. The housing 1454 is mounted with the vertical orientation illustrated in FIGS. 34 and 35 so that an automotive technician or mechanic can service the filter 1452 from the top of the vehicle rather than in a pit from underneath the vehicle to replace the cartridge 1474 and perform other such service operations. The bottom end 1458 is closed by an bottom end portion 1456 integral with the sidewall 1480 and extending radially inwardly from the sidewall 1480 and a lower motor and bearing mounting assembly 1514 mounted in the central opening of the end portion 1456.

The open top end 1456 is closed by a lid 1460 that is closely received therein. The lid 1460 can be manually removed from the casing 1512 to expose the open top end 1456 of the casing 1512 and thereby allow a service technician access to the cartridge 1474 inside the housing 1454 for removal and replacement. A pair of spaced apart ring seals 1498 are disposed and compressed between the outer cylindrical periphery of the lid 1460 and the cylindrical inner periphery of the casing 1512 to prevent contaminants such as dirt, water and the like from entering the inside housing 1454. The seals 1498 more importantly seal off an inlet flow path of oil into the filter 1452 as will be later explained in greater detail. The lid 1460 is positively retained on the casing 1512 by a metal strap 1518 which has one end pivotably connected to the housing by a pivot pin 1520 which is secured between two prongs of a mount 1522 cast into the casing 1512 and a second end fastened to the casing 1512 by a t-screw 1524 or other such fastener via a threaded hole 1526 in a cast mounting flange 1528 of the casing 1512. The t-screw 1524 can be selectively tightened to maintain the proper retention of the lid 1460. Advantageously, the t-screw 1524 can be manually manipulated without the need for any special tool. The lid 1460 includes a radially outboard shoulder 1530 which seats against a radially planar seating surface 1534 provided by the casing 1512. The t-screw 1524 can be unfastened to also remove the strap 1518 and therefore provide for manual removal of the lid 1460 to provide top access into the centrifuge housing 1454. Advantageously this allows a mechanic to easily access the filter cartridge from vertically above the filter 1452 such that the mechanic can service the filter 1452 for cartridge removal and replacement by standing on the floor rather than necessitating the requirement that the mechanic be down in a pit underneath the vehicle. Top access can be achieved by mounting the filter unit 1452 to the frame of the vehicle rather than to the engine of the vehicle. However, it will be appreciated that various features of the present invention may also be utilized in an engine mounted unit or a bottom access unit in an alternative embodiment.

The lid 1460 is also a relatively rigid support structure to which an upper bearing support assembly 1536 is mounted. The lid 1460 can be readily cast from aluminum material. The lid 1460 provides multiple mounting bosses 1532 that allow the upper bearing support assembly 1536 to be easy mounted to the lid while axially spacing the support assembly from the lid 1460. The cover portion 1538 of the lid 1460 angles upwardly to a converging dome portion 1540, the center of which engages the retaining strap 1518 for balanced retention of the lid 1460. The dome portion 1540 also provides a void space 1542 between bosses 1532 to better accommodate the upper bearing support assembly 1536.

Between the upper and lower bearing mounting assembles 1536, 1514 is journalled a drive shaft 1490, preferably made of stainless steel. The drive shaft 1490 includes a larger diameter central portion 1544 and two progressively smaller diameter portions 1546. 1548 joined by conical surfaces 1552, 1554 at its upper end and a smaller diameter portion 1550 at its lower end. The drive shaft 1490 also provides a raised ring like projection 1556 which also provides a conical contact surface 1558. The intermediate smaller diameter portion 1546 also provides threads 1560 to which a hex nut 1562 or other fastener is used to releasably secure the cartridge 1474 on the drive shaft 1490. Specifically the cartridge is slidably mounted on the drive shaft 1490 and securely and tightly retained between the hex nut 1562 and the raised projection 1556 to provide for torque transfer between the filter cartridge 1474 and shaft 1490. The hex nut 1562 provides yet another conical surface 1564 facing the conical surface 1558 of the projection 1556. The filter cartridge 1474 includes mating conical surfaces 1568, 1570 which mate in beveled contact with the conical surface 1558 of the drive shaft 1490 and the conical surface 1564 of the hex nut 1562 to provide for transfer of both radial and axially and other similar loads near both the upper and lower ends of the cartridge 1474. The use of beveled contacts holds the rotating element in both the radial and axial directions so that there is no movement between the centrifuge element and the shaft. This helps to increase the naturally frequency of the shaft, which is designed to be greater than 12,000 rpm, sufficiently greater than the rotating speed of filter 1452 to prevent amplifying vibrations. This also achieves a much more highly balanced cartridge 1474 which advantageously results in more balanced rotation of the cartridge 1474 and therefore a longer life span of the bearings, motor and other components of the filter. The beveled contact surfaces also prevent fretting of material from the drive shaft 1490.

The lower bearing mount assembly 1514 includes the drive mechanism 1499 for driving the shaft 1490 and therefore the centrifuge cartridge 1474. In the preferred embodiment the drive mechanism includes an alternating current three-phase electrical brushless motor 1500, however it will be appreciated that other drive mechanisms such as a fluid or oil driven turbine, or other type of electrical motor, a mechanical linkage or other appropriate drive mechanism that provides sufficient speed and power to remove soot from oil may also be used. The electrical brushless motor 1500 provides a highly reliable and relatively simple mechanism for achieving the high speeds necessary for removing soot from oil, which requires at least approximately a 10,000 g level force (10,000 times the force of gravity). The motor 1500 is located vertical beneath the cartridge so as not to interfere with removal and replacement of the cartridge as the filter 1452 is of the top access type.

The lower bearing mount assembly 1514 includes top and bottom bearing mounts 1572, 1574, preferably made from cast aluminum, which are secured to the outer casing 1512 and which house the motor 1500 therebetween. The bottom bearing mount 1574 also serves as an end cap to close the bottom end 1458 of the filter housing 1454. The motor 1500 generally includes a permanent magnet 1580 affixed via a sleeve 1582 to the drive shaft 1490 to serve as a rotor for imparting motion to the drive shaft 1490. The stator part of the motor 1500 which includes coils 1584 and lamination stack 1586 are separated from the magnet 1580 by a small air gap, which may be roughly about 0.015 inches of radial distance. The lamination stack 1586 has its outer radial periphery portion fixed into a recess 1588 provided by the bearing mounts 1572, 1574. The motor 1500 accelerates the cartridge 1474 as quickly as possible to overcome the low natural resonant frequency of the total rotating mass with the rubber mounts thereby spending as little time at a speed in which the low natural resonance frequency occurs.

The motor 1500 is located between two sets of ball bearings 1493, 1494 in which the shaft 1490 is journalled and retained. The inner races of two sets of bearings 1493, 1494 are pressfitted onto the drive shaft 1490 with the outer races constrained in the bearing mounts 1572, 1574. A spring washer 1590 engages the outer race of the upper bearings 1493 to maintain an axial force on the upper bearings against the sleeve 1582. The outer race of the lower bearings 1494 is secured by a snap ring to ensure axial retention of the lower bearings 1494. The two sets of bearings 1493, 1494 at the motor end of the shaft reliably maintain the small gap between the rotor and stator of the electrical motor 1500. The two sets of bearings minimize the likelihood of contact between the rotor and the stator during high-speed rotation of the cartridge 1474 inside the housing 1454. Although two bearings are shown, it is also possible to cantilever the spinning element of the filter from the top of the electrical motor using wide spaced bearings at the lower motor end, but this is less desirable from the standpoint of requiring the filter unit to be very tall.

The lower bearing mount assembly 1514 including the stator of the electrical motor 1500 are secured to the outer casing 1512 by a vibration isolator 1578. An upper bearing mount 1576 of the upper bearing mount assembly 1536 is also secured by a similar vibration isolator 1578. The outer race of an upper set of ball bearings 1492 is secured to the upper bearing mount 1576 by a snap ring. A live center 1592 is secured to the inner race of the bearings 1492 by a snap ring. The live center 1592 provides a conical engaging surface 1594 which mates with the corresponding conical surface 1554 of the drive shaft 1490. The strap 1518 exerts downward force on the lid 1460 which in turn causes engagement between the live center 1592 and the drive shaft 1490 to transfer the radial and axial loads therebetween. The top vibration isolator 1578 also stores energy to provide a constant axial force that maintains continuous engagement (except for extreme shock loads) between the live center 1592 and the shaft 1490. This provides axial and radial support for the rotating shaft 1490 and therefore the cartridge 1474 at points both above and below the cartridge 1474 which prolongs bearing life and provides for more balanced rotation of the rotating elements of the filter 1452. Moreover, since there is no relative motion between the bevel contact surfaces 1594, 1554 of the shaft 1490 and the live center 1592, there is no resultant wear of the surfaces which is an advantageous in providing a long service life of the shaft and the inner bearing race constraint. Specifically, the live center 1592 through the beveled contact allows for rotation of the shaft 1490 for millions of revolutions without "fretting" (material removal) of either the shaft of the inner bearing race retaining piece, since there is no radial clearance needed between the surfaces as is required with a two concentric cylindrical constraint.

Figure 41:
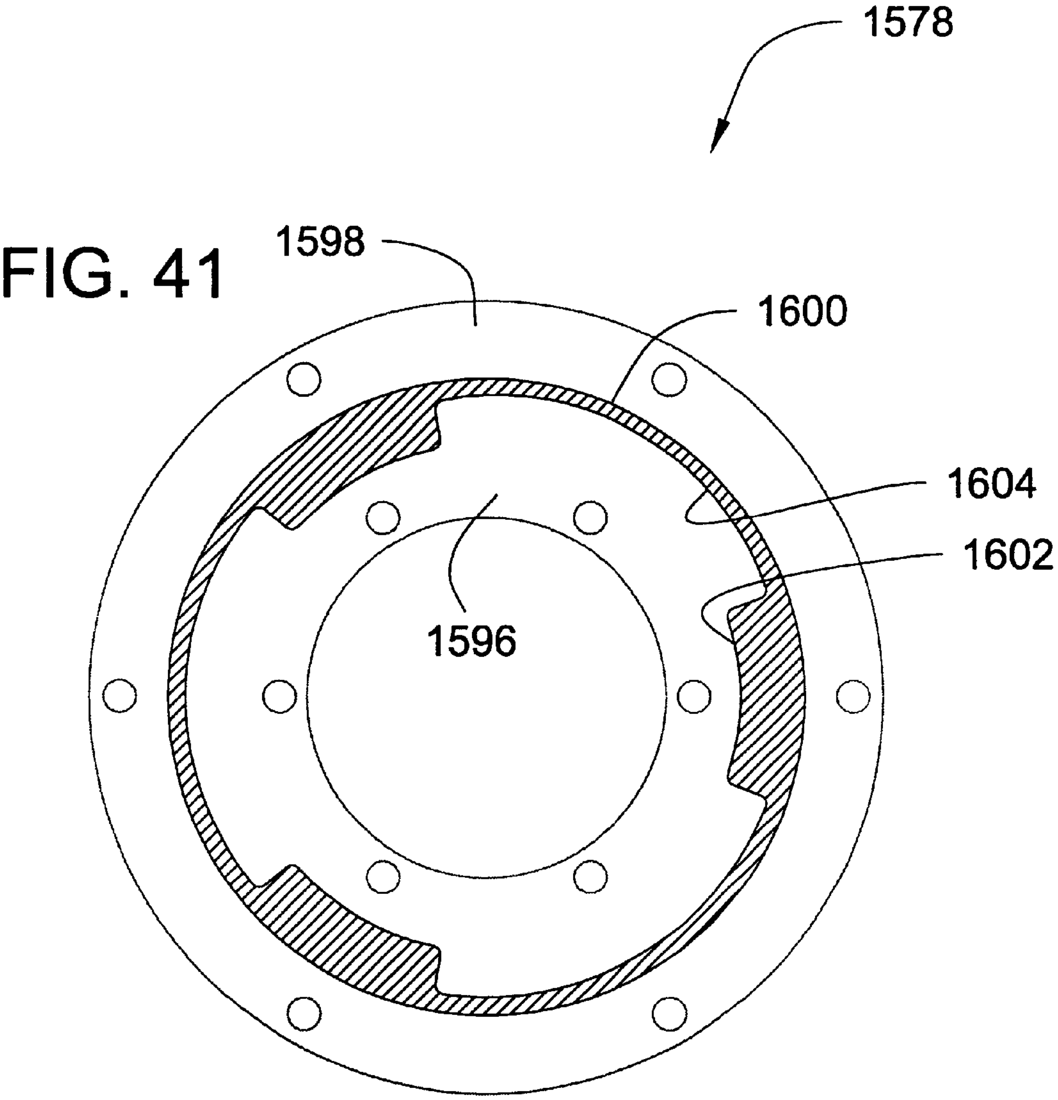
FIG. 41 is a top view of a vibration isolator used in the housing of FIG. 35.

Referring to FIG. 41, each vibration isolator 1578 includes two rigid members and a resilient member in the form of an inner metal ring 1596, an outer metal ring 1598 and a relatively rigid yet resilient rubber ring 1600 securely affixed therebetween. The outer metal rings 1598 are securely fastened or otherwise secured to the lid 1460 at the top of the casing 1512 and the bottom of the casing 1512. Each inner metal ring 1596 is securely fastened or otherwise secured to the bearing mounts at the respective ends. The rubber ring 1600 allows for a small controlled range of relative axial and radial movement between the inner and outer metal rings 1596, 1598. It is an advantage that the vibration isolators 1578 serve to reduce engine vibrations and vehicle induced shock loads from interfering with the rotation of the cartridge 1474 in the housing 1454 and thereby maintaining a long life span for the bearings. The vibration isolators 1578 through the resiliency of the rubber rings 1600 also serve an alignment function to allow for slight angular and displacement alignment of the three sets of bearings 1493, 1494, 1492 without having to make the components of the centrifuge housing with very tight and virtually impossible tolerances. In most machinery, the use of three bearings on a single shaft is considered bad practice. However, by using the vibration isolators, the use of three bearings is not a problem. The resiliency of the rubber rings 1600 allow the three bearings 1493, 1494, 1492 to be easily aligned to receive the shaft and therefore allows the lid 1460 to be easily removed and replaced for maintenance purposes.

By using three sets of bearings the centrifuge is more highly balanced and the gap between the stator and rotor of the motor 1500 is more closely maintained thereby preventing all or substantially all contact between the rotor and the housing. These advantages result in a longer life span of the motor 1500 and the bearings 1493, 1494, 1492. As shown in FIG. 41, the rubber ring 1600 includes larger portions 1602 and smaller portions 1604. The stiffness of the rubber rings 1600 is predetermined by selectively sizing the larger and smaller portions 1602, 1604. In any event, the rings have a continuous periphery to provide a sealing function which is particularly advantageous at the lower end 1458 of the cartridge 1474 where the rubber pieces are exposed. This prevents oil from leaking from the filter 1452 and external contaminants from entering the system.

Another feature is that the range of movement of the vibration isolators 1578 is controlled by snubbing the radial movement of the spinning element thereby to prevent the cartridge 1474 from crashing against the housing 1454 during operation from such things as high vehicle induced shock loads. Specifically, the housing 1454 provides mechanical stops 1608 at a spaced distance 1606 from the outer diameter of the inner metal ring 1596 to snub the movement thereby setting the maximum radial movement distance for the cartridge 1474. The bosses 1532 of the lid 1460 provide the mechanical stops 1608 at the top end of the filter 1452 while the inner circular periphery of the casing 1512 provides a mechanical stop 1608 at the lower end. This provides a highly desired reliability feature for the filter 1452 incorporating the vibration isolators 1578.

Another novel feature is the way in which oil is feed into the filter 1452. The housing 1454 includes an external inlet port connector 1610 on the external periphery of the casing 1512 that is fed into an orifice 1612 on the inside periphery of the casing 1512 at a location in fluid communication with a fluid passage in the lid 1460 in the form of an annular groove 1614 in the cylindrical rim portion 1616 of the lid 1460. The groove 1614 is located between the seals 1498 which are compressed between the lid 1460 and the casing 1512 to ensure a sealed fluid passageway. The inside of the rim portion 1616 includes a hose connector 1618 which is connected by a suitable length of flexible hose 1620 to a hose connector 1622 on the upper bearing mount 1576. The bearing mount 1576 includes an outlet orifice 1626 in fluid communication with the hose connector 1622 that feeds oil into the cartridge 1474. An advantage of this configuration is there are no hoses or wiring to disconnect during cartridge removal and replacement in which the lid 1460 is removed. By tightening the strap 1518 on the lid 1460, the fluid connection between the inlet port connector 1610 and the outlet orifice is very reliable and also very clean with the use of the seals 1498. Moreover, the lid 1460 can be connected at any angular orientation to complete the inlet flow path. A fixed orientation lid may also be provided in an alternative embodiment.

Another advantage of using the bearing mount 1576 for feeding oil into the cartridge 1576 is that the outlet orifice 1626 moves with the centrifuge inlet 1476 during vibrations and shock loads which are carried in part by the vibration isolators 1578. The keeps the outlet orifice 1626 precisely aligned with the inlet 1476 and therefore prevents spillage or splashing out or the cartridge 1474 during normal operation. This also helps maintain a clean operation.

To control the amount of oil flowing into the filter cartridge 1474, a restriction is provided in the flow passageway in the housing 1454 at some point upstream of the filter cartridge 1474. In the preferred embodiment, this is done by closely sizing the outlet orifice 1626 such that it acts as a metering orifice to closely control the amount of oil entering the cartridge 1474. Alternatively or in addition, a metering orifice such as a restriction can be place upstream in the lid 1460 or outer casing 1512 or other appropriate location. Advantageously, the metering orifice controls the residence time of oil in the cartridge 1474. With the oil pressure at the metering orifice and the size of the metering orifice being known, the flow rate into the cartridge can be determined. Because engine oil pressure is relatively constant, the flow rate can thus be controlled. An adjustment mechanism (not shown) may also be provided to control the size of a metering orifice and therefore the flow rate into the cartridge 1474.

As indicated, the minimum g level force necessary for removing soot from oil is about 10,000 time the force of gravity, depending some on the residence time for oil in the centrifuge. The g level force is directly proportion to the inside radius of the element and with the square of the angular speed as shown in the following formula:

$$\text{G level force}=(2.838\times10^{-5})N^2R$$

where:

N=Revolutions Per Minute; and

R=Radius in inches

A 10,000 g level force field for a 7 inch diameter centrifuge requires approximately 10,034 rpm. This means that the outside of the centrifuge is traveling at a lineal speed of 209 miles per hour. This is a very high speed and requires extreme care in the design of the unit in order to get good bearing life, minimize vibration, and minimize wearing of the various parts to get a long filter unit life. Another important element in removing soot from oil using a centrifuge is allowing adequate time for the soot extraction process. At a 10,000 g level force, we have found it takes about an eight-minute average residence time to adequately remove soot from oil. Therefore the necessary flow rate into the centrifuge is calculated by dividing the volume of oil spinning in the centrifuge by the desired residence time, in this case eight minutes. We have found that shortening the residence time below eight minutes in a certain volume unit is counterproductive. For a 1.5 gallon apacity centrifuge of the preferred embodiment (accounting only for oil pinning in the centrifuge at any one time), a flow rate of 0.18 gallons per inute is thus necessary. Thus, this is indeed a relatively large centrifuge with a relative low flow rate as far as engine applications are concerned.

Figure 36:
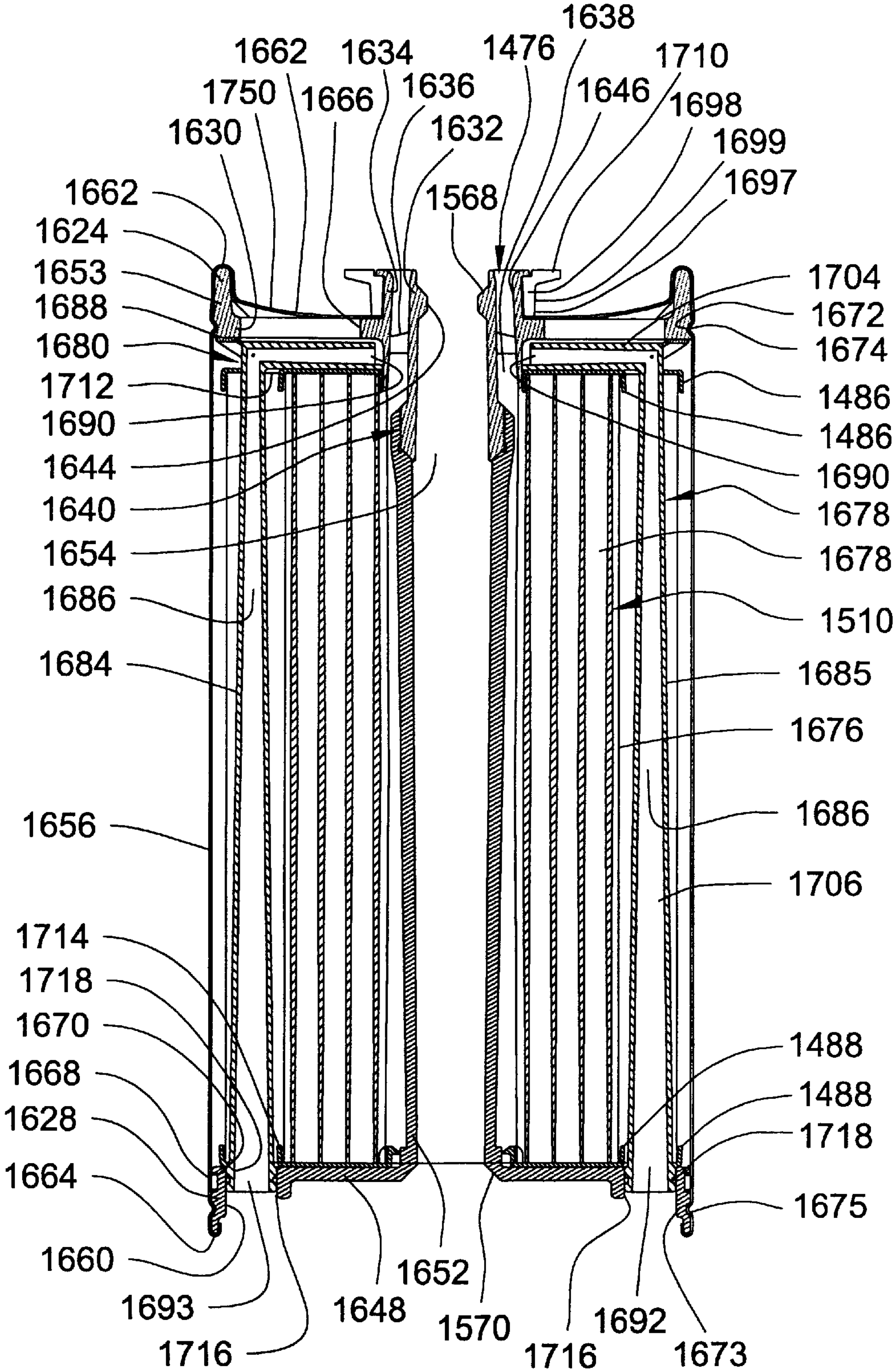
FIG. 36 is a cross sectional view of the replaceable centrifuge cartridge illustrated in FIG. 34.

Referring to FIG. 36, the filter cartridge 1474 generally includes a top end support 1624 and a bottom end support 1628, both of which may be made of aluminum or otherwise formed of a relatively rigid material. The supports 1624, 1628 provide for end cap portions and a center tube portion of the cartridge 1474. In the currently preferred embodiment, the top end support 1624 includes an end plate portion 1630, an inner tube portion 1632, and an outer tube portion 1634 surrounding the inner tube portion 1632 to provide the centrifuge inlet 1476 therebetween. The inner and outer tube portions 1632, 1634 are connected by ribs 1636 that are located at spaced radial intervals therebetween such that there is provided an inlet flow path 1638 into a filtering chamber 1642 of the cartridge 1474. The inner surface 1646 of the outer tube portion 1634 angles outwardly from top to bottom such that centrifugal force urges oil downward into the filter cartridge 1474. The bottom end support portion 1628 includes an end plate portion 1648 and a bottom tube portion 1652 projecting axially upward therefrom. The bottom tube portion 1652 of the lower support 1628 and the inner tube portion 1632 of the upper support 1624 are threadingly connected via interlocking threads 1640 or otherwise connected to secure the top and bottom end supports 1624, 1628. When connected, the tube portions 1632, 1652 provide a central through hole 1654 about the axis of rotation of the cartridge 1474 which receives the drive shaft 1490 therethrough. The tube portions 1632, 1652 also provide the conical contact surfaces 1568, 1570 at respective ends of the cartridge 1474. A cylindrical surface 1644 that is closely toleranced to the outer diameter of the shaft 1490 is also provided for radial alignment purposes to ensure a more symmetrical alignment of the cartridge on the drive shaft 1490. Due to the conical contact surfaces 1568, 1570 that provide the bevel contacts at the top and bottom of the cartridge against the top hex nut 1562, there can be considerable clearance between the shaft 1490 and the inside diameters of the cartridge 1474 (specifically the inner diameters of the upper and lower supports 1624, 1648). This makes the task of mounting the cartridge 1474 into the housing 1454 a much easier task and allows for looser design tolerances when casting the supports 1624, 1628.

An outer cylindrical can 1656 substantially coaxial about the rotational axis connects the outside peripheries of the upper and lower end supports 1624, 1628 and provides the outer radial periphery for the cartridge 1474. The can 1656 in the preferred embodiment comprises formable sheet metal material but could alternatively comprise appropriate plastic or other strong material that can withstand the g level force of 10,000 times the force of gravity when the cartridge is spinning with oil therein. Connection rims 1658, 1660 which project axially from the respective plate portions 1630, 1648 are provided at the outer radial periphery of the respective upper and lower plate portions 1630, 1648 to provide for connection of the can 1656. Upper and lower end portions 1662, 1664 of the can 1656 are hemmed around the connection rims 1658, 1660 to enclose the filtering chamber 1642 between the cylindrical can 1656 and the center tube portion of the supports 1624, 1628. The upper end portion 1662 also extends radially inward to cover a plurality of openings 1666 in the upper plate portion 1630. The openings 1666 reduce the material and therefore the cost of the upper support 1624. An outer ring gasket 1668 is seated in a groove 1670 and compressed between the bottom end support 1628 and the can 1656 to prevent oil and soot leakage between the can 1656 and the bottom end support 1628. Outer peripheral annular grooves 1672, 1673 are also provided in the upper and lower end supports 1624, 1628 into which the can 1656 is beaded to provide annular beads 1674, 1675 which provide axial support and retention and serve to more rigidly hold the cartridge 1474 together to better ensure a more balanced axis of symmetrical about the rotational axis of the cartridge 1474. The beads 1674, 1675 stretch the metal of the can 1656 to place it in slight tension to hold the cartridge 1474 more tightly together.

Figure 42:
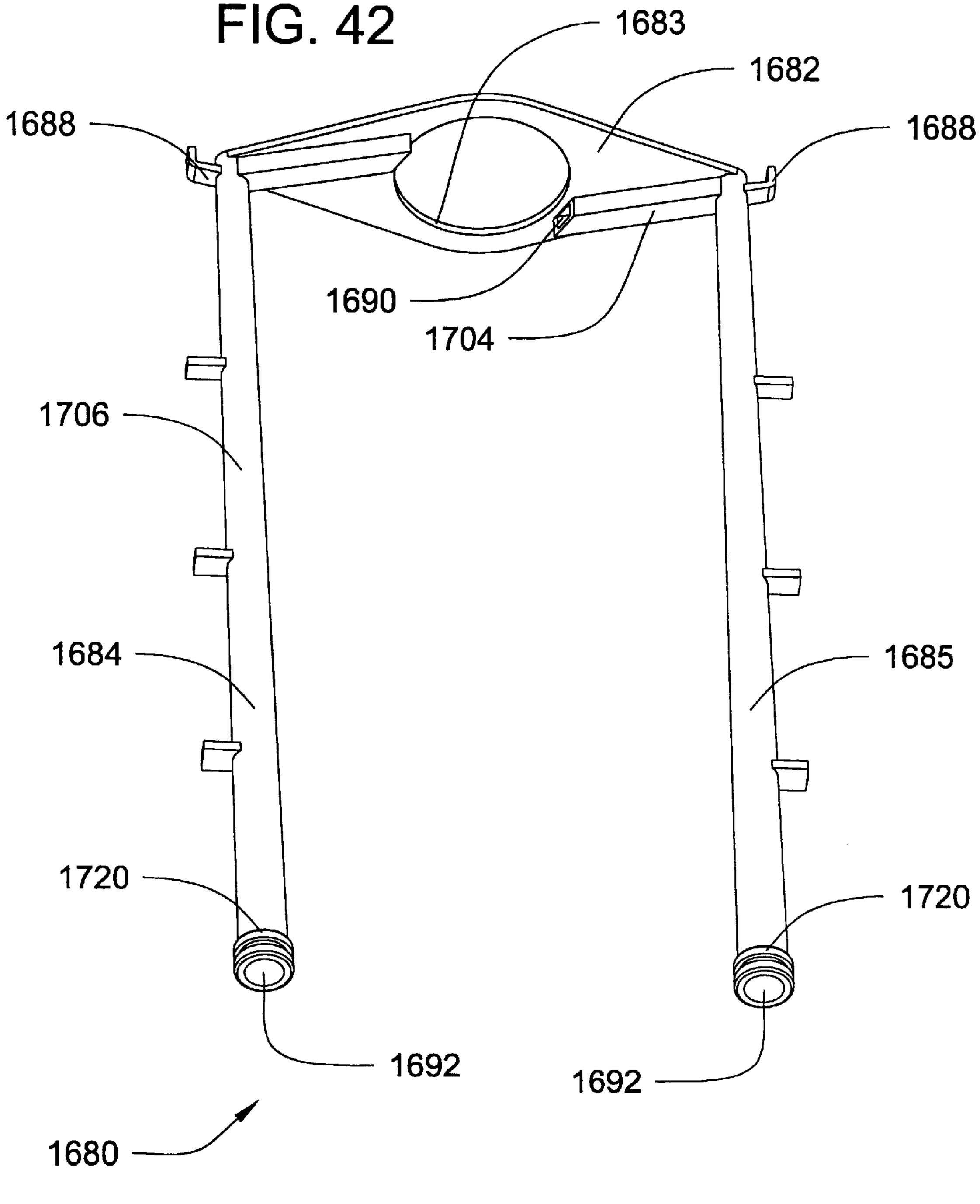
FIG. 42 is a perspective view of the outlet tube member used in the cartridge of FIG. 36.

Closely located in the filtering chamber 1642 is a filter element 1676 which generally includes top and bottom end caps 1486, 1488, a contaminant trap 1678 and an outlet tube member 1680. The ends of the contaminant trap 1678 are potted in the respective top and bottom end caps 1486, 1488 with a suitable potting compound such as epoxy of plastisol or otherwise secured thereto. Referring to FIG. 42, the outlet tube member 1680 includes a cross support in the form of a plate portion 1682 which is situated between the top end cap 1486 and the top end support member 1624 and a pair of outlet tubes 1684, 1685. The plate portion 1682 includes a central opening 1683 which closely receives the outer tube portion 1634 of the upper support 1624. The outlet tube member 1680 may be a unitary member formed from molded plastic material. The top and lower end support members 1624, 1628 are sufficiently screwed together to place the filter element 1676 tightly therebetween for better retention and symmetry purposes. By beading the can 1656 at 1674, 1675, the filter element is placed in slight compression to prevent any rattling and to ensure a more fixed axis of symmetry. The outlet tube member 1680 preferably includes resilient projections 1688 engaging the top end support 1624 to store an axial force that prevents axial movement and therefore rattling of the filter element 1676 in the cartridge 1474. Other resilient means as a spring washer or separate rubber ring may also be used to prevent axial movement of the filter element 1676 if so desired.

The outlet tube member 1680 includes two 180° spaced apart outlet tubes 1684, 1685 for symmetry purposes. Another novel feature of the present invention is that the outlet tubes 1684, 1685 provide a pair of enclosed flow passageways 1686 having oil entrances 1690 near the top of the cartridge 1474 at a point preferably above the filter element 1676 and an oil exits 1692 near the bottom of the cartridge 1474 to direct clean oil toward the housing outlet 1468. This prevents drainage of sooty oil which agglomerates near the bottom of the filter during idle periods between operation. This also prevents oil from splashing all over the inside of the casing 1512 and flowing between the casing 1512 and the outer can 1656 of the cartridge 1474. Advantageously this provides for clean filter maintenance in that there is little or no oil to deal with during cartridge replacement. The mechanic can simply grab the used cartridge 1474 for removal. Locating the oil exits 1692 near the bottom also prevents oil from engaging the axial length of the outer can 1656 of the cartridge 1474 which could cause rotational drag that would undesirably slow down the rotational speed of the cartridge 1474 and result in less efficient soot removal.

Another feature is that the cartridge 1474 includes a handle 1694 at its top end to facilitate easy removal by a mechanic. The handle 1694 includes a connection portion 1697 secured into a recess 1699 of the upper support 1624 a radially projecting handgrip portion 1710 that can be easily grasped by a mechanic. The handgrip portion 1710 is round and preferably smooth to prevent wind resistance during rotation. The handle is coaxial with the axis of rotation to maintain proper balance of the cartridge 1474 about the rotational axis.

The oil exits 1692 discharge into an annular trough 1696 formed in the lower portion of the casing 1512 of the outer housing 1454. The trough 1696 includes an inner wall 1698 whose upper portion may angle radially inward to a point having a smaller diameter than that of the innermost diameter of the oil exits 1692 such that oil is directed into the trough 1696 even when the cartridge 1474 is idle. The trough 1696 has a recessed segment 1700 to accommodate the electronics housing 1702 which carries electrical wires to the motor 1500. The electronics housing 1702 is secured to the lower bearing mounting assembly 1514 such that the electronics housing 1702, and therefore sufficient space is provided between the casing 1512 and the electronics housing 1702 such that movements of the mounting assembly 1514 (as allowed by the vibration isolators 1578) prevents any crashing between the casing 1512 and the electronics housing 1702.

The oil entrances 1690 of the outlet tubes 1684, 1685 are located at a diameter that is greater than the diameter of the outermost diameter of the centrifuge inlet 1476 to ensure that oil does not exit through the centrifuge inlet 1476 during rotation. The oil entrances 1690 are preferably located radially inward from the inner periphery of the can 1656 where soot and sooty oil collect. This better prevents soot and sooty oil from undesirable entering the outlet tubes 1684, 1685. In the preferred embodiment, the entrances 1690 are located as radially inward as possible in radial proximity to the inner diameter of the containment trap 1678 to provide for maximum benefit.

In this embodiment, the outlet tubes 1684, 1685 are elbow shaped to include a primarily radial conduit 1704 and a primarily axial conduit 1706. The axial passageways 1706 angle slightly outwardly from top to bottom to ensure that centrifugal force urges the oil towards the oil exits 1692. The radial passageways 1706 are preferably located above the upper end cap 1486. To accommodate the outlet tubes 1684, 1685, the containment trap 1678 includes axially extending channels 1708 (see FIGS. 37 and 38) coinciding with the spacing of the tubes 1684, 1685, the end caps 1486, 1488 include openings 1712, 1714 to allow the tubes 1684, 1685 to extend therethrough, and the lower end support 1628 includes apertures 1716 to allow the tubes 1684, 1685 to discharge through the bottom end of the cartridge 1474. It is also possible to allow the tubes 1684, 1685 to exit through the side of the cartridge 1474 at or near the bottom end of the cartridge 1474, but such configuration would undesirably result in a less clean environment for maintenance purposes. Ring seals 1718 are disposed between the lower end support 1628 and the outlet tubes 1684, 1685 to prevent sooty oil and soot near the radial periphery and bottom end of the cartridge 1474 from exiting the cartridge 1474. The seals 1718 are seated in grooves 1720 in enlarged fittings near the bottom ends of the tubes 1684, 1685.

Figure 37:
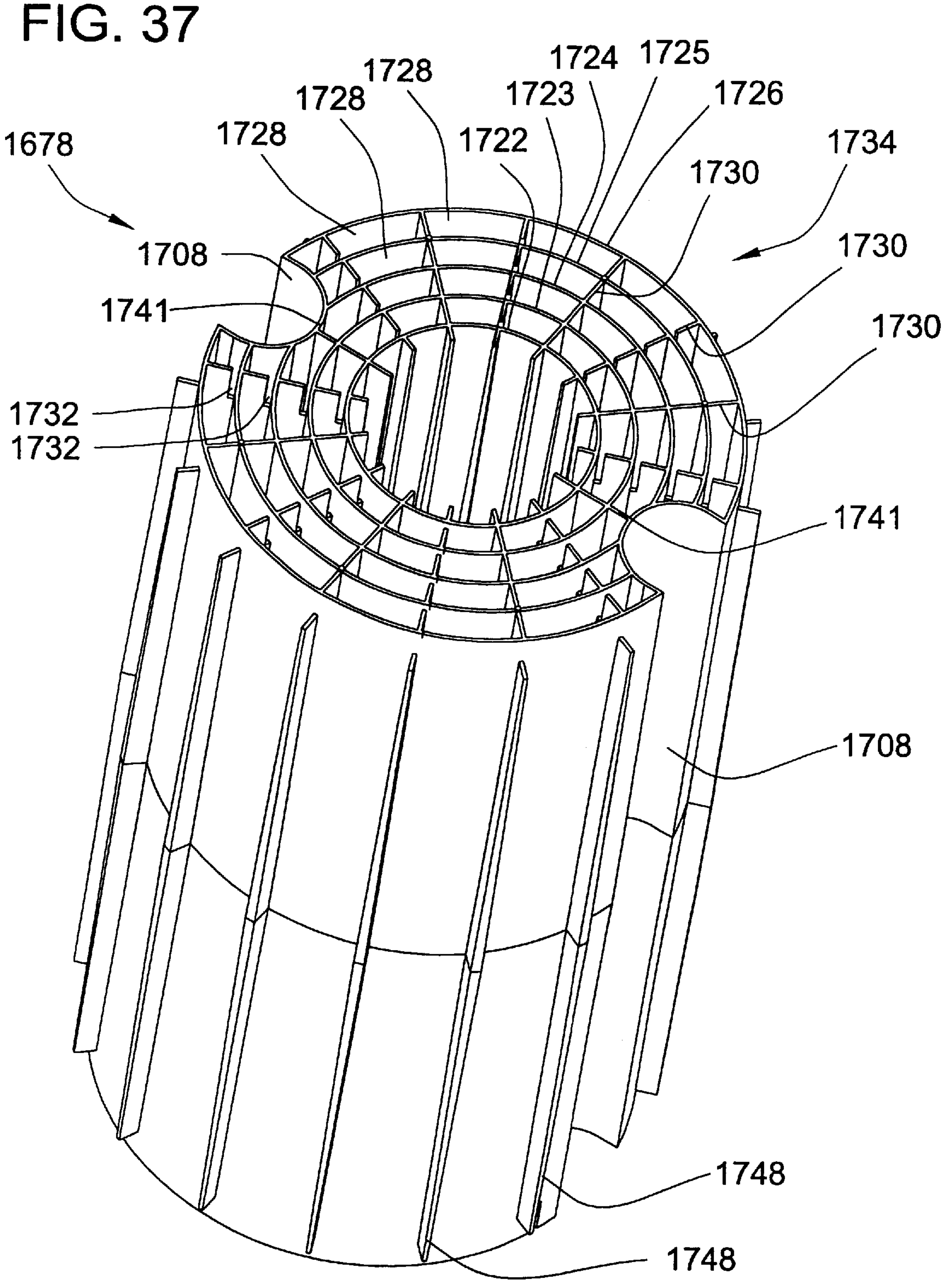
FIGS. 37 and 38 are top and bottom perspective views of the containment trap of the replaceable centrifuge cartridge illustrated in FIG. 36.
Figure 38:
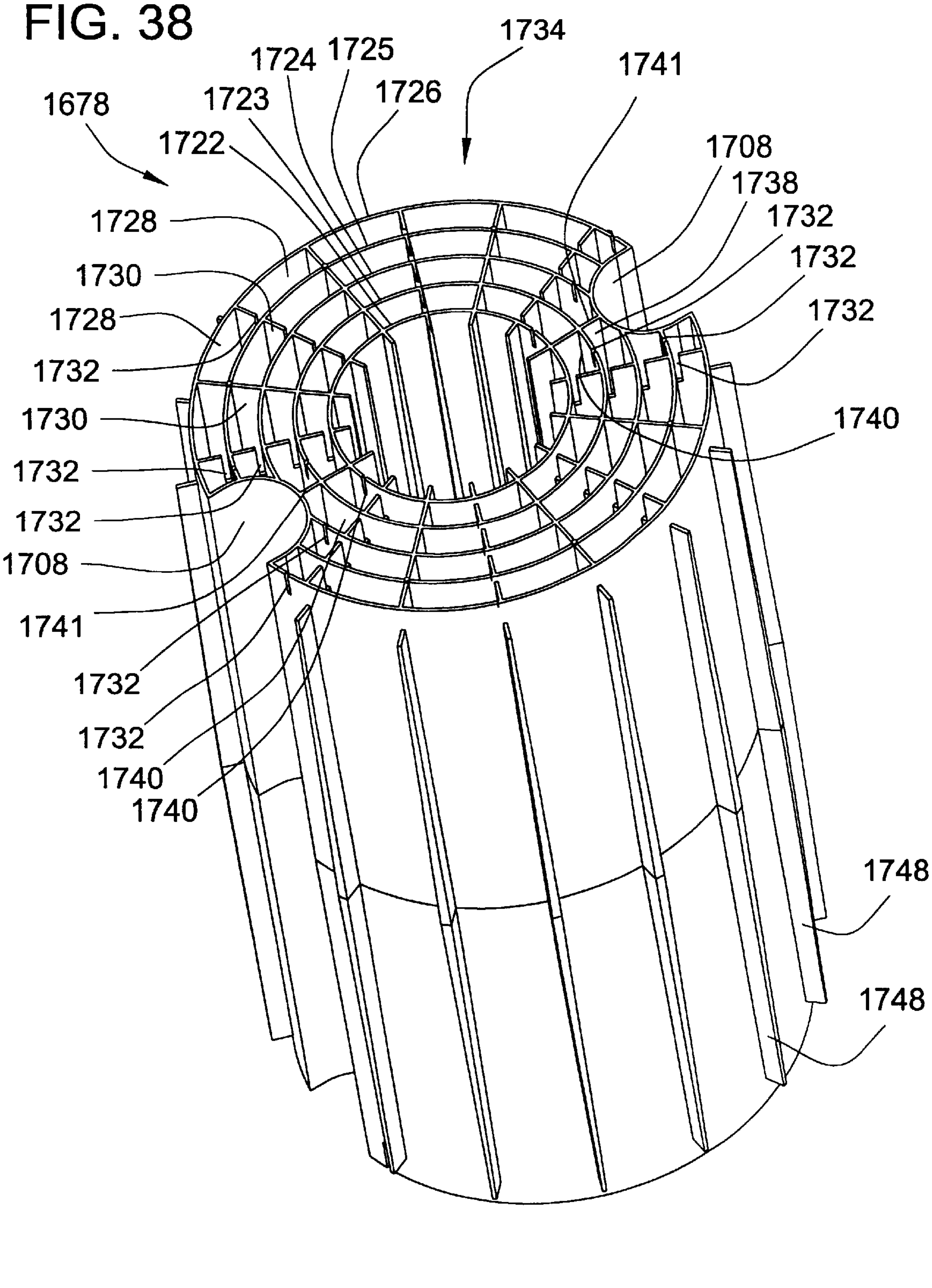
Figure 39:
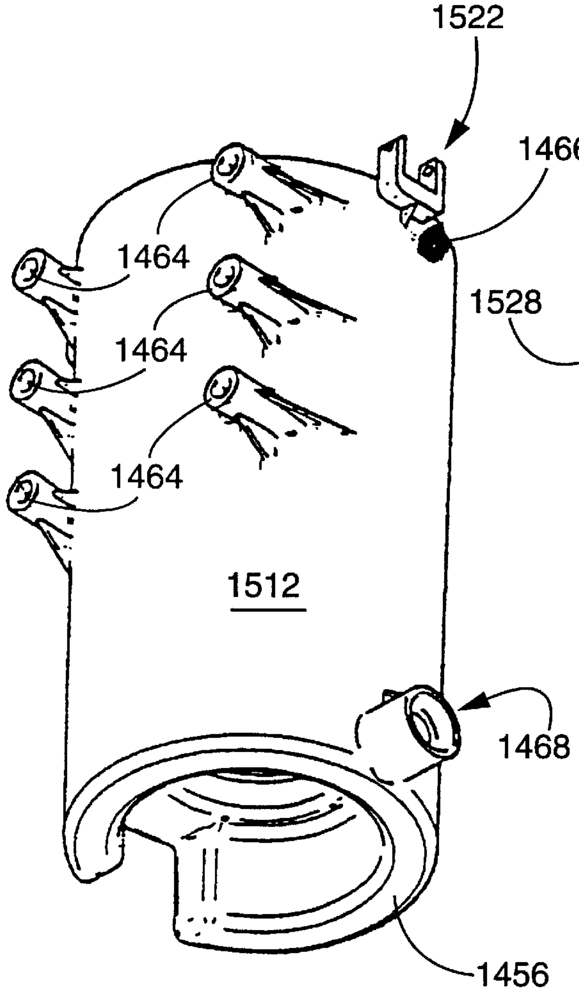
FIGS. 39 and 40 are perspective views of the outer casing used in the filter housing of FIG. 35.
Figure 40:
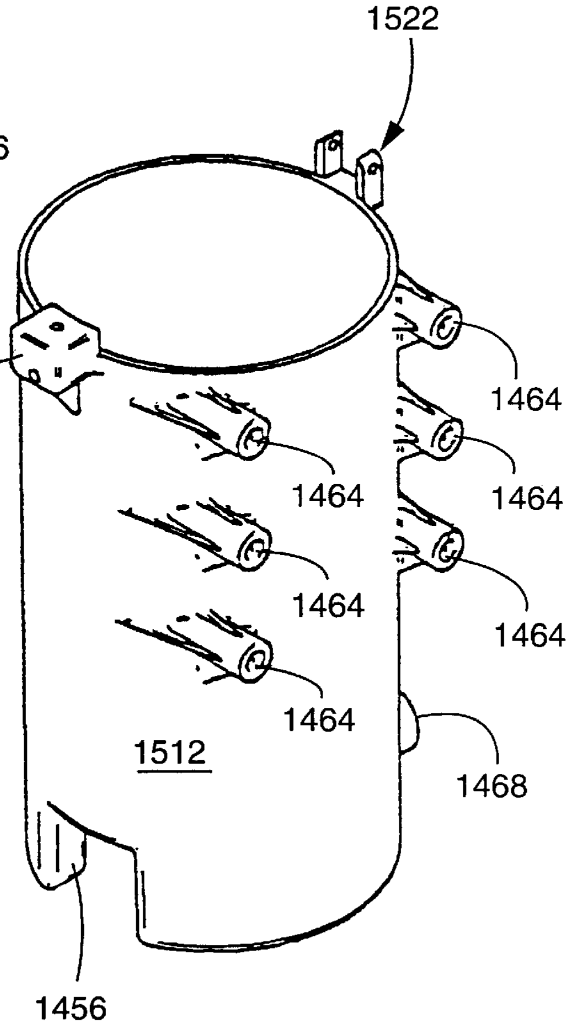
Figure 44:
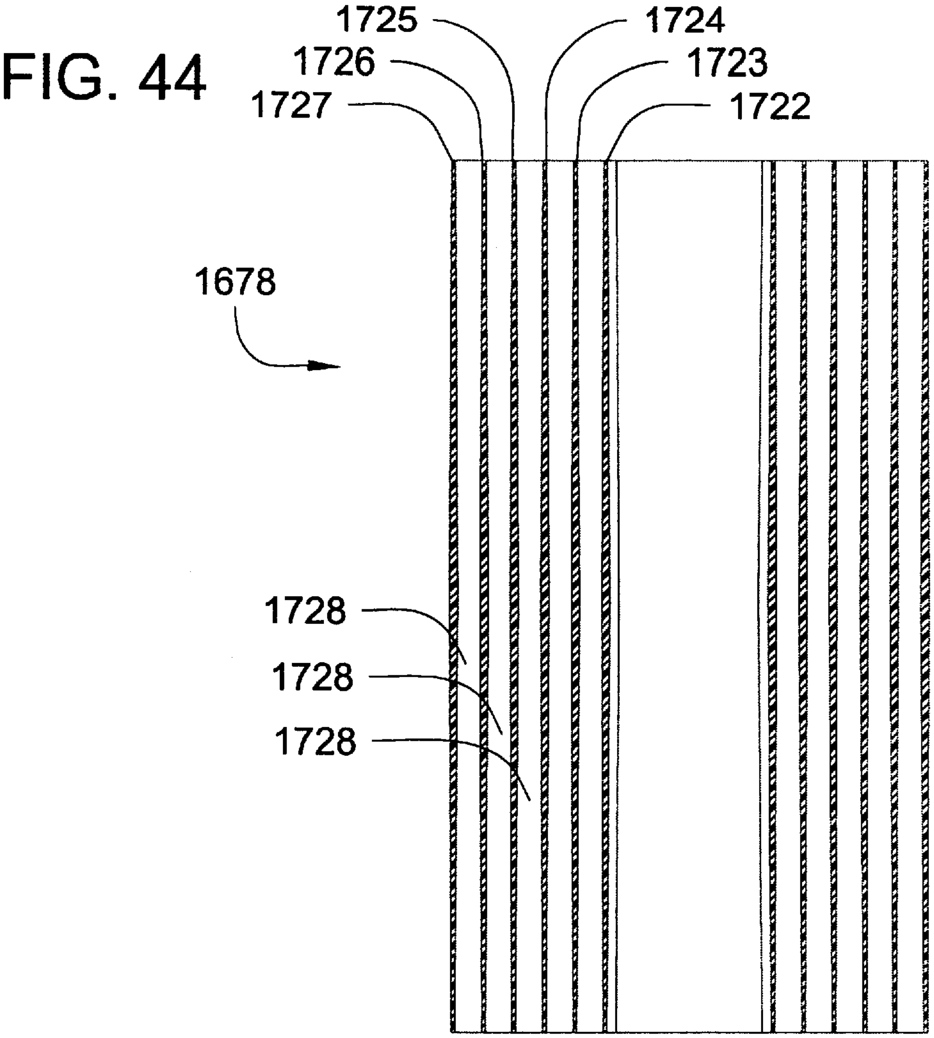
FIG. 44 is a cross-section of FIG. 43 taken about line 11—11.
Figure 43:
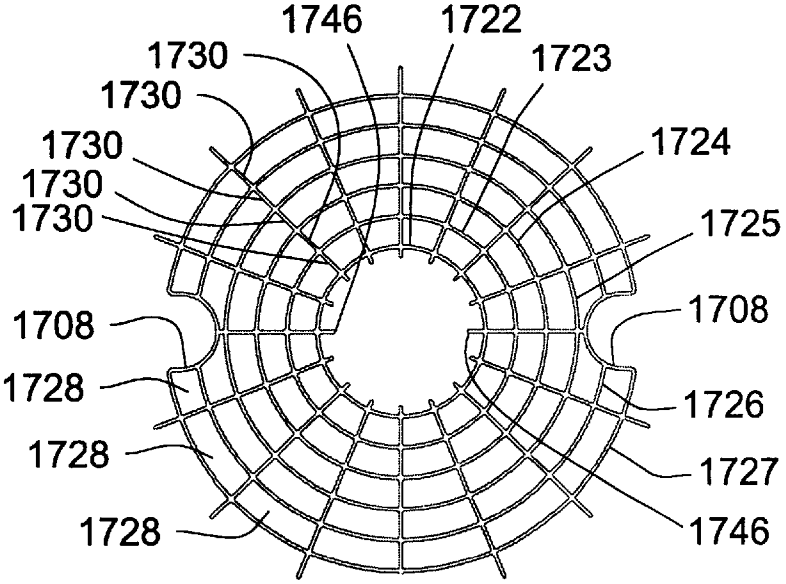
FIG. 43 is a top end view of the containment trap illustrated in FIGS. 37 and 38.
Figure 45:
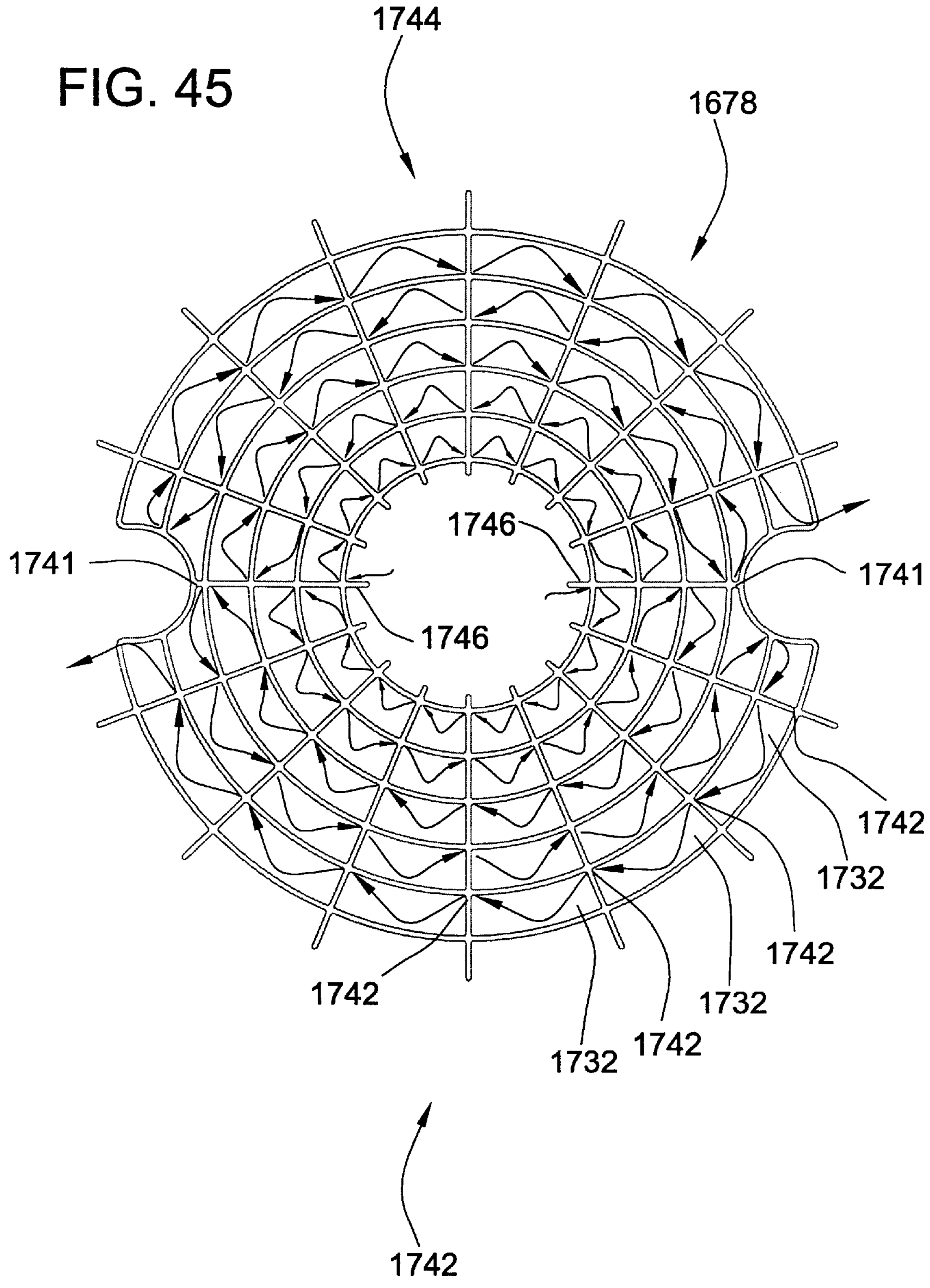
FIG. 45 is a schematic flow diagram illustrating the flow of oil through the containment trap of FIGS. 37 and 38.

The soot containment trap 1678 is another novel feature of the present invention. The soot trap 1678 includes several radial levels, in this case five levels, provided between six substantially cylindrical walls 1722–1727 which are generally concentric and coaxial and have progressively larger diameters. The middle portion of each wall 1722–1727 may have a slightly larger crosssectional thickness as shown in FIG. 44. Each level is broken up into several separate chambers 1728 by spaced vertical partition walls 1730. The partition walls 1730 are located at spaced intervals for each level for balance and strength purposes. The partition walls 1730 also prevent waves from forming in the oil during rotation of the cartridge 1474 which could otherwise cause an imbalance in the rotation of the cartridge. Each chamber 1728 is axially elongate running from the bottom end to the other end of the element 1676. With reference to FIGS. 37, 38 and 12, it can be seen that each chamber 1728 has a slot 1732 in two of its walls providing an oil entry at one end of the trap 1678 and another slot 1732 providing an oil exit at the other end of the trap 1678. This arrangement of slots causes oil to travel the entire length of the chamber 1728 in order to reach the next adjacent chamber. To facilitate an easier understanding of the configuration, the schematic diagram of FIG. 45 showing and end view of the trap is provided with flow lines indicating the flow of oil through the trap and circles schematically indicating slots at the top end and squares indicating slots at the bottom end of the trap. Each slot serves as an oil exit for one chamber and an oil entrance for the adjacent downstream chamber. The slots 1732 formed into the containment trap 1678 are axially long enough such that potting compound (such as epoxy or plastisol) does not cover up the slots 1732 when the end caps 1486, 1488 are affixed to the ends of the trap 1678.

In most of the chambers 1728, the slot 1732 is located in the partition walls 1730 in proximity to the inner diameter cylindrical wall, to maximize the oil holding capacity of the chamber 1728 during rotation so that oil movement travels slowly through the chamber. This also forces oil to exit the chamber 1728 at a shorter radius than the bulk of the space in the chamber 1728, thus only allowing the lighter weight oil that is more free of soot to move from one adjacent trap chamber 1728 to the next. The bulk of the space in the chamber 1728 also serves to provide a large volume and surface area for soot agglomeration.

Although most of the slots are located in partitions walls, the first and last chamber of each level designated at 1738, 1740 facilitates flow between levels. In particular, a slot 1732 is provided in each of the cylindrical walls 1722–1727 between the last chamber of the inner level and the first chamber of the next outer level. In the preferred embodiment, the oil flow through the containment trap 1678 is split into two separate flow paths generally indicated at 1742, 1744 as indicated by the schematic diagram of FIG. 12. Solid dividing walls 265 that are 180° apart separate the trap 1678 into the separate flow paths 1742, 1744. The separate flow paths 1742, 1744 are provide on respective halves of the trap 1678 and are identical to each other to ensure that when the cartridge 1474 is filled with oil, the cartridge 1474 stays balanced about its axis of rotation. The number of separate flow paths can be adapted as desired, but preferably two different flow paths are provide for initial balancing of the filter when it is filling with oil. To ensure that oil fills the cartridge evenly during initial operation, the containment trap 1678 also includes inner projecting flow dividing fins 1746 spaced opposite each other that serve to divide the oil flow entering the centrifuge inlet 1476 between flow paths 1742, 1744 evenly. Preferably the dividing fins 1746 are located adjacent the first chamber which receives inlet flow into the trap 1678. The trap also includes locating fins 1748 at its outer periphery which serve to locate the trap concentrically within the outer can 1656.

The trap 1678 has several advantages. One advantage is that the geometry provides a large surface area to which soot can agglomerate and adhere. The heavier soot particles are more like to be trapped at a radially inward location and therefore less likely to pass through the centrifuge cartridge 1474. The cylindrical shape of the walls 1722–1727 and symmetry of the partition walls 1730 and oil slots 1732 each attribute to a trap 1678 that is intrinsically balanced about the driven axis of rotation. The trap 1678 also fills up evenly with oil at startup with the smaller radius ribs 1746 ensuring that inlet flow is divided evenly between flow paths 1742, 1744. The symmetry and balance features ensure longer bearing and motor life for the centrifuge housing 1454. This is important because it is desirable to have a 10,000 to 15,000 hours of operation of the centrifuge without fail thereby having a requirement of 6 to 9 billion rotations of the drive components of the housing 1454 without fail. To ensure a more balanced cartridge 1474, the top surface 1750 of the cartridge is sheet steel which provides an area which can receive weights from a balancing machine operation upon which weights are attached to more precisely balance the cartridge 1474 about the axis of rotation.

Figure 46:
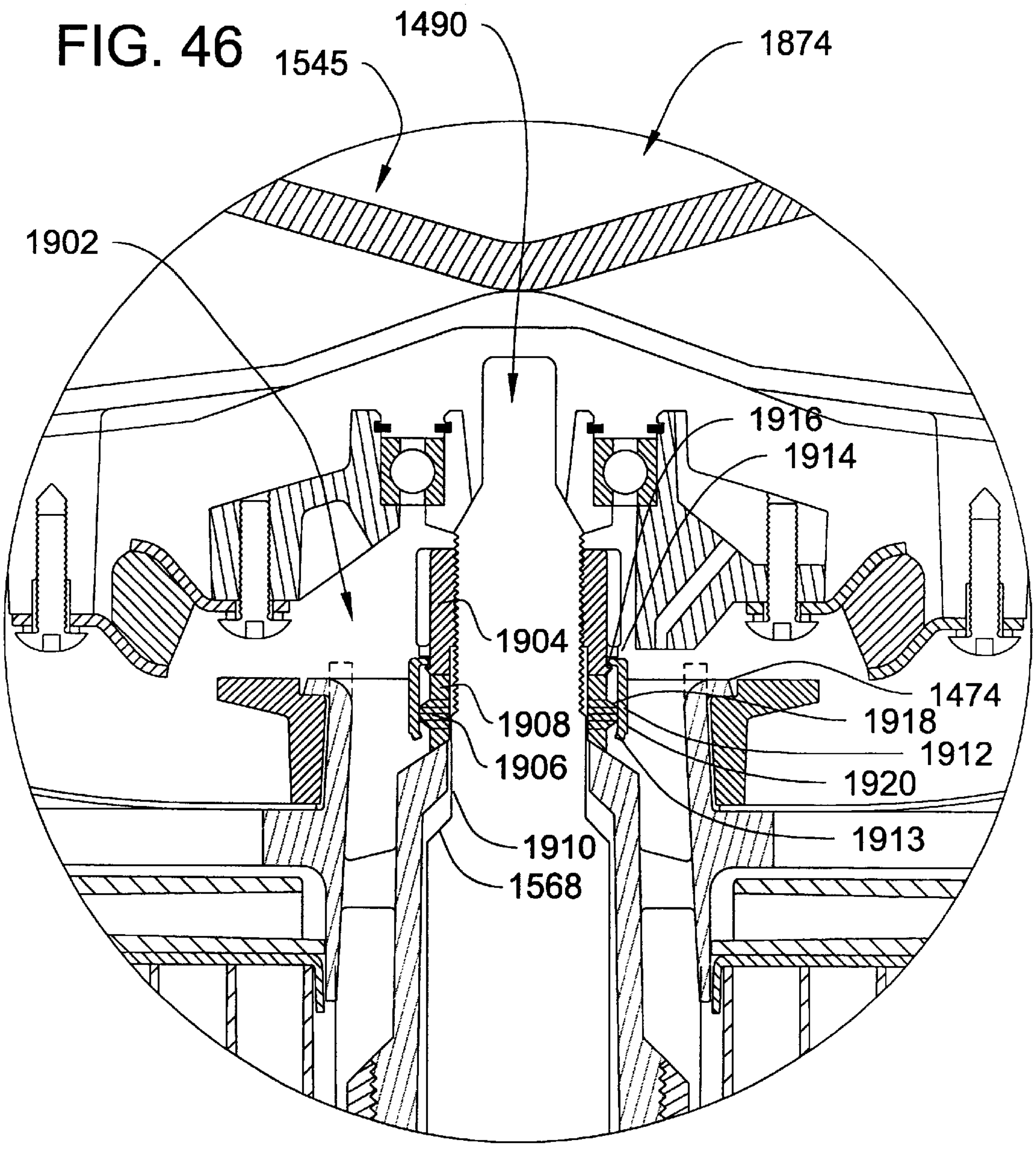
FIG. 46 is a cross-sectional view of a portion of a centrifugal filter similar to that illustrated in FIG. 34 but with a thermal expansion and contraction mechanism according to another embodiment of the present invention.

Referring to FIG. 46, another embodiment of a filter 1874 is shown that in all material respects is identical to that illustrated in FIG. 34 but also includes a mechanism 1902 that allows for thermal expansion and contraction between aluminum inner tube of the cartridge 1474 and steel shaft 1490 of the housing 1454 to continuously hold the spinning centrifuge cartridge 1474 on the drive shaft 1490 over a wide range of temperatures. Aluminum expands about twice as much as steel for a given temperature excursion. With a 13.5 inch length of the aluminum tube and a temperature excursion of between 40° F. and 100° F., the difference in expansion between the aluminum tube and the drive shaft 1490 is about 0.011 inches. This accounts for temperature differences as the vehicle carrying the filter travels through different geographic regions and climates.

The mechanism 1902 generally includes an element secured to the shaft 1490 in the form of a hex nut 1904, a seating element 1906 movable relative to the shaft 1490 but fixed relative to the cartridge 1474, and a resilient element such as a spring or in this case a lock washer 1908 that is supported by the hex nut 1904 to act on the seating element 1906. The seating element 1906 provides a beveled contact surface 1910 that engages the upper beveled surface 1568 of the cartridge 1474. The lock washer 1908 is capable of compressing and expanding over a range of at least the anticipated expansion difference between the hex nut 1904 and the seating element 1906, in this case, 0.011 inches. The resiliency of the washer 1908 is rigid enough to prevent most engine vibrations and shock loads from unseating the seating element 1906 from the beveled contact surface 1568 of the cartridge 1474.

To retain the nut 1904, the seating element 1906 and the lock washer 1908 in one assembly to prevent a mechanic from losing a part, a retaining element in the form of a plastic tube 1912 is provided. The plastic tube 1912 has a castellated end 1914 that is snapped into a groove 1916 on hex nut 1904. The other end 1916 is ultrasonically deflected radially inward to retain a shoulder 1918 on the seating element 1906. The distance between the shoulder 1918 and the end 1916 is set greater than the anticipated contraction and expansion differential. The outer surface 1920 of the tube angles radially outwardly from top to bottom at a slight draft angle to prevent oil which may come in contact therewith from being centrifugally driven upwards out of the cartridge 1474.

Referring to FIGS. 47–70, a preferred embodiment of the present invention is shown which incorporates some of the concepts demonstrated in FIGS. 1–46 and can incorporate other concepts demonstrated in these previous embodiments. The preferred embodiment of FIGS. 47–70 take the form of a centrifuge filter 2052 which includes a centrifuge housing 2054 and a centrifuge cartridge 2076 mounted in the housing for rotation inside the housing to remove soot from oil or other such contaminants.

Figure 47:
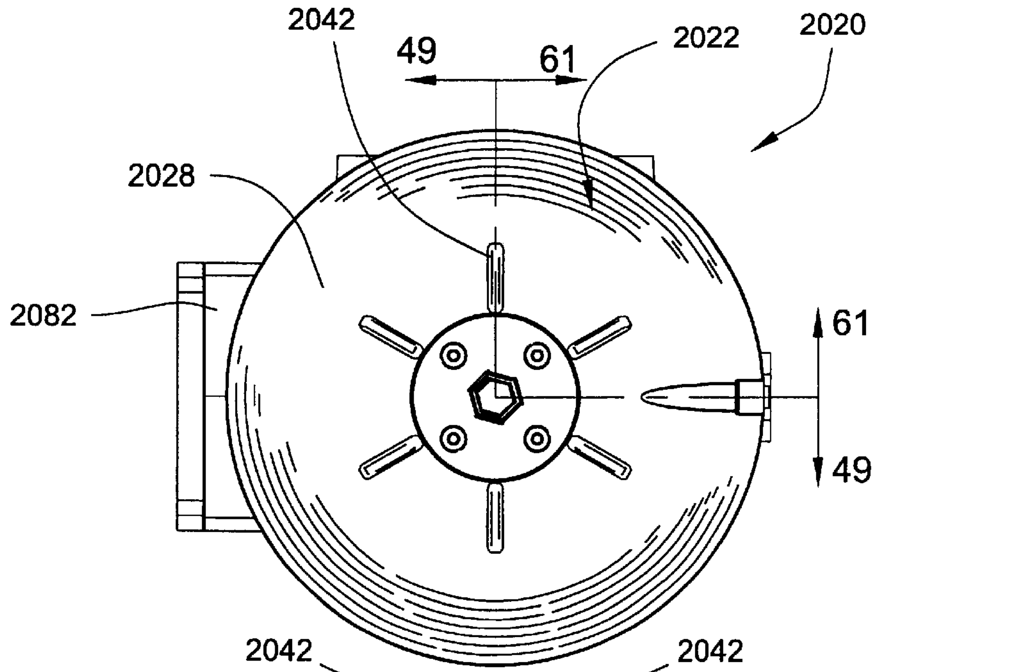
FIG. 47 is a top view of a preferred embodiment including a centrifuge housing and a centrifuge cartridge inserted therein, in accordance with a preferred embodiment of the present invention.
Figure 48:
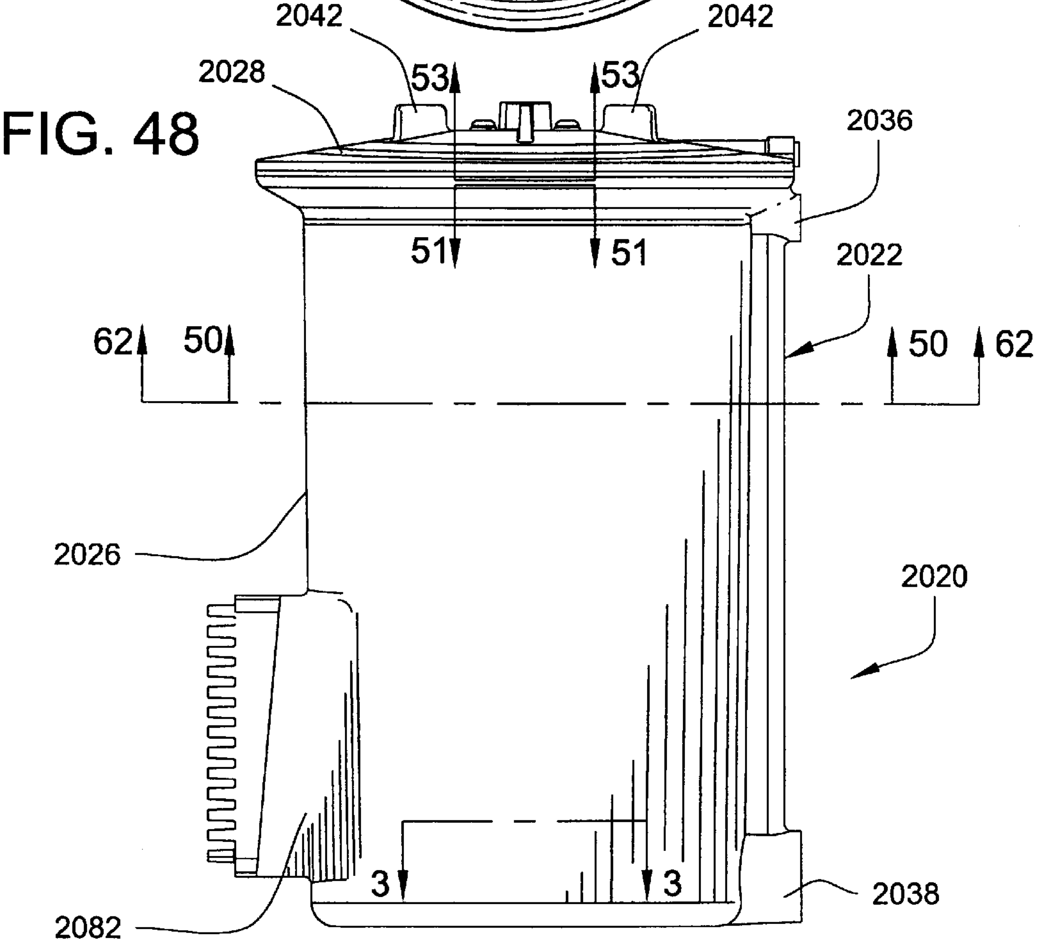
FIG. 48 is a side view of the centrifuge filter illustrated in FIG. 47.
Figure 49:
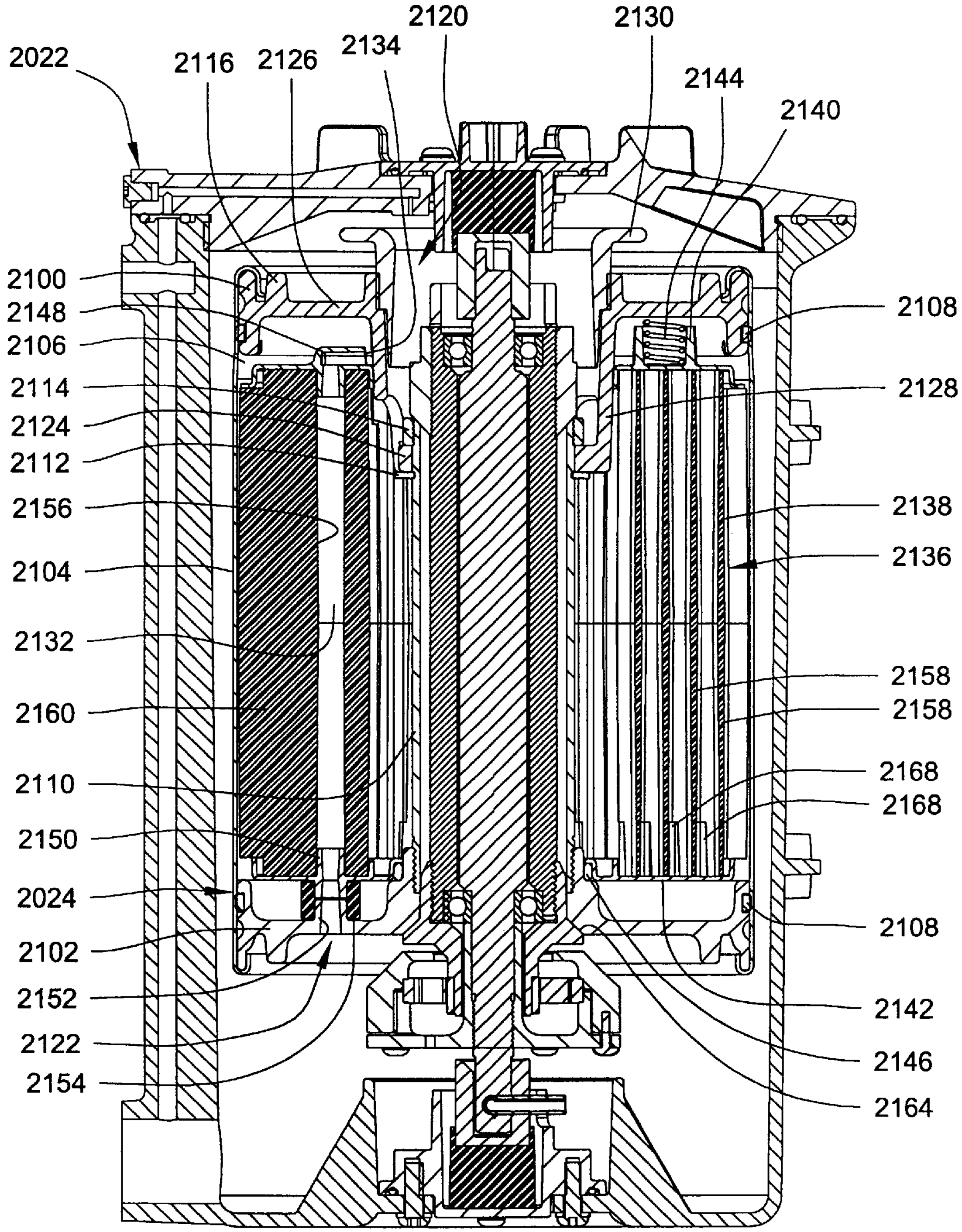
FIG. 49 is a cross section of the centrifuge filter shown in FIG. 47, taken about line 49—49.
Figure 50:
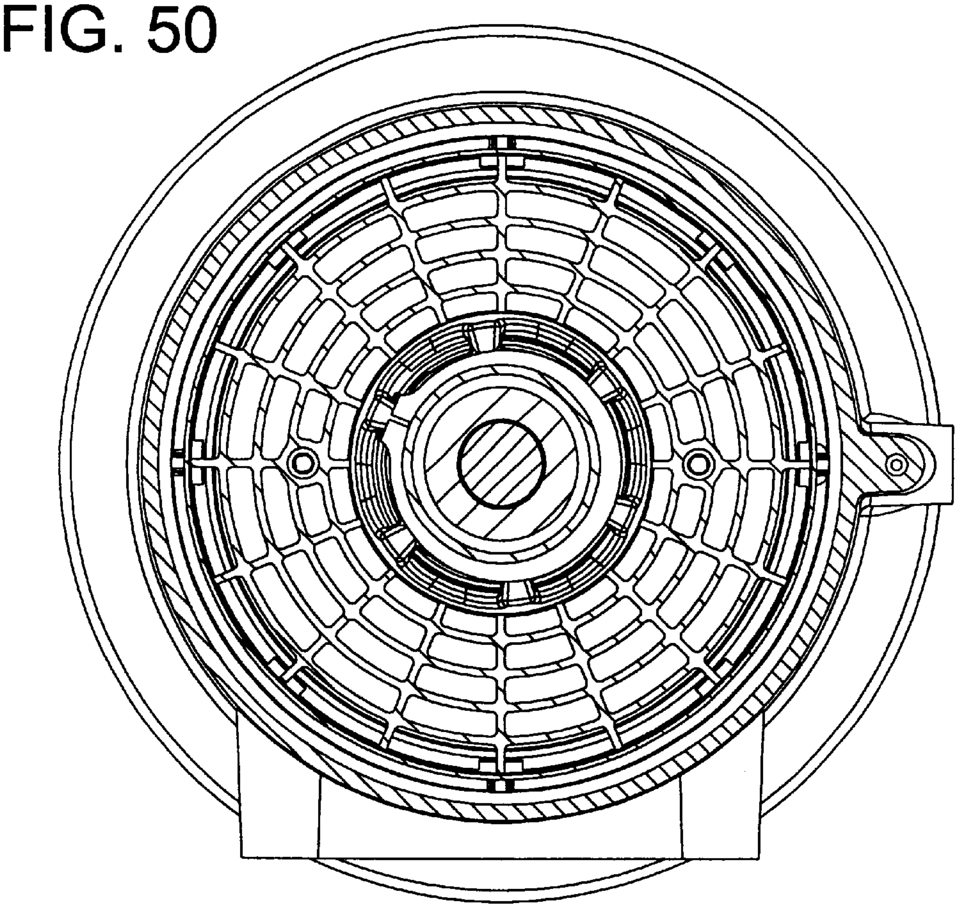
FIGS. 50–53 are cross sections of the centrifuge filter shown is FIG. 48 taken about lines 50—50, 51—51, 52—52, and 53—53, respectively.
Figure 51:
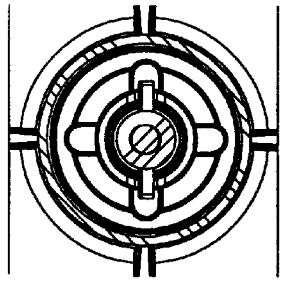
Figure 52:
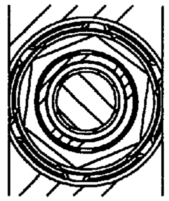
Figure 53:
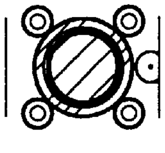
Figure 61:
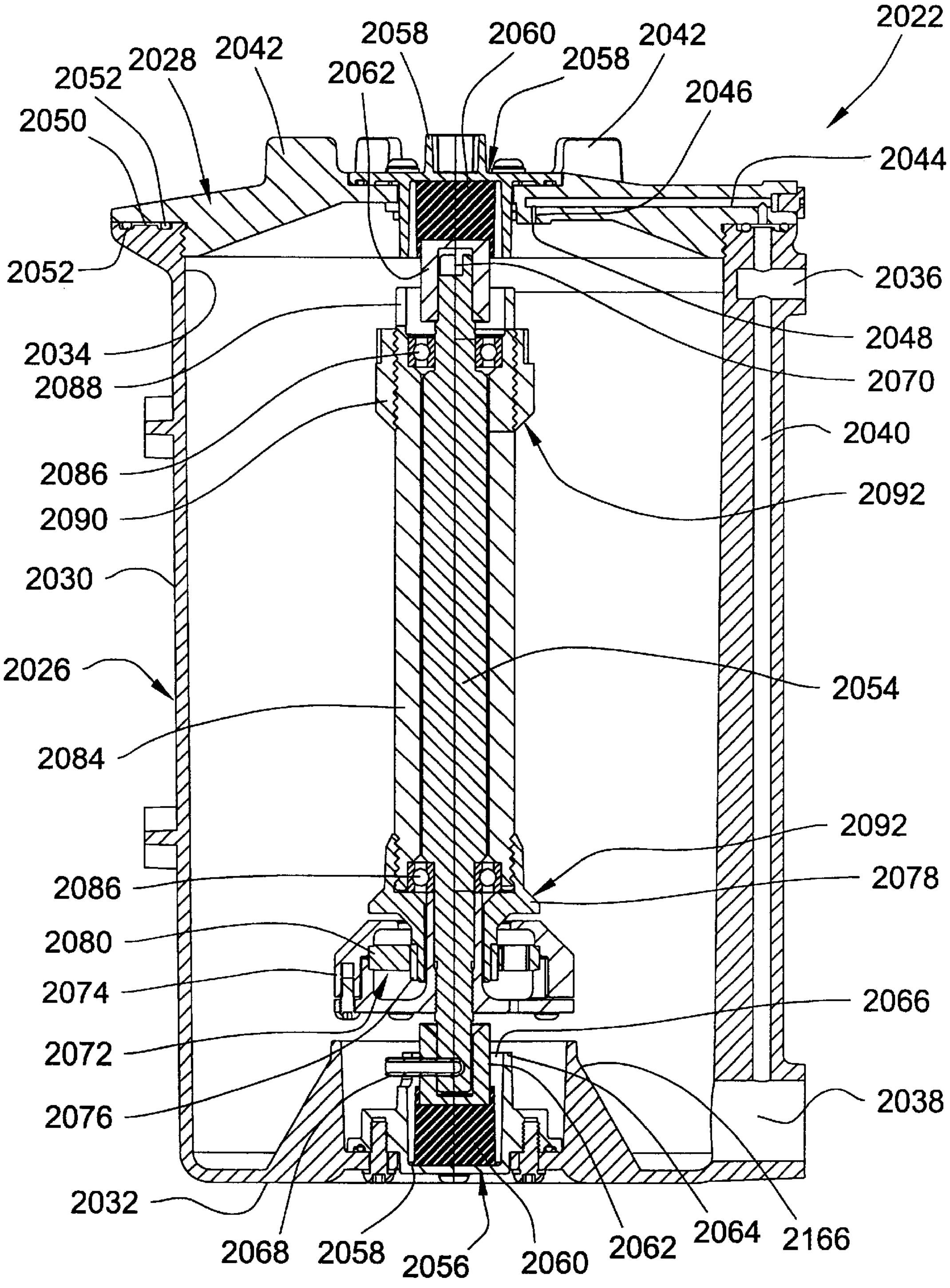
FIG. 61 is a cross section of the centrifuge filter of FIG. 47 taken about line 61—61, with the centrifuge cartridge removed.
Figure 62:
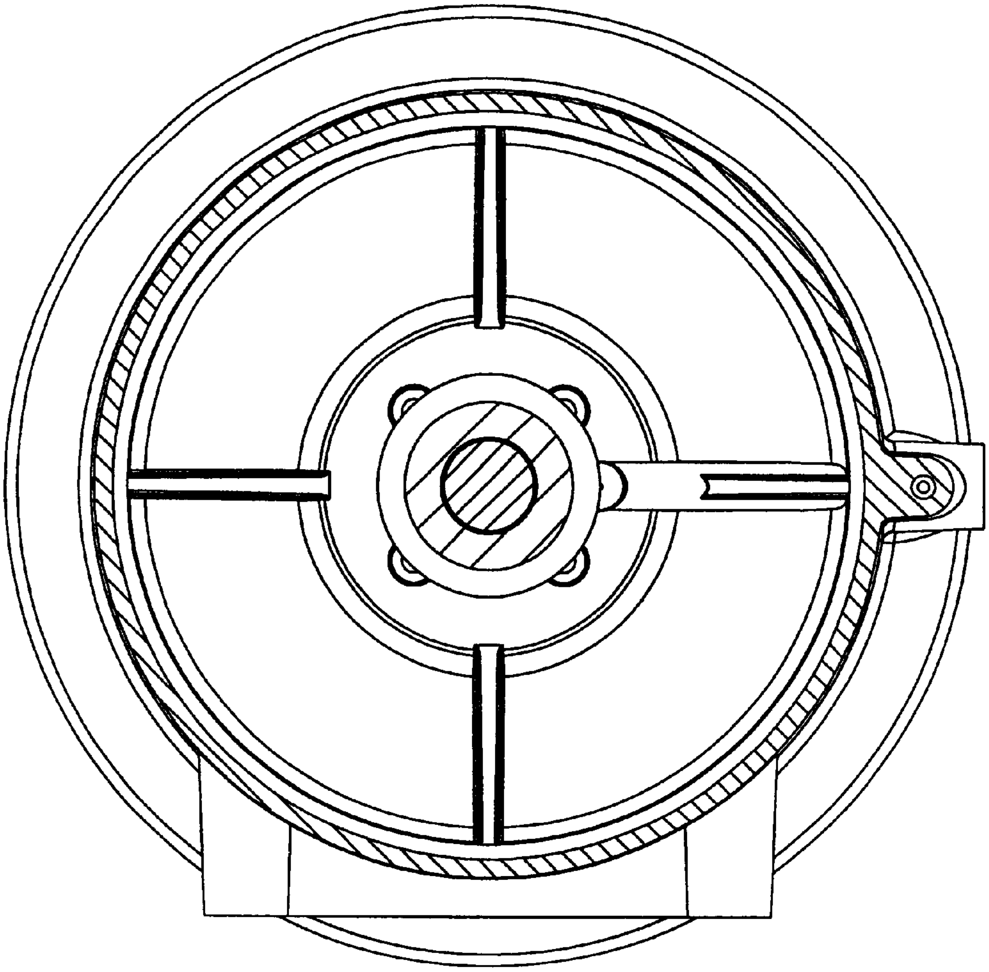
FIG. 62 is a cross section of FIG. 48 taken about line 62—62, with the centrifuge cartridge removed.
Figure 63:
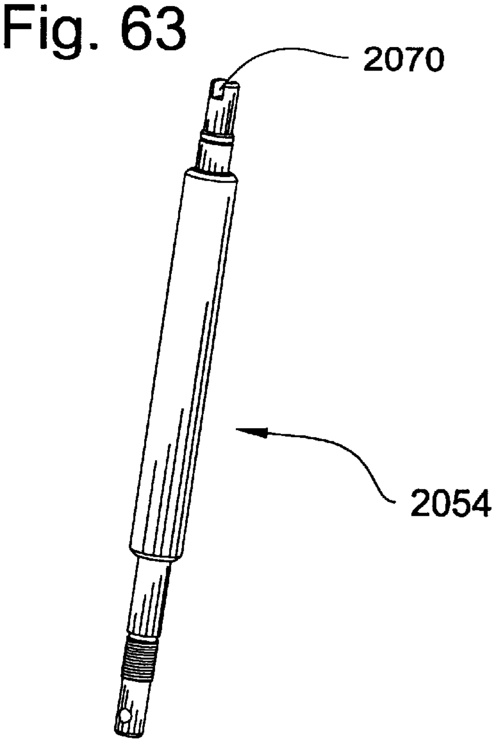
FIGS. 63–70 are perspective views of the various components of the centrifuge housing shown in FIG. 61.
Figure 64:
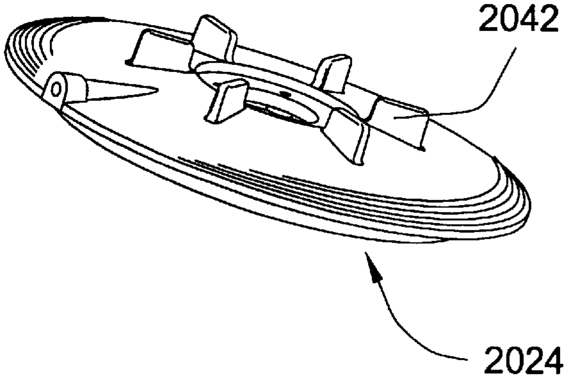
Figure 65:
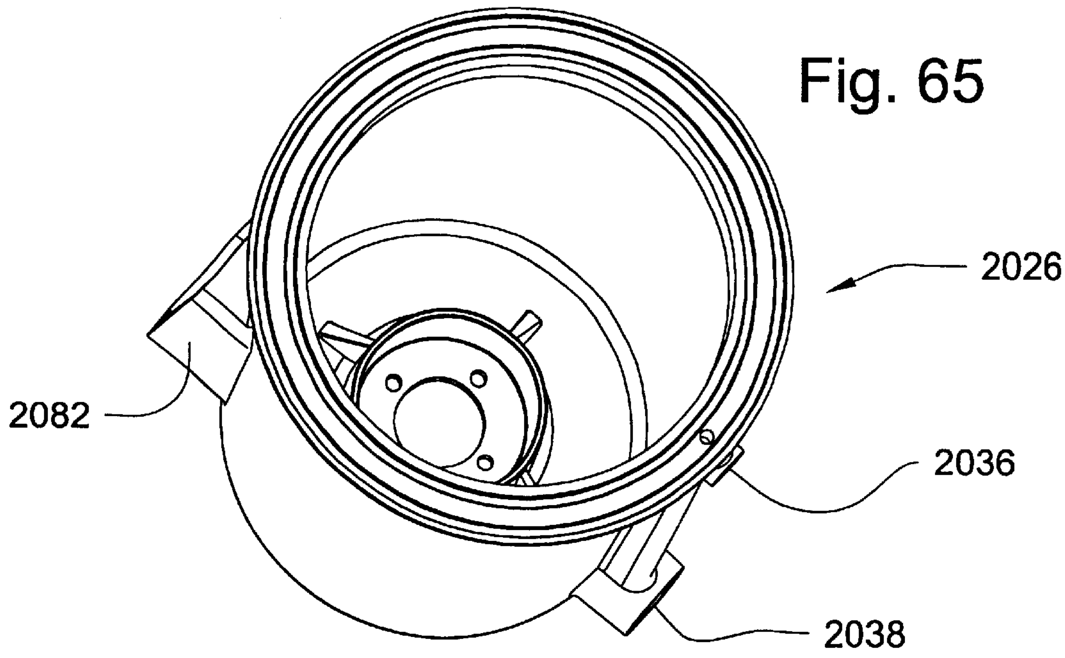
Figure 66:
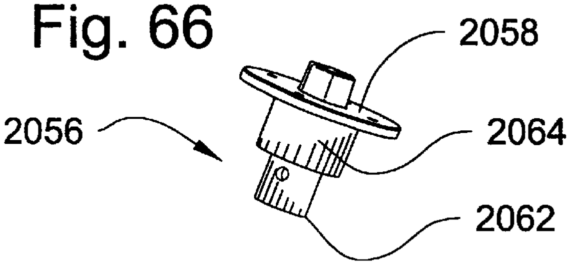
Figure 67:
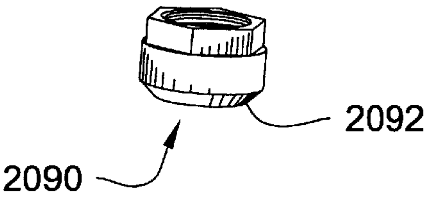
Figure 68:
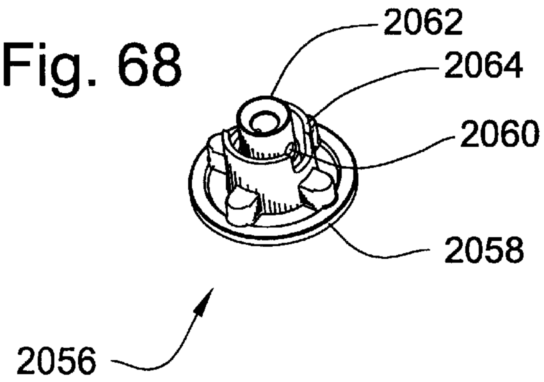
Figure 69:
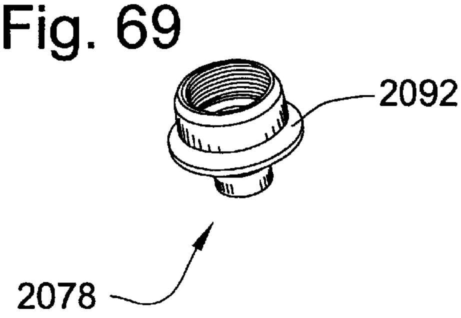
Figure 70:
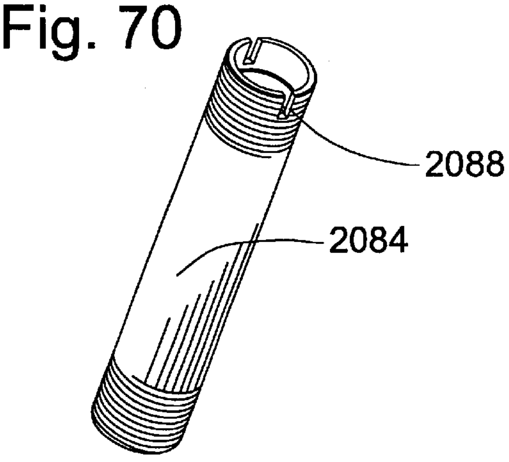

Referring to FIGS. 47, 48, and 61, the centrifuge housing 54 includes a stationary body, which may be comprised of an outer casing 2026 and a removable lid 2028. Preferably the casing 2026 includes mounting means such as straps or mounting bosses which allow it to be mounted to the frame of the vehicle. By mounting the casing 2026 to the vehicle frame rather than the engine a larger size filter can be used which advantageously increases the volume of oil capable of being held by the cartridge. The casing 2026 includes a generally cylindrical side wall 2030 and closed and open ends 2032, 2034, designated as such to indicate which end from which the filter cartridge 2024 can be removed. In the preferred embodiment, the closed end is formed partially by the casing itself along with a shaft mount or alternatively a drive mechanism mount as illustrated in the previous embodiments. The bottom end portion of the casing 2026 as forms an annular trough 2166 for collecting filtered oil for return to the engine.

The casing includes an external inlet 2036 and an external outlet 2038 for receiving and returning oil to the engine of a vehicle (not shown). In this embodiment, the external inlet and outlet are connected by a flow passage 2040 to allow excess oil not entering the cartridge to be directed directly to the outlet. The trough 2166 is connected to the external outlet 2038. The lid 2028 screws on to the casing 2026 and has projection grips 2042 which facilitate manual grasping of the lid for screwing the lid on to the casing.

The lid provides for an inlet flow passage 2044 that extends radially inward towards the intended rotational axis of the filter cartridge. A restriction orifice 2046 is provided in the inlet flow passage in order to meter fuel at a preselected rate into the centrifuge cartridge 2024. The size of the restriction orifice is determined by the pressure of the oil at the entrance to the inlet flow passage 2044, the effective oil holding capacity of the centrifuge cartridge 2024 and the desired residence time for oil in the cartridge. Preferred residence time for oil inside the cartridge is at least about eight (8) minutes, when a rotational force of 10,000 G force is provided at the outer periphery of the centrifuge cartridge. The cartridge and method for effectively metering oil into the cartridge and removing soot from oil in an effective manner has already been disclosed in further detail with reference to the instant specification describing the embodiments illustrated in FIGS. 34–46. In any event, it has been found that in addition to rotating the cartridge at a speed sufficient to remove soot from oil, size of the filter chamber needs to be selectively sized relative to the restriction orifice 2046 in order to provide a predetermined residence time of oil in the filtering chamber. It has been found that a metering orifice 2046 that has a diameter of 0.009 inches (an orifice area of less that one-ten thousandth of a square inch) along with a filter cartridge size which is capable of holding about 1.5 gallons provides one such preferable arrangement for a desired residence time of eight (8) minutes in an engine type environment when a 10,000 G force is applied. Depending upon the actual rotational speed of the centrifuge cartridge and the pressure of oil provided at the external inlet 2036, it will be appreciated that these numbers can vary and also be adapted to provide a less efficient soot removal capability. However, each of the parameters of rotational speed of the cartridge restriction orifice size, oil holding capacity of the cartridge are matched with one another to provide effective soot removal.

To ensure that the inlet flow passage 2044 connects the external inlet 2036 and the side oil outlet 2048, a sealed annular groove 2050 is provided between the lid 2028 and the casing 2026 and along the inlet flow passage 2044 to ensure that oil is communicated into the cartridge 2024 no matter which way the lid is oriented or how tight the lid is screwed on to the casing. A pair of large O-ring seals 2052 axially compressed between the lid and the casing ensure that the inlet flow passage 2044 is sealed.

The centrifuge housing 2022 further includes a central support shaft 2054 extending along the axis of rotation between the closed end 2032 and the removable lid 2028. The shaft 2054 provides a support element for supporting the entire rotating element inside of the housing. At each end, a vibration isolator generally indicated at 2056 supports the shaft, and thereby dampens any engine vibrations or vehicle imposed shock loads from being transferred to the bearings, motor and rotating element. Each vibration isolator 2056 generally includes a mount 2058, a resilient member preferably in the form of a vulcanized rubber piece 2060 and a cup 2062. The mount 2058 of the upper vibration isolator is fastened to the lid 2028. The mount 2058 of the lower vibration isolator 2056 is secured to the inward projecting portion of the casing 2026. Each mount includes a sleeve portion 2064 which surrounds the cup 2062 to provide a mechanical stop which snubs excessive radial movement of the shaft 2054 relative to the intended rotational axis of the centrifuge filter 2020 in order to prevent the cartridge 2024 from crashing into the inner surface of the outer casing 2026. A pin 2068 is connected to the shaft 2054 at the lower end and extends through the cup 2062 and the sleeve 2064 in order to provide retention of the shaft torsionally and axially. The shaft 2054 also includes a slot 2070 at its upper end for facilitating holding of the shaft stationary when changing filter cartridges.

The shaft 2054 generally has a larger diameter central proportion and progressively smaller diameter portions at each end. At the ends of the larger central diameter portion, the shaft 2054 is mounted with a pair of ball bearings 2086 for facilitating rotation of the cartridge relative to the housing. At the lower end of the shaft 2054 a drive mechanism in the form of an electric brushless motor 2072 is mounted. Although an electric motor is illustrated, it will be appreciated that other forms of drive mechanisms such as a pneumatic air motor, a hydraulic motor, a mechanical gear mechanism, or oil driven turbine may also be used. The key consideration is that the drive mechanism must provide sufficient speed in order to provide a sufficient force capable of removing soot from oil. The electric motor 2072 is mounted in a motor mount 2004 that threads directly on to a bottom threaded portion of the support shaft 2054. Thus, the drive mechanism is also preferably carried by the vibration isolators 2056. The motor 2072 generally includes a rotor which includes a permanent magnet 2076 mounted to an armature 2078, and a stator 2080 which typically includes a lamination stack and windings. The electronics for feeding electrical power to the motor 2072 is mounted in a motor housing 2082 which includes a heat sink for cooling the electronics, on the side of the casing 2026. The armature 2078 is threadingly connected to a drive tube 2084, which in turn is journaled by the bearings 2086 such that the drive tube and armature are adapted to rotate relative to the support shaft 2054 and the rest of the housing. The drive tube 2084 is mounted concentrically over the support shaft

2054 with a small gap therebetween. The drive tube has a slot 2088 at its upper end that allows a service technician to hold the hollow tube fixed relative to the support shaft 2054 when installing a new cartridge. In particular, a hold down nut 2090 is connected to threads at the top end of the drive tube 2084 in order to hold down the cartridge against the armature 2078. The slot 2088 allows a service technician to tighten and loosen the hold down nut 2090. The armature 2078 provides a beveled conical contact surface 2092 for engaging the centrifuge cartridge 2024 for precise alignment of the cartridge about the axis of rotation and for axial and radial retention of the cartridge 2024. As such, the conical contact surface has a center that coincides with the axis of rotation for the centrifuge filter 2020. The hold down nut 2090 also includes a conical contact surface 2092 for radial alignment and retention purposes of the centrifuge cartridge 2024.

Turning to the centrifuge cartridge 2024 in greater detail, reference can be had to FIGS. 49 and 54–60. The centrifuge cartridge generally includes top and bottom end plates 2100, 2102 in spaced apart relationship and a cylindrical canister 2104 or other shell connecting the outer peripheries of the plates to provide an outer housing for enclosing a filter chamber 2106 in which soot is separated from oil. Large radial seal gaskets 2108 are compressed between the canister 2104 and the end plates 2100, 2102 for sealing off the outside of the filter chamber 2106. To maintain the end plates in spaced about relationship, a center tube 2110 is threadingly connected to the bottom end plate 2102 preferably with a thread seal compound to make a leak tight seal at the threads. The center tube 2100 is also secured to the upper end plate 2100. To secure the center tube 2110 to the top end plate, a spring retainer clip 2112 is inserted in a slot at the upper end of the tube to locate the top end plate 2100 on the tube 2110. Then an element nut 2114 is threaded on to the top end of the tube 2110 in order to retain the top end plate 2100 on the tube. The top and bottom end plates 2100, 2102 are preferably diecast from aluminum and the outer canister 2104 is preferably sheet steel and connected to the end plates through a "J lock" connection 2116 or other similar aluminum to steel securing operation. Balancing rings 2116 are preferably provided in each of the top and bottom end plates in order to provide a place where material may be removed during a subsequent balancing operation on a balancing machine.

The centrifuge cartridge 2024 includes an inlet 2120 and an outlet 2122. The center tube 2110 is preferably made of the same material as the drive tube 2084 of the housing 2022 such that the axial length of the cartridge and the drive tube expand at substantially the same rate over differences in temperatures due to the different environmental conditions under which vehicles may operate.

The top end plate includes a central hub 2124 which closely surrounds the center tube 2110 and an outer peripheral disc-shaped rim 2126 integrally connected to the hub 2124 by a plurality of ribs 2128. The inlet 2120 is generally defined between the central hub 2124 and the outer rim 2126 such that it is ring-shaped and offset from the predetermined axis of rotation in a position where it is adapted to align with the side oil outlet 2048 of the housing. As such, the inlet 2120 receives discharged oil from the side oil outlet 2048, and allows it to enter into the filter cartridge. A handle 2130 is threadingly connected to the top end plate 2100 to facilitate easy manual removal of the cartridge from the housing. The handle 2130 has a outward projection lip which provides a grab surface that can be easily grabbed for manual removal of a spent centrifuge cartridge and insertion of a new cartridge. The inner surface of the handle 2120 or the inner surface of the rim 2126 is slightly conical and angles outwardly as it angles downwardly such that it ensures that centrifugal forces force oil downward into the cartridge rather than upward. The outlet 2122 is preferably provided at the bottom end of the cartridge in order to minimize the drag effect the oil could possibly have on the cartridge and also to provide for a cleaner less oily removal of the filter cartridge from the housing. In order to prevent drainage of the cartridge 2124 when idle, the outlet is connected by an outlet conduit 2132 which has an entrance 2134 in proximity to the top end of the cartridge. The outlet entrance 2134 is located at a radial location at a point just outside the diameter of the inlet 2120 in order to maximize the oil holding capacity and filtering capability of the cartridge 2124 during rotation.

To maximize the soot removal capabilities of the cartridge 2122, a separate containment trap element 2136 is preferably inserted and retained inside of the filter chamber 2106. The containment trap element 2136 generally includes a filter trap 2138 having its ends potted with potting material such as plastisol, urethane, or epoxy in top and bottom end caps 2140, 2142. A spring 2144 axially biases the trap element 2136 towards to the bottom end plate and has sufficient force to maintain it against the bottom end plate during operation in a vehicle environment. A gasket 2146 is preferably compressed between the trap element 2136 and the bottom end plate 2102 to prevent most or all oil from short circuiting past the filter trap 2138. The top end cap 2140 includes an entrance tube 2148 which provides for the outlet entrance 2134. The bottom end cap 2142 and bottom end plate 2102 each include exit tubes 2150, 2152 that facilitate fluidic connection of the outlet conduit 2132 from the entrance 2134 to the outlet 2122. A radial seal gasket in the form of a tubular gasket 2154 is slid over the exit tubes 2150, 2152 in order to seal off the outlet flow passageway. In a preferred embodiment, a large portion of the outlet conduit 2132 is integrally provided by the filter trap 2138 thereby eliminating the need for separate tubes from the filter trap. As can be seen, the trap defines a pair of axially extending passageways 2158 to connect the entrance tube 2148 to the exit tubes 2150, 2152. Except for the configuration of the outlet passageway, the filter trap 2138 is substantially similar to that shown in the previous embodiments of FIGS. 34–46 and particularly shown in greater detail in FIGS. 37, 38, 43 and 45. Therefore, further details of the containment trap 2158 and the operation thereof can be had with reference to those figures and the associated description. However, it is noted that the present embodiment includes the integrally formed axial passageways 2156 and therefore does not need the axial recesses formed for receiving separate tubes. Additionally, this embodiment also illustrates the fact that preferably at least two separate outlet conduits 2132 are provided symmetrically about the predetermined axis of rotation in order to maintain a highly balanced filter cartridge 2024 about the predetermined axis of rotation.

Referring to the filter trap 2138, it is noted that a plurality of generally concentric levels are provided by corresponding generally concentric cylindrical walls 2158. Each wall having its center aligned with the predetermined axis of rotation. Each level also includes a plurality of angularly spaced partition walls 2160 that divide each level up into a plurality of trap chambers 2162. Slots 2168 are provided in the partition walls and arranged at opposite ends of the trap such that oil is caused to travel the entire axial length of the filter trap back and forth axially as it proceeds chamber to chamber. To transfer oil from one level to the next, each cylindrical trap wall has an aperture 2168 therein for transmitting oil between levels. Preferably the filter trap is also divided up into at least two equally sized compartments with each compartment providing a separate flow path through the filter trap. In this manner, the trap fills up substantially equally and is thus balanced when initially filling up a newly installed centrifuge cartridge with oil.

Another aspect of the present invention is that the centrifuge cartridge 2024 includes a conical contact surface 2164 on the bottom end plate 2102 which is concentric about the predetermined axis such that it contacts and engages the corresponding conical surface 2092 on the armature 2078 to provide for radial alignment and axial and radial retention for proper balancing of the cartridge. Preferably, this contact surface 2164 is precisely machined in order to get a more precise alignment of the cartridge. The conical contact surface 2092 of the hold down nut 2092 increases a radial alignment and retention of the cartridge 2024.

In operation, the centrifuge cartridge 2024 will be driven by the motor 2072 or other drive mechanism about the predetermined axis of rotation. Oil from the engine will enter through the external inlet 2036 and some will flow back to the engine through the bypass flow passage 2040 while a portion of the oil will flow on into the centrifuge cartridge through the oil inlet passage 2044. The restriction orifice 2046 performs a metering function and is sized relative to the oil holding capacity of the centrifuge cartridge. Oil enters the centrifuge cartridge through the cartridge inlet 2120 and proceeds into the containment trap element 2136 through the filter trap 2138. The heaviest particles, those being the soot, are forced radially outward and thus are deposited in deposit areas which are located radially outward locations. For example, each of the trap chambers 2162 (except for the last trap chamber for that level) has a deposit area located on the inner surface of the outermost cylindrical wall 2158 for that level. Lighter materials such as the oil is forced back inward and eventually flows through the outlet conduit and exits the centrifuge cartridge into an annular trough 2166 formed in the housing and returns to the engine by way of the external outlet 2038.

Figure 73:
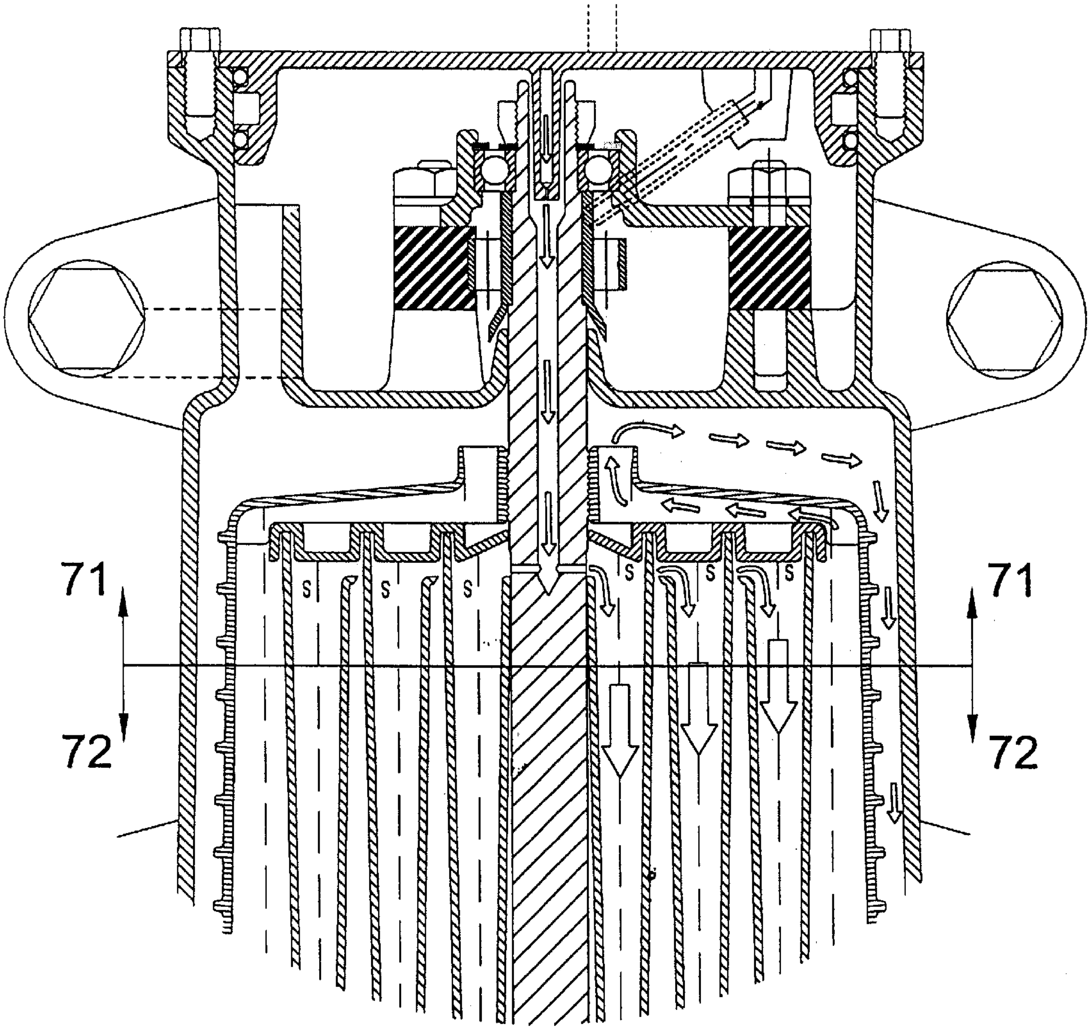
FIGS. 71–73 are illustrations of a conical wall trap embodiment illustrating partition walls between levels.
Figure 71:
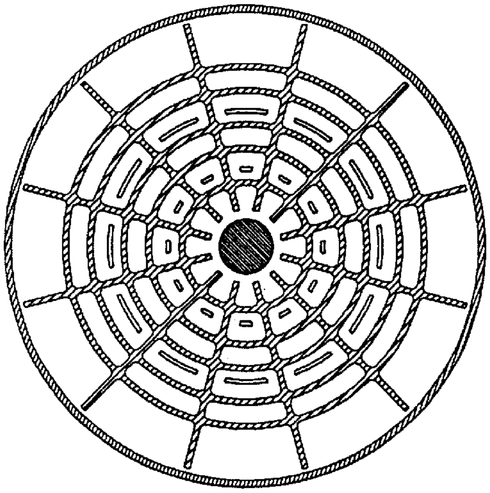
Figure 72:
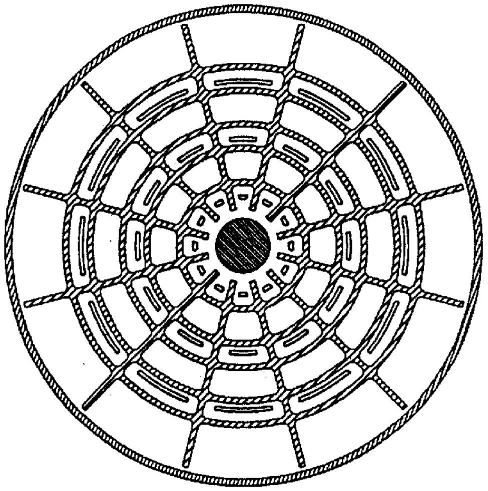

It has been found that the partition walls 2160 also serve the highly advantageous function of preventing waves from forming in oil when the centrifuge is being brought up to speed and from engine or vehicle induced vibrations or shock loads. By preventing the waves from forming, the cartridge stays balanced which reduces wear and loads on the cartridge bearings and drive components. The cylindrical wall trap embodiments of FIGS. 34–70 have these partition walls which break each cylindrical level up into separate chambers. Because the spiral trap configuration of the first embodiment prevents cylindrical or perfectly circular levels which in turn would allow circular rings of oil to form, the spiral trap configuration also provides similar means for inhibiting waves from forming at the various levels. The conical trap embodiment of FIG. 19 or other cartridge embodiments including the single level embodiments also would preferably include such partition walls or other such means for inhibiting waves from forming, see for example FIGS. 71–73. As such, it is understood that the conical trap wall embodiment could also have partition walls. It is also noted that in the cylindrical trap embodiment that the cylindrical walls may have slight drafts on them as shown for example in FIG. 44, but even with the slight drafts, the walls are still considered cylindrical for all purposes.

All of the references cited herein, including patents, patent applications and publications are hereby incorporated in their entireties by reference. While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A centrifuge filter cartridge adapted to be rotated for filtering fluid, comprising:

an outer housing having a predetermined axis of rotation, an inlet, an outlet, and a filter chamber between the inlet and the outlet, the outlet being disposed radial outward of the inlet; and a filter trap located in the filter chamber, the inlet being fluidically connected to the outlet through the filter trap, the filter trap including a plurality of levels, each level being located at a different radial distance from the predetermined axis of rotation wherein fluid flows from the inlet and sequentially through each of the levels to the outlet, each level including at least one deposit area and at least one aperture, at least some of the apertures being located radially inward of the deposit area for that level.

2. The centrifuge filter cartridge of claim 1 wherein the filter trap includes a wall surrounding the predetermined axis of rotation and coiled in a spiral configuration about the predetermined axis of rotation.

3. The centrifuge filter cartridge of claim 2 wherein the wall includes a plurality of depressions formed therein to provide deposit areas and a plurality of ridges formed between adjacent depressions, the apertures being provided between the ridges for transferring oil to the next radial outward level.

4. The centrifuge filter cartridge of claim 3 wherein the wall is constructed from a unitary sheet coiled and held in the spiral configuration.

5. The centrifuge filter cartridge of claim 1 wherein the filter trap includes a plurality of conical walls, each providing a separate level, the plurality of conical walls being located one inside of each other to include a radially outermost conical wall and a radially innermost conical wall, each conical wall having a center aligned with the predetermined axis, each conical wall having a wide and narrow ends, the deposit areas being located in proximity to the wide ends, the aperture being located in proximity to the narrow end.

6. The centrifuge filter cartridge of claim 5 wherein adjacent conical walls have their respective narrow ends and wide ends at opposite ends of the filter trap, such that the narrow end of one adjacent conical wall is proximate the wider end of the adjacent conical wall.

7. The centrifuge filter cartridge of claim 6, further including a plurality of disc shaped spacer walls connected the respective wide and narrow ends of adjacent conical walls, each spacer wall including at least one of the apertures.

8. The centrifuge filter cartridge of claim 1, wherein the filter trap includes a plurality of cylindrical trap walls, each providing a separate level, the plurality of cylindrical trap walls being located concentric about the predetermined axis.

9. The centrifuge filter cartridge of claim 8, wherein the each level includes a plurality of angularly spaced partition walls connected between adjacent inner and outer cylindrical trap walls such that the level is separated into a plurality of trap chambers to include a first and a last trap chamber, the inner adjacent cylindrical trap wall having an aperture therethrough for receiving fluid from the adjacent inner level, each partition wall including an aperture located proximate the inner adjacent wall for sequentially transmitting fluid through the trap chambers from the first to the last trap chamber.

10. The centrifuge filter cartridge of claim 9 further comprising intermediate trap chambers between the first and last trap chambers, wherein each intermediate trap chamber is defined between two adjacent partition walls, with an aperture in one partition wall located proximate one end of the trap and exit aperture located in the other partition wall proximate the other end of the trap, whereby fluid is adapted to travel the length of the trap chamber between ends of trap.

11. The centrifuge filter cartridge of claim 9 wherein the filter trap is divided up into at least two equally sized compartments, each compartment providing a separate flow path through the filter trap, the filter trap including means for filling up the at least two equally sized compartments substantially equally during initial fluid filling of the trap.

12. The centrifuge filter cartridge of claim 1 wherein the housing includes top and bottom end plates, and a shell connected to respective the outer peripheries of the end plates and extending transversely between the outer peripheries of the end plates to enclose the filter chamber.

13. The centrifuge filter cartridge of claim 12, wherein the filter trap includes a trap element and top and bottom end caps, the ends of the trap element being potted to the end caps with potting material.

14. The centrifuge filter cartridge of claim 12, further comprising a center tube connecting the top and bottom end plates, one end of the tube being threadingly connected to the bottom end plate, a locking ring threadingly connected to other end of the tube and tightening the top end plate against the bottom end plate.

15. The centrifuge filter cartridge of claim 14, further comprising at least one spring compressed between the top end plate and the top end cap to provide a gap therebetween, further comprising outlet conduit including an outlet entrance in the top end cap, an outlet passageway through the filter trap and an outlet exit through the outlet in the bottom end plate.

16. The centrifuge filter cartridge of claim 12 wherein the top end plate includes a hub concentric about the axis and a surrounding disc portion connected by ribs, the inlet be defined between the hub and the disc portion whereby the cartridge is adapted to receive oil at a point offset from the predetermined axis.

17. A centrifuge filter cartridge adapted to be rotated for filtering fluid, comprising:

an outer housing having a predetermined axis of rotation, an inlet, an outlet, top and bottom ends, and a sidewall connected to respective the outer peripheries of the ends, the sidewall extending transversely between the outer peripheries of the ends to enclose a filter chamber between ends, the filter chamber being between the inlet and the outlet for communication of fluid from the inlet to the outlet;

a trap located in the filter chamber and surrounding the predetermined axis, the inlet being fluidically connected to the outlet through the trap, the trap including a plurality of levels, each level being located at a different radial distance from the predetermined axis of rotation wherein fluid flows from the inlet and sequentially through each of the levels to the outlet, each level including at least one deposit area and at least one aperture, at least some of the apertures being located radially inward of the deposit area for that level; and top and bottom end caps for the trap, the opposing axial ends of the trap being retained by the top and bottom end caps.

18. The centrifuge filter cartridge of claim 17 wherein at least one of the top and bottom end caps is integrally formed with at least one of the top and bottom ends.

19. The centrifuge filter cartridge of claim 17 wherein both of the top and bottom end caps are separate members from the top and bottom ends.

20. The centrifuge filter cartridge of claim 17 wherein the top end cap and top end plate are spaced apart to provide a gap therebetween, and wherein the inlet is located in the top end and the outlet is located in the bottom end, and further comprising:

at least one outlet conduit having an entrance in top end cap for receiving oil from the gap and an exit through to the outlet in the bottom end.

21. The centrifuge filter of claim 20 further comprising at least one radial seal gasket acting on the bottom end and the outlet conduit providing a sealed passageway.

22. The centrifuge filter of claim 20 wherein the outlet conduit is integrally provided by the trap.

23. The centrifuge filter cartridge of claim 20 wherein the outlet conduit is separately provided by at least two outlet tubes located in symmetrical relationship about the predetermined axis.

24. The centrifuge filter cartridge of claim 17 wherein the trap includes a wall surrounding the predetermined axis of rotation and coiled in a spiral configuration about the predetermined axis of rotation, the wall including a plurality of depression formed therein and a plurality of ridges formed between adjacent depressions, the apertures being provided in the through the ridges for transferring oil to the next radial outward level.

25. The centrifuge filter cartridge of claim 17 wherein the trap includes a plurality of conical walls, each providing a separate level, the plurality of conical walls being located one inside of each other to include a radially outermost conical wall and innermost conical wall, each conical wall having a center in alignment with the predetermined axis, each conical wall having a wide and narrow ends, the deposit areas being located in proximity to the wide ends, the aperture being located in proximity to the narrow end, and wherein adjacent conical walls have their respective narrow ends and wide ends at opposite ends of the filter trap, such that the narrow end of one adjacent conical wall is proximate the wider end of the other adjacent conical wall, and further including a plurality of disc shaped spacer walls connected the respective wide and narrow ends of adjacent conical walls, each spacer wall including at least one of the apertures.

26. The centrifuge filter cartridge of claim 17, wherein the trap includes a plurality of cylindrical trap walls, each providing a separate level, the plurality of cylindrical trap walls being located concentric about the predetermined axis, and wherein the each level includes a plurality of angularly spaced partition walls connected between the adjacent inner and outer cylindrical trap walls such that the level is separated into a plurality of trap chambers to include a first and a last trap chamber, the inner adjacent cylindrical trap wall having an aperture therethrough for receiving fluid from the adjacent inner level, each partition wall including an aperture located proximate the inner adjacent wall for sequentially transmitting fluid through the trap chambers from the first to the last trap chamber and further comprising intermediate trap chambers between the first and last trap chambers, wherein each intermediate trap chamber is defined between two adjacent partition walls, having an aperture in one partition wall located proximate one end of the trap and exit aperture located in the other partition wall proximate the other end of the trap, whereby fluid is adapted to travel the length of the trap chamber between ends of trap.

27. The centrifuge filter cartridge of claim 26 wherein the trap is divided up into at least two equally sized compartments, each compartment providing a separate flow path between through the filter trap, each compartment adapted to fill up substantially equally during initial fluid filling of the trap.

28. The centrifuge filter cartridge of claim 17, further comprising a center tube connecting the top and bottom end plates, one end of the tube being threadingly connected to the bottom end plate, a locking ring threadingly connected to other end of the tube and tightening the top end plate against the bottom end plate.

29. A centrifuge filter cartridge for mounting in a centrifuge housing to be rotated thereby for filtering fluid, the centrifuge cartridge comprising:

- an outer housing having a predetermined axis of rotation, top and bottom vertically spaced closed ends, and a sidewall connected to respective the outer peripheries of the closed ends, the sidewall extending transversely between the outer peripheries of the closed ends to enclose a filter chamber between closed ends;
- a cartridge inlet in the top closed end;
- a cartridge outlet in the outer housing in proximity to the bottom closed end, the cartridge outlet being located at greater distance from the predetermined axis than the cartridge inlet; and
- an outlet conduit inside the outer housing, the outlet conduit having an entrance in the filter chamber in proximity to the top closed end and extending vertically downward to the cartridge outlet to provide an isolated flow path such that drainage of most fluid from the filtering chamber is prevented when the cartridge is idle, the entrance being located radially inward from the sidewall at a radial distance from the predetermined axis that is greater than the radial location of the cartridge inlet.

30. The centrifuge filter cartridge of claim 29 further comprising a filter trap located in the filter chamber, the inlet being fluidically connected to the outlet conduit through the filter trap, the filter trap including a plurality of levels, each level being located at a different radial distance from the predetermined axis of rotation, each level including at least one deposit area and at least one aperture, at least some of the apertures being located radially inward of the deposit area for that level.

31. The centrifuge filter cartridge of claim 30 wherein the outlet conduit is integrally provided by the filter trap.

32. The centrifuge filter cartridge of claim 29 wherein the outlet conduit is provided by at least one tube projecting axially from the bottom closed end.

33. The centrifuge cartridge of claim 32 wherein the at least one tube includes an axially extending portion having an exit and a radially inward extending portion having the entrance, the axially extending portion and radially inward extending portion being connected at an elbow juncture.

34. The centrifuge filter cartridge of claim 29 wherein the outlet conduit extends through the bottom closed end.

35. The centrifuge filter cartridge of claim 34 further comprising at least one gasket acting on the bottom closed end and the outlet conduit, providing a sealed passageway from the exit through the outlet conduit.

36. The centrifuge filter cartridge of claim 29 wherein the top and bottom closed ends include central openings aligned with the predetermined axis, the top closed end including a central hub and a rim portion surrounding the central hub, the cartridge inlet and annular gap being defined between the rim portion and the central hub.

37. The centrifuge filter cartridge of claim 36 wherein the bottom closed end includes a conical surface surrounding the predetermined axis for facilitating alignment of the centrifuge cartridge with the centrifuge housing.

38. The centrifuge filter cartridge of claim 36 wherein the top and bottom closed ends comprise separate top and bottom end plates and a separate shell providing the sidewall, further comprising a center tube generally concentric about the predetermined axis connecting the top and bottom end plates.

39. A centrifuge filter cartridge for mounting in a centrifuge housing to be rotated thereby for filtering fluid, the centrifuge cartridge comprising:

- an outer housing having a predetermined axis of rotation, top and bottom vertically spaced closed ends, and a sidewall connected to respective the outer peripheries of the closed ends, the sidewall extending transversely between the outer peripheries of the closed ends to enclose a filter chamber between end plates;
- an exposed cartridge inlet through the top closed end;
- a cartridge outlet in the outer housing in proximity to the bottom closed end;
- an outlet conduit inside the outer housing, having an entrance in the filter chamber in proximity to the top closed end and extending vertically down to the cartridge outlet to provide an isolated flow path such that drainage of most fluid from the filtering chamber is prevented when the cartridge is idle, the entrance being located radially inward from the sidewall at a radial distance from the predetermined axis that is greater than the radial location of the cartridge inlet; and
- at least one deposit area in the filter chamber located radially outward of the entrance relative to the predetermined axis.

40. The centrifuge filter cartridge of claim 39 wherein the top closed end includes a hub concentric about the axis and a surrounding disc portion connected by ribs, the inlet being annular in shape, defined between the hub and the disc portion.

41. The centrifuge filter cartridge of claim 40 wherein the top and bottom closed ends comprise end plates, further comprising a center tube connecting the top and bottom end plates, one end of the tube being threadingly connected to the bottom end plate, a locking ring threadingly connected to other end of the tube and tightening the top end plate against the bottom end plate.

42. The centrifuge filter cartridge of claim 39 further comprising a filter trap located in the filter chamber, the filter trap providing a plurality of the deposit areas at multiple separate locations, the filter trap including top and bottom end caps and a trap element, the trap element being connected to the top and bottom end caps, the filter trap being secured in the filter chamber, the outlet conduit extending through the filter trap.

43. The centrifuge filter cartridge of claim 42, further comprising at least one spring compressed between the top closed end and the top end cap to provide a gap therebetween.

44. The centrifuge filter cartridge of claim 42 further including a gasket for sealing around the outlet conduit between the bottom closed end and the filter trap.

45. A centrifuge filter cartridge having a predetermined axis of rotation for mounting in a centrifuge housing to be rotated thereby for filtering fluid, the centrifuge housing having a side oil outlet for feeding oil into the centrifuge cartridge at a radial distance from the predetermined axis, the centrifuge cartridge comprising:

an outer housing having an outlet, and a filter chamber, the outer housing including a top end having a central hub and an outer rim surrounding the central hub;

an exposed ringed shap inlet extending vertically and axially through the top end defined between the central hub and outer rim, the inlet adapted to align vertically beneath the side oil outlet in spaced apart relationship, having inner and outer diameters from the predetermined axis that are respectively smaller and greater than the radial distance of the side oil outlet from the axis, the outlet of the cartridge being disposed radial outward of the inlet with the filter chamber fluidically connected between the inlet and outlet; and at least one deposit area in the filter chamber for removing soot from oil during rotation of the outer housing about the predetermined axis.

46. The centrifuge cartridge of claim 45 further comprising a handle connected to the top end and projecting vertically therefrom, the handle having a grab surface that is adapted to be manually grabbed for removal of a spent centrifuge cartridge from the centrifuge housing.

47. The centrifuge cartridge of claim 46 wherein the handle has an axis of symmetry coinciding with the predetermined axis.

48. The centrifuge cartridge of claim 45 further comprising a filter trap located in the filter chamber, the inlet being fluidically connected to the outlet through the filter trap, the filter trap including a plurality of levels, each level being located at a different radial distance from the predetermined axis of rotation, each level including at least one deposit area and at least one aperture, at least some of the apertures being located radially inward of the deposit area for that level.

49. The centrifuge cartridge of claim 45 further comprising an outlet conduit inside the outer housing, having an entrance in the filter chamber in proximity to the top end and extending to the outlet conduit providing an isolated flow path for preventing drainage of fluid from the filtering chamber when the cartridge is idle, the entrance being located radially inward from the shell at a radial distance from the predetermined axis that is greater than the radial location of the cartridge inlet.

50. The centrifuge cartridge of claim 45 wherein the outer surface of inlet angles radially outwardly as it extends vertically downward to thereby guide fluid into the cartridge.

51. A centrifuge filter cartridge adapted to be rotated for filtering fluid, comprising:

an outer housing having a predetermined axis of rotation, an inlet, an outlet, and a filter chamber between the inlet and the outlet, the outlet being disposed radial outward of the inlet; and a trap in the housing including at least one annular wall generally concentric about the axis and extending generally between top and bottom ends of the cartridge dividing the filtering chamber into at least two separate flow channels, wherein fluid flows axially in one direction along one side of the annular wall towards one end of the cartridge and flows axially in the reverse direction toward the other end of the cartridge along the other side of the annular wall; and the trap further including a plurality of radially extending partition walls in the filtering chamber integral with the at least one annular wall for inhibiting wave formation in the fluid contained in each filtering level during rotation of the housing about the predetermined axis.

52. The centrifuge filter cartridge of claim 51, wherein the filter trap includes a plurality of cylindrical trap walls, each providing a separate level, the plurality of cylindrical trap walls being located concentric about the predetermined axis, and wherein the partition walls extend through the cylindrical walls.

53. The centrifuge filter cartridge of claim 52 wherein the filter trap is divided up into at least two equally sized compartments, each compartment providing a separate flow path through the filter trap, the filter trap including means for filling up the at least two equally sized compartments substantially equally during initial fluid filling of the trap.

* * * * *